(12) United States Patent
Wada et al.

(10) Patent No.: US 7,349,091 B2
(45) Date of Patent: Mar. 25, 2008

(54) OPTICAL OBJECT DISCRIMINATING DEVICE

(75) Inventors: Hideo Wada, Katsuragi (JP); Nobuhisa Watanabe, Katsuragi (JP); Takayuki Taminaga, Nara-ken (JP); Hajime Kashida, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 307 days.

(21) Appl. No.: 11/143,630

(22) Filed: Jun. 3, 2005

(65) Prior Publication Data

US 2005/0270530 A1    Dec. 8, 2005

(30) Foreign Application Priority Data

Jun. 4, 2004  (JP) ............................. P2004-166694
Oct. 5, 2004  (JP) ............................. P2004-292588
Dec. 14, 2004  (JP) ............................. P2004-361302

(51) Int. Cl.
    *G01J 4/00*    (2006.01)
(52) U.S. Cl. ...................... 356/369; 356/445; 356/432; 356/364
(58) Field of Classification Search ........ 356/445–448, 356/364–369, 432, 433
    See application file for complete search history.

(56) References Cited

U.S. PATENT DOCUMENTS 5,307,273 A * 4/1994 Oh et al. .................. 73/597
5,617,500 A * 4/1997 Shionoya et al. ........... 359/370
5,757,474 A * 5/1998 Sopori et al. ................ 356/72
6,201,601 B1 * 3/2001 Vaez-Iravani et al. ... 356/237.4

FOREIGN PATENT DOCUMENTS

| CN | 1389720 A | 1/2003 |
|---|---|---|
| CN | 2597969 A | 1/2004 |
| CN | 1487264 A | 4/2004 |
| JP | 1-232255 | 9/1989 |
| JP | 2-052619 | 2/1990 |
| JP | 2-052623 | 2/1990 |
| JP | 3-077519 | 4/1991 |
| JP | 3-106325 | 5/1991 |
| JP | 3-123522 | 5/1991 |
| JP | 3-212249 | 9/1991 |
| JP | 3-228724 | 10/1991 |
| JP | 5-056888 | 3/1993 |
| JP | 5-056889 | 3/1993 |
| JP | 6-078862 | 3/1994 |
| JP | 7-311312 | 11/1995 |

* cited by examiner

*Primary Examiner*—Layla G. Lauchman
*Assistant Examiner*—Iyabo S Alli
(74) *Attorney, Agent, or Firm*—Nixon & Vanderhye, PC

(57) ABSTRACT

The optical object discriminating device includes a light projecting part which applies light, which is emitted from a semiconductor light emitting element, to a measuring object which is an object to be measured, and a light receiving part which receives reflected light reflected by the measuring object. Between the light receiving part and the measuring object is placed a polarization-state selector part which permits polarized light of a specified polarization direction to pass therethrough. A signal processing part processes a signal outputted by the light receiving part, and measures intensity of light of the polarization direction permitted by the polarization-state selector part to pass therethrough.

64 Claims, 47 Drawing Sheets

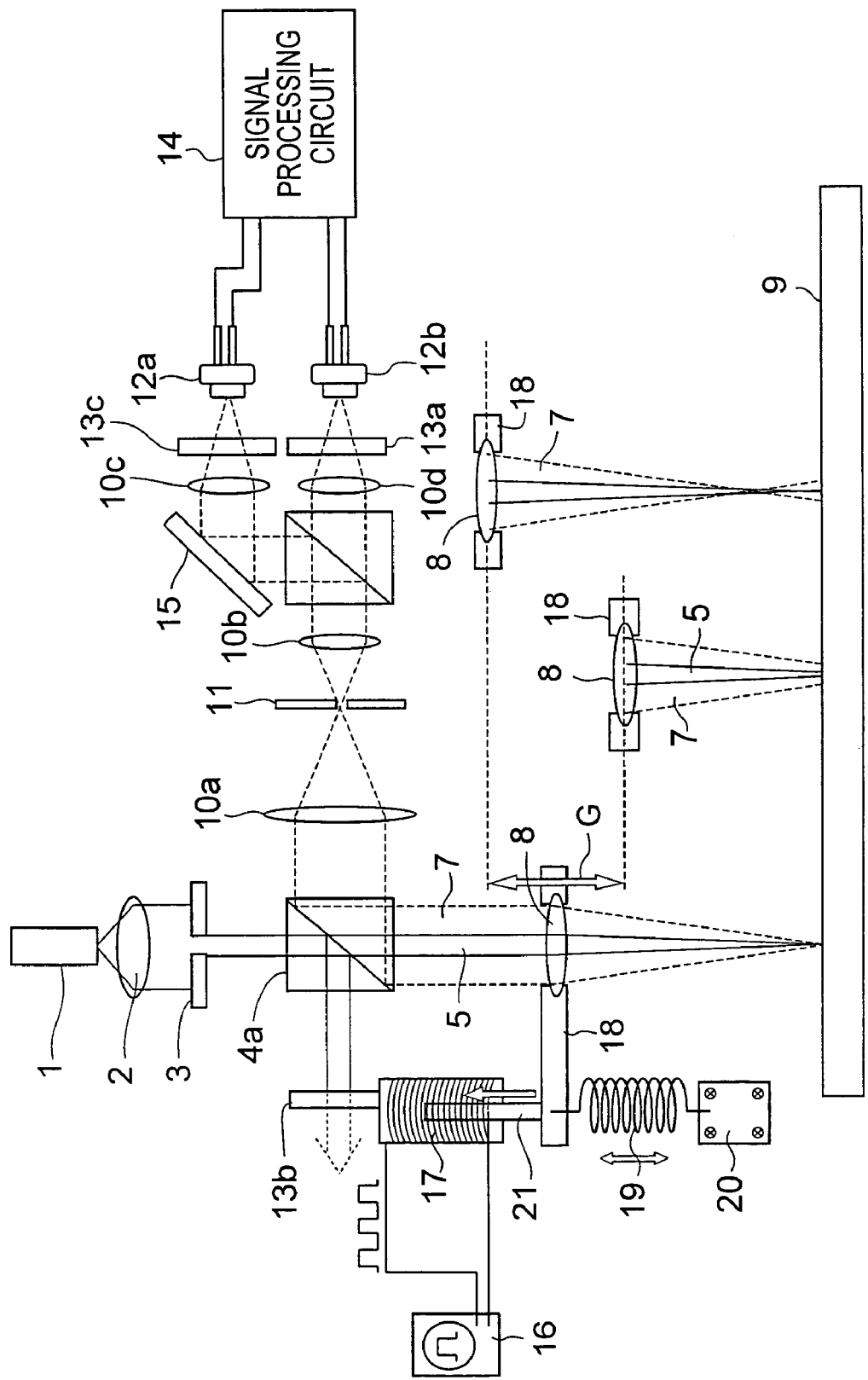

LD EMISSION PULSE

LD EMISSION PULSE

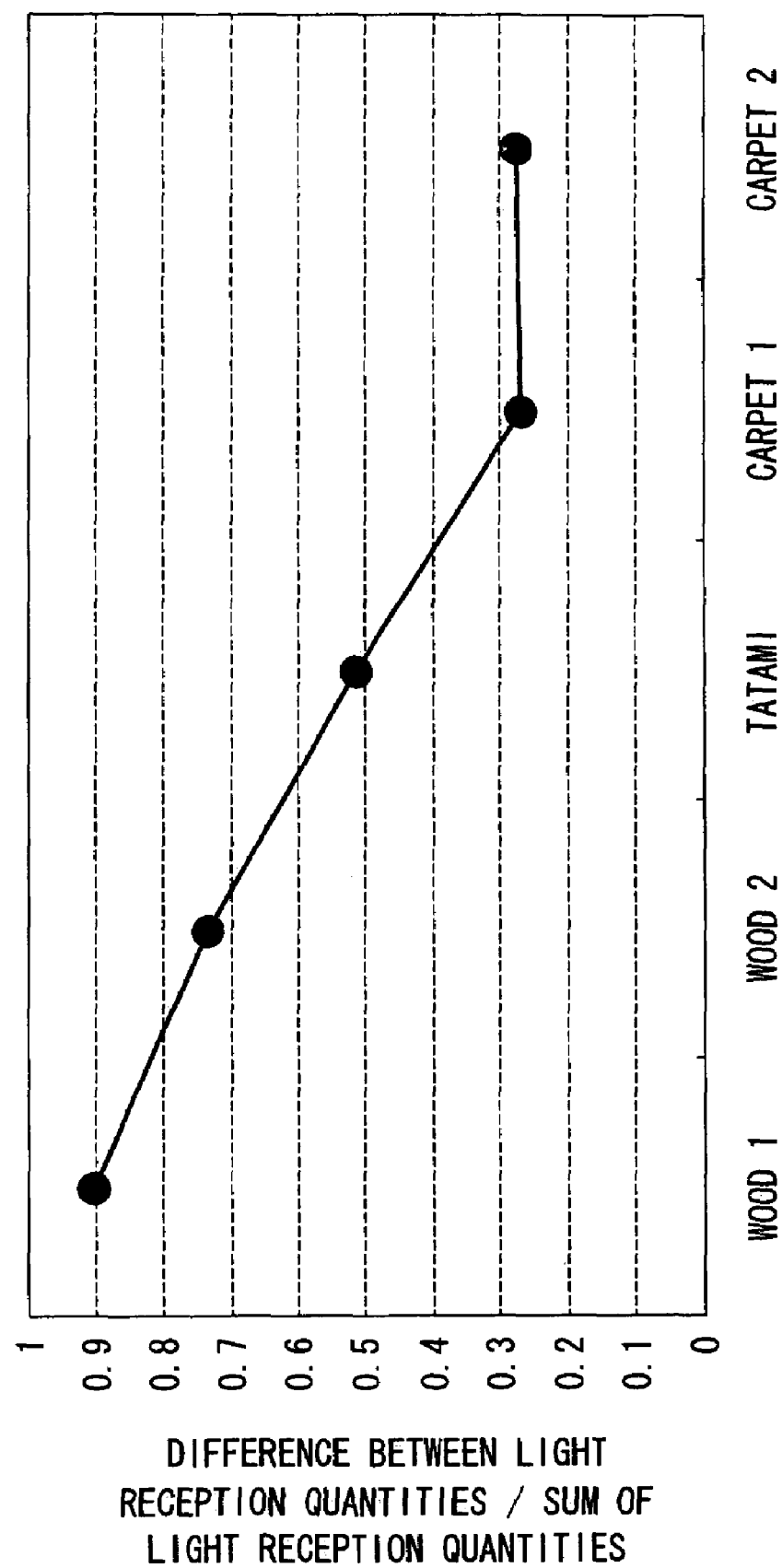

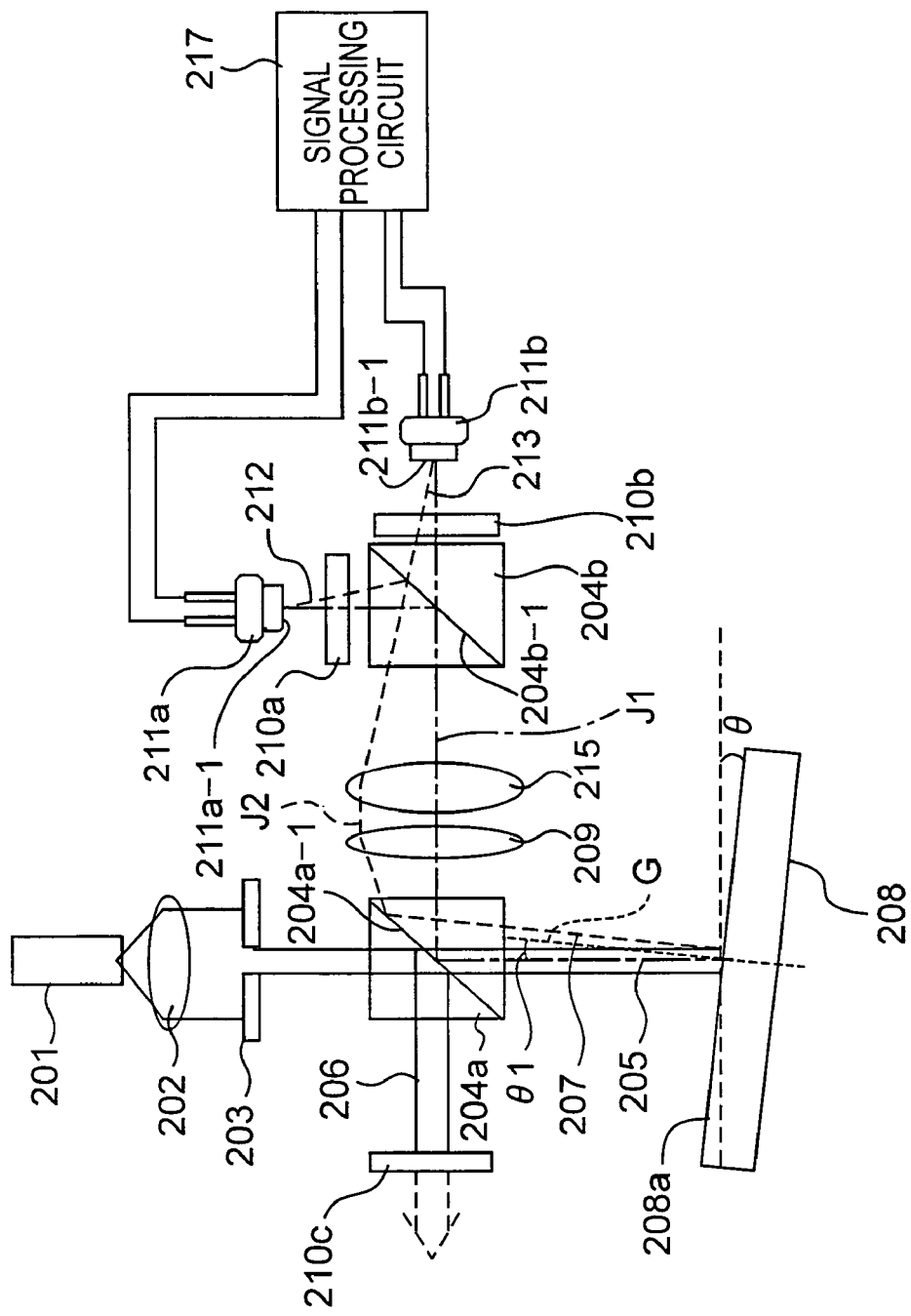

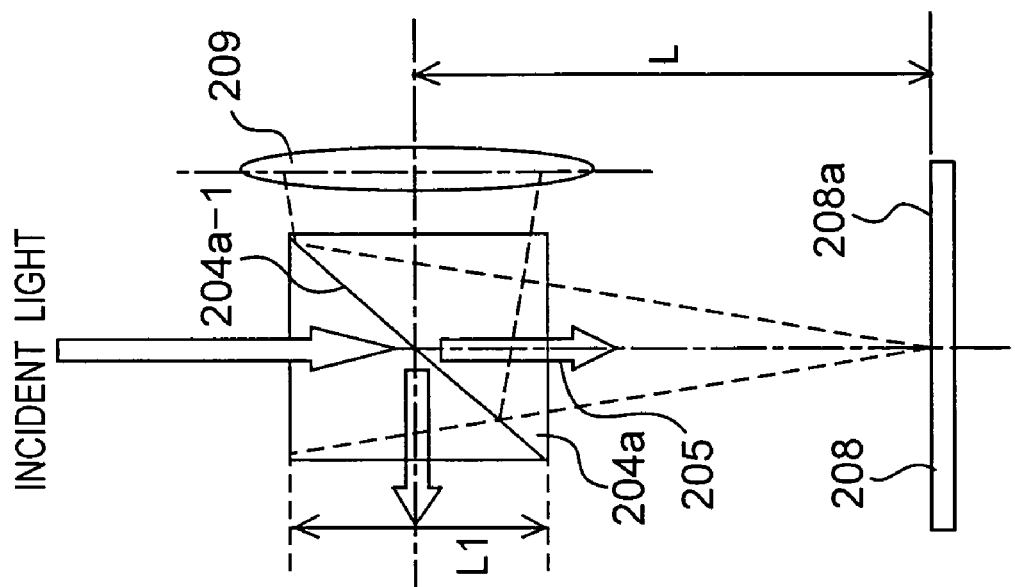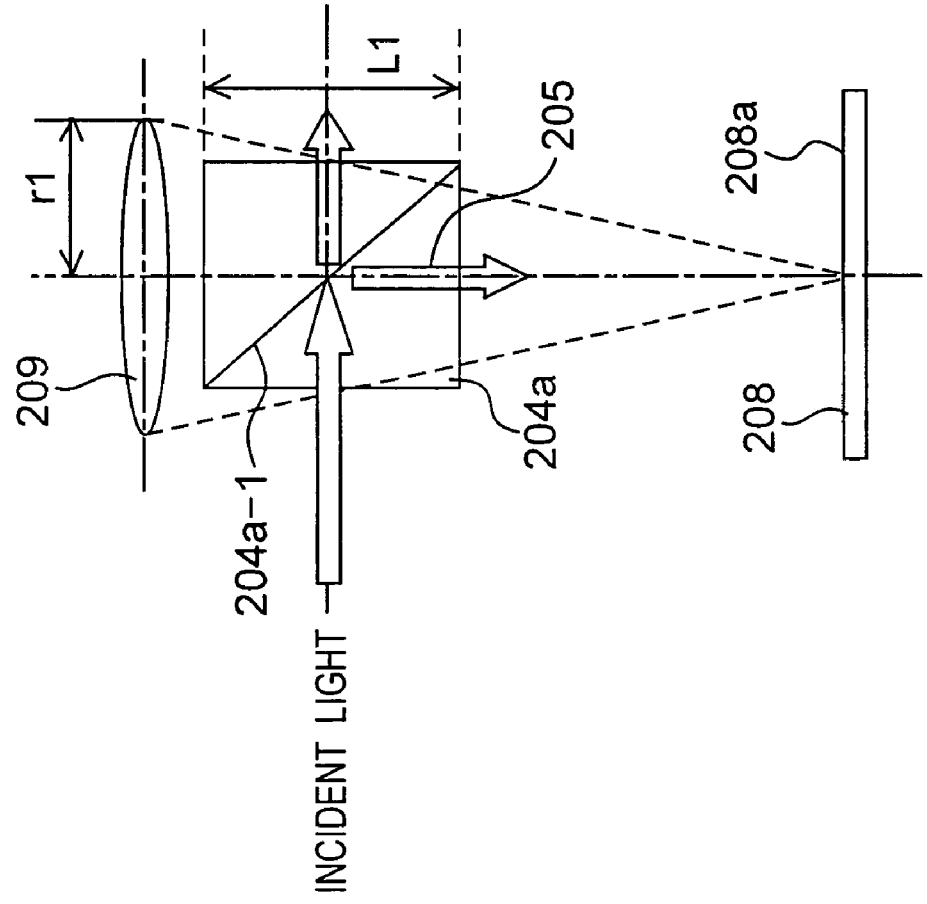

OPTICAL OBJECT DISCRIMINATING DEVICE

This Nonprofessional application claims priority under 35 U.S.C. §119(a) on Patent Application No. 2004-166694, No. 2004-292588 and No. 2004-361302 filed in Japan on Jun. 4, 2004, Oct. 5, 2004 and Dec. 14, 2004, respectively, the entire contents of which are hereby incorporated by reference.

BACKGROUND OF THE INVENTION

The present invention relates to optical object discriminating devices. The invention relates to an optical object discriminating device that discriminates the type of a measuring object, which is an object to be measured, for example, by applying laser beam to the measuring object and measuring a characteristic of depolarization due to reflection of the laser beam. The invention relates to an optical object discriminating device that discriminates, for example, the type of floor surfaces such as carpet, wooden floor and straw tatami mat.

As an example, the invention relates to an optical object discriminating device suited to achieving optimization of the operating state of a cleaner due to differences among such floor surfaces as carpet, wooden floor and straw tatami mat by discriminating the type of a floor surface. Further, the invention relates to cleaners and self-propelled cleaners containing the optical object discriminating device.

Floor surface discriminating sensors mounted on household vacuum cleaners can be classified into sensors of mechanical, suction pressure, ultrasonic and optical types.

Mechanical type floor surface discriminating sensors include (1) a type that a movable part is pressed against the floor surface (JP H02-52619 A), (2) a type that the floor surface is discriminated depending on a rotational state of a polygonal-prism or gear shaped roller (JP H02-52623 A and JP H03-106325 A), (3) a type that the floor surface is discriminated depending on a resistance value of an electrically conductive rubber that changes with a pressure received from the floor surface (JP H05-56888 A and JP H05-56889 A), and the like.

JP H06-78862 A describes a suction-pressure type floor surface discriminating sensor. This suction-pressure type floor surface discriminating sensor discriminates the type of floor surfaces by sensing a pressure of a front portion of a dust collection filter. This sensor fulfills the discrimination of floor surfaces by making use of the fact that a floor surface of carpet involves increases in the degree of vacuum when the carpet is sucked up to the suction port, while a wooden floor involves no increases in the degree of vacuum because wooden floors or the like will not be sucked up to the suction port.

JP H01-232255 A, JP H03-77519 A and JP H03-212249 A describe ultrasonic type floor surface discriminating sensors. In these ultrasonic type floor surface discriminating sensors, an ultrasonic pulse transmitted from a wave transmitting part mounted in opposition to the floor surface, after repeating reflection plural times as an echo against the floor surface, is received by a receiving part. Depending on the received signal, the sensor discriminates the type of the floor surface.

JP H03-123522 A and JP H03-228724 A describe an optical type floor surface discriminating sensor. This optical type floor surface discriminating sensor has a first light receiving/emitting element for receiving and emitting light horizontal to the floor surface, and a second light receiving/emitting element for receiving and emitting light vertical to the floor surface. From outputs of these two light receiving/emitting elements, the sensor discriminates the type of the floor surface.

Generally, such devices as mechanical floor surface discriminating sensors which are so constructed as to have a contact portion, particularly those so constructed that the contact portion has a movable portion movable by contact, have suffered various problems including wear of the contact portion (movable portion) or aged deterioration of mechanical reliability.

Therefore, optical type floor surface discriminating sensors capable of achieving the intended effects in noncontact manner are excellent in terms of device reliability. Meanwhile, mechanical type floor surface discriminating sensors of each of the types (2) and (3), both of which also have a contact portion and a movable portion, are designed to measure physical quantities due to displacement of the contact portion and the movable portion. As a result, the mechanical type floor surface discriminating sensors are problematic in reliability as compared with optical type floor surface discriminating sensors.

On the other hand, suction-pressure type floor surface discriminating sensors involve changes in the degree of vacuum due not only to the type of the floor surface to be cleaned but also to other factors such as clogging of dust collection filters. As a result, the suction-pressure type floor surface discriminating sensors have a fear of mis-detecting the type of the floor surface.

Moreover, for ultrasonic type floor surface discriminating sensors, both transmitting and receiving elements need to be provided with some horn. Therefore, the ultrasonic type floor surface discriminating sensors, when mounted on a common cleaner, become worse in easiness of use. Also, considerations should be taken for shock resistance and cost reduction.

An optical type floor surface discriminating sensor detects a decrease of the received light amount caused by carpet bristles intercepting the light emitted horizontal to the floor surface, thereby achieving the discrimination of the fact that the floor surface is given by a carpet. However, with non-shaggy carpets, since the light is not intercepted, there is a difficulty in detecting that the floor surface is a carpet.

Whereas floor surface discriminating sensors have been proposed in various types as shown above, those sensors have advantages and disadvantages as a matter of fact. Furthermore, the sensors are principally those which discriminate between carpets and others and not devices which are capable of distinguishing from straw tatami mats, which are a Japanese common indoor environment.

SUMMARY OF THE INVENTION

Accordingly, an object of the present invention is to provide an optical object discriminating device which is capable of accurately detecting unevenness of any measuring object and which is high in reliability and small in size.

Another object of the invention is to provide an optical object discriminating device which is capable of accurately detecting the type of any measuring object and high in reliability and yet which is relatively simple in construction and easy to downsize.

Still another object of the invention is to provide an optical object discriminating device which is free from degradation of the discrimination accuracy of the surface state of any measuring object even when inclined with respect to the measuring object so that the optical object discriminating device is enabled to achieve a high-accuracy discrimination of the measuring object.

In order to achieve the above object, according to the present invention, there is provided an optical object discriminating device comprising:

a light projecting part which applies light emitted from a semiconductor light emitting element, to a measuring object which is an object to be measured;

a light receiving part which receives reflected light reflected by the measuring object;

a polarization-state selector part which is placed between the light receiving part and the measuring object and which permits polarized light of a specified polarization direction to pass therethrough; and a signal processing part which processes a signal outputted by the light receiving part to measure intensity of light of the specified polarization direction out of the reflected light.

In the optical object discriminating device of this invention, the light emitted by the semiconductor light emitting element is applied from the light projecting part to the measuring object, where the polarization state of reflected light of this light varies in response to unevenness of the reflecting surface of the measuring object.

Therefore, the polarization state of the reflected light has information as to the unevenness of the reflecting surface of the measuring object. The reflected light, passing through the polarization-state selector part, becomes incident on the light receiving part. The signal processing part processes the signal outputted by the light receiving part to measure the light intensity of the specified polarization direction of the reflected light, thus discriminating the type of the measuring object.

In this invention, the polarization state of light to be let incident on the measuring object is previously known. Measuring polarization information as to the reflected light in association with incident light of a previously known polarization state allows unevenness of the measuring object to be measured, so that object discrimination can be achieved.

In one embodiment, in the optical object discriminating device, a polarization state of light to be let incident on the measuring object is linear polarization.

With the optical object discriminating device of this embodiment, since the incident light on the measuring object is linearly polarized light, the incident light oscillates only in one direction. Thus, it becomes easier to evaluate the depolarization characteristic that the incident light is depolarized by the reflection on the measuring object.

In one embodiment, in the optical object discriminating device, linearly polarized light to be let incident on the measuring object is an S wave with respect to the measuring object.

With the optical object discriminating device of this embodiment, since the incident light beam to be let incident on the measuring object is an S wave, the beam is reflected as an S wave on condition that the plane of incidence of the measuring object is an optically smooth surface. Therefore, the reference polarization direction is maintained by reflection on the smooth plane. This makes it possible to evaluate the unevenness of the measuring object with high accuracy. Conversely, when the incident light beam to be let incident on the measuring object is a P wave, only components of some polarization directions contribute to the reflection, thus the P wave being unsuitable for high-accuracy evaluation of the unevenness of the measuring object.

In one embodiment, in the optical object discriminating device, a polarization direction selected by the polarization-state selector part and a polarization direction of light to be let incident on the measuring object are substantially identical to each other.

With the optical object discriminating device of this embodiment, since the polarization direction of light incident on the light receiving part is identical to the polarization direction of incident light, the depolarization characteristic by the unevenness of the reflecting surface can be measured with highest accuracy.

In one embodiment, in the optical object discriminating device, the light projecting part comprises:

a first light branching element which splits light emitted from the semiconductor light emitting element into a first beam and a second beam; and an objective part which condenses and applies the first beam onto the measuring object, and wherein the optical object discriminating device further comprises:

a condenser part which condenses light that has passed through the objective part out of the light reflected by the measuring object; and a pinhole part placed between the condenser part and the light receiving element.

With the optical object discriminating device of this embodiment, a pinhole part is present between the light receiving element and the condenser part, and signal light is condensed so as to pass through the pinhole on the pinhole part surface. Thus, noise light can be cut, so that light reflected by the measuring object can be received with high efficiency.

In one embodiment, the optical object discriminating device further comprises stray light prevention part which intercepts the second beam and reflected light of the second beam.

With the optical object discriminating device of this embodiment, it does not occur that light having no contribution to the signal acts as a noise source.

In one embodiment, in the optical object discriminating device, the stray light prevention part has a linear polarizer, and the linear polarizer is placed on an optical axis of the second beam and a polarization direction of light permitted by the linear polarizer to pass therethrough is a direction orthogonal to a polarization direction of the second beam.

With the optical object discriminating device of this embodiment, since the linear polarizer that transmits light of a polarization direction orthogonal to the polarization direction of the second beam is placed on the optical axis of the second beam, the second beam is absorbed by the linear polarizer. Therefore, it does not occur that the second beam is reflected by a device side wall or the like to mix into the light receiving part as noise light.

In one embodiment, in the optical object discriminating device, the condenser part includes a condenser lens, and the pinhole part is placed at a position of a focal length of the condenser lens.

With the optical object discriminating device of this embodiment, since the pinhole part is placed at the focal position of the condenser lens, the reflected light beam is condensed most on the pinhole part surface when the measuring object is located at the focal position of the objective lens contained in the objective part. When the measuring object is located at the focal position of the objective lens contained in the objective part, incident light is condensed most on the measuring object, where its light density becomes largest. In this case, therefore, the quantity of light that passes through the pinhole part becomes a maximum, so that the S/N ratio can be improved.

In one embodiment, in the optical object discriminating device, a diameter of a reflected beam at the position where the pinhole part is placed is smaller than a hole diameter of the pinhole part.

With the optical object discriminating device of this embodiment, since the hole diameter of the pinhole part is larger than the beam diameter on the pinhole part surface, it never occurs that signal light is cut by the pinhole part.

In one embodiment, in the optical object discriminating device, the first beam becomes incident on a substantially center of the objective part.

With the optical object discriminating device of this embodiment, since the first beam becomes incident on a substantially center of the objective part, light having a symmetrical depolarization characteristic about a specularly reflected light component in which a polarization state is preserved can be received by the light receiving part.

In one embodiment, in the optical object discriminating device, the first beam becomes incident on an end portion of the objective part.

With the optical object discriminating device of this embodiment, since the first beam is let incident on an end portion of the objective part, the specularly reflected light component of the reflected beam is condensed at the end portion of the objective part. The reflected beam condensed at around the spot on which the first beam has become incident is a light beam that shows a higher depolarization characteristic. Thus, the measuring object can be discriminated at higher accuracy.

In one embodiment, the optical object discriminating device further comprises:

an objective part which condenses light emitted by the semiconductor light emitting element onto the measuring object; and a light leading part which directs peripheral portion of reflected light beam by the measuring object toward the light receiving part, except an overlapping portion which overlaps with a light beam incident on the objective part, wherein the peripheral portion of the reflected light beam is detected by the light receiving part.

With the optical object discriminating device of this embodiment, the quantity of light having no contribution to the signal out of the light beam emitted by the semiconductor light emitting element can be reduced to a large extent, so that the contribution ratio of emitted light to the signal light can be enhanced. Thus, the quantity of light emission of the semiconductor light emitting element can be reduced, and current consumption can be reduced.

In one embodiment, the optical object discriminating device further comprises an optical axis changing part which changes a traveling direction of the second light beam split by the first light branching element, wherein the second beam having its optical axis changed and the first beam are substantially parallel in their optical axes, and the first and second beams are to become incident on one identical objective part.

With the optical object discriminating device of this embodiment, the contribution ratio of light emitted by the semiconductor light emitting element to the signal light can be enhanced so that the consumption current of the device can be reduced, and moreover the device can be constructed of common optical parts that require no special machining. Thus, the device fabrication becomes easier to achieve.

In one embodiment, in the optical object discriminating device, the light projecting part includes a first light branching element which splits a light beam emitted from the semiconductor light emitting element into a first beam and a second beam; and the optical object discriminating device further comprises a light splitting part which includes a second light branching element that splits light reflected by the measuring object into a first reflected beam and a second reflected beam, wherein the light receiving part has a first light receiving element which receives the first reflected beam and a second light receiving element which receives the second reflected beam, the polarization-state selector part has a polarization-state selector element which selects a polarization state of light incident on the first light receiving element, and the signal processing part calculates a ratio of a signal outputted by the first light receiving element to a signal outputted by the second light receiving element.

With the optical object discriminating device of this embodiment, a reflected beam is two-split into a first reflected beam and a second reflected beam by the second light branching element, and the first beam, which is one of the two split beams, is received by a first light receiving element via the polarization-state selector element (linear polarizer as an example) and its depolarization characteristic is measured. The second reflected beam, which is the other of the two split beams, is received in all directions by the second light receiving element without intervention of any linear polarizer. A signal received by the second light receiving element without intervention of any polarization-state selector element such as a linear polarizer contains information as to the reflectance of the measuring object. Accordingly, by the signal processing part calculating a ratio of a signal outputted by the first light receiving element to a signal outputted by the second light receiving element, degradation of the discrimination accuracy of the measuring object due to variations in reflectance of the surface of the measuring object can be prevented.

In one embodiment, in the optical object discriminating device, the light projecting part includes a first light branching element which splits a light beam emitted from the semiconductor light emitting element into a first beam and a second beam, and the optical object discriminating device further comprises a light splitting part which includes a second light branching element that splits light reflected by the measuring object into a first reflected beam and a second reflected beam, and wherein the light receiving part has a first light receiving element which receives the first reflected beam and a second light receiving element which receives the second reflected beam, and the polarization-state selector part has a first polarization-state selector element which selects a polarization state of light incident on the first light receiving element and a second polarization-state selector element which selects a polarization state of light incident on the second light receiving element, and a polarization direction selected by the first polarization-state selector element and a polarization direction selected by the second polarization-state selector element are substantially orthogonal to each other.

With the optical object discriminating device of this embodiment, a reflected beam is split into two beams, a first reflected beam and a second reflected beam, and then the first and second beams are received by the first and second light receiving elements respectively, via the first and second polarization-state selector elements (linear polarizers as an example) whose polarization directions of selection are orthogonal to each other. Thus, since signals outputted by the two light receiving elements serve for extraction of two components that are most different in depolarization characteristic to each other, discrimination accuracy for the measuring object can be improved.

In one embodiment, in the optical object discriminating device, at least one of a plurality of light beams selected by the polarization-state selector part is substantially parallel in polarization direction to light emitted from the semiconductor light emitting element.

According to this embodiment, since the ratio of intensities of the plurality of light beams that become incident on the light receiving element can be made to be the largest, the discrimination accuracy can effectively be improved.

In one embodiment, in the optical object discriminating device, a polarization direction selected by the first polarization-state selector element is substantially parallel to a polarization direction of the first light beam, and a polarization direction selected by the second polarization-state selector element is substantially vertical to a polarization direction of the first light beam.

With the optical object discriminating device of this embodiment, a reflected beam is split into two beams, a first reflected beam and a second reflected beam. As to the first beam, via the first polarization-state selector element (linear polarizer), which is so placed that its polarization direction of selection is the same as the polarization direction of the first beam, a depolarization characteristic is measured by the first light receiving element. On the other hand, as to the second reflected beam, via the second polarization-state selector element (linear polarizer), which is so placed that its polarization direction of selection is orthogonal to the polarization direction of the first beam, a depolarization characteristic is measured by the second light receiving element. With respect to the strength of signals outputted by the two light receiving elements, since polarization directions selected by the first and second polarization-state selector elements (linear polarizers) are orthogonal to each other, one signal strength is large while the other signal strength is small. Thus, it becomes achievable to evaluate the depolarization characteristic with high accuracy.

In one embodiment, in the optical object discriminating device, the first and second polarization-state selector elements are linear polarizers.

The optical object discriminating device of this embodiment, by virtue of its use of linear polarizers, is suitable for reception of light polarized in a particular direction.

In one embodiment, in the optical object discriminating device, the second light branching element and the first and second polarization-state selector elements are implemented each by a polarization beam splitter.

With the optical object discriminating device of this embodiment, by virtue of its use of a polarization beam splitters, the parts count can be cut down, as compared with optical systems in which a non-polarization beam splitter and a linear polarizer are used.

In one embodiment, in the optical object discriminating device, the signal processing part calculates a ratio of a signal outputted by the first light receiving element to a signal outputted by the second light receiving element.

With the optical object discriminating device of this embodiment, by the signal processing part calculating a ratio of outputs of the two light receiving elements, the accuracy of discrimination of the measuring object can be improved.

In one embodiment, in the optical object discriminating device, the signal processing part calculates a difference between a signal outputted by the first light receiving element and a signal outputted by the second light receiving element.

With the optical object discriminating device of this embodiment, by the arrangement that the selected polarization directions of the polarization-state selector elements (linear polarizers) corresponding to the two light receiving elements are orthogonal to each other, signals outputted by the two light receiving elements have such strength that while one signal strength is large, the other signal strength is small. Therefore, the smaller the degree of depolarization of the measuring object is, the larger the output signal difference becomes, so that high-accuracy discrimination of the measuring object can be achieved through calculation of the difference between the two output signals.

In one embodiment, in the optical object discriminating device, the signal processing part calculates:

a difference between a signal outputted by the first light receiving element and a signal outputted by the second light receiving element; and a ratio of the difference to a sum of a signal outputted by the first light receiving element and a signal outputted by the second light receiving element, or a ratio of the difference to a signal outputted by the first light receiving element or a signal outputted by the second light receiving element.

With the optical object discriminating device of this embodiment, the signal processing part calculates a ratio of a difference between output signals of the two light receiving elements to a sum of output signals of the two light receiving elements, or a ratio of a difference between output signals of the two light receiving elements to an output signal of the first light receiving element or an output signal of the second light receiving element.

In the calculation of these ratios, for example, a numerator, if given by the difference between output signals, represents a depolarization characteristic due to the surface state of the measuring object, and a denominator, if given by the sum of output signals of the two light receiving elements, represents a received signal attributable to the reflectance of the surface of the measuring object. Therefore, it becomes possible to achieve high-accuracy discrimination of the measuring object in which influence of variations in the reflectance of the surface of the measuring object is reduced.

In one embodiment, in the optical object discriminating device, the semiconductor light emitting element is a semiconductor laser.

With the optical object discriminating device of this embodiment, since a semiconductor laser is used as the semiconductor light emitting element, light density on the measuring object can be increased, so that the received signal strength can be increased. Thus, high-accuracy discrimination of the measuring object can be achieved.

In one embodiment, in the optical object discriminating device, the light receiving element is formed of a photodiode.

The optical object discriminating device of this embodiment, by virtue of its use of a photodiode as a light receiving element, is suitable for downsizing of the device construction and moreover capable of reducing its cost, thus quite preferable.

In one embodiment, in the optical object discriminating device, the first light receiving element and the second light receiving element are formed on one identical semiconductor substrate.

With the optical object discriminating device of this embodiment, since the first light receiving element (photodiode) and the second light receiving element (photodiode) are formed on one identical semiconductor substrate, the parts count can be cut down. Therefore, the manufacturing cost can be reduced.

In one embodiment, in the optical object discriminating device, the light receiving part and the signal processing part are formed on one identical semiconductor substrate.

With the optical object discriminating device of this embodiment, since the light receiving part and the signal processing part are formed on one identical semiconductor substrate, there is no need for any wire that interconnects the light receiving part formed of a photodiode or the like and the circuits of the signal processing part, so that noise level can be reduced and the parts count can be cut down. Therefore, the manufacturing cost can be reduced.

In one embodiment, in the optical object discriminating device, the first light receiving element, the second light receiving element and the signal processing part are formed on one identical semiconductor substrate.

With the optical object discriminating device of this embodiment, since the first and second light receiving elements (photodiodes) and the signal processing part are formed on one identical semiconductor substrate, the parts count can be further cut down and moreover the noise level can also be reduced.

Also in one embodiment, the light receiving part has a light receiving element group in which a plurality of light receiving elements are arrayed.

With the optical object discriminating device of this embodiment, it is implementable to measure the positional dependence of depolarization characteristics by reflection. Thus, higher-accuracy discrimination of the measuring object can be achieved, as compared with cases where one photodiode is used.

In one embodiment, in the optical object discriminating device, the signal processing part standardize signals of individual light receiving elements of the light receiving element group according to the strength of a signal of a light receiving element showing the highest strength out of the light receiving element group.

With the optical object discriminating device of this embodiment, since the positional dependence of depolarization characteristics are standardized by the highest value of signal strengths of the light receiving elements, influence of variations in the reflectance of the surface of the measuring object are reduced, and higher-accuracy discrimination of the measuring object can be achieved.

In one embodiment, in the optical object discriminating device, the objective part is implemented by an objective lens, and a distance between a focal position of the objective lens and the surface of the measuring object is changeable.

With the optical object discriminating device of this embodiment, since the distance between the focal position of the objective lens and the surface of the measuring object is changeable, the surface of the measuring object can be positioned at the focal position of the objective lens even with large unevenness of the measuring object. Therefore, the discriminable range of the measuring object can be widened.

In one embodiment, the optical object discriminating device further comprises a lens vibrating mechanism which vibrates the objective lens, wherein the distance between the focal position of the first lens and the surface of the measuring object is changed by changing a lens position of the objective lens by the lens vibrating mechanism.

With the optical object discriminating device of this embodiment, the lens vibrating mechanism for vibrating the objective lens is preferable as means for changing the distance between the focal position of the objective lens and the surface of the measuring object.

In one embodiment, in the optical object discriminating device, the lens vibrating mechanism has a cam.

With the optical object discriminating device of this embodiment, the lens vibrating mechanism, which is implemented by a cam, is preferable as a lens vibrating mechanism.

In one embodiment, in the optical object discriminating device, a cam curve of the cam is a sine-wave curve.

With the optical object discriminating device of this embodiment, since the cam curve of the cam is a sine-wave curve, a lens vibrating state can be calculated with a simple calculation, making it possible to obtain a lens position in any arbitrary time. Thus, a proper reflected light signal can be processed by the signal processing part.

In one embodiment, in the optical object discriminating device, the lens vibrating mechanism has a solenoid coil.

With the optical object discriminating device of this embodiment, a lens vibrating mechanism using suction force or thrust force by the solenoid coil as well as a spring can be made up.

In one embodiment, in the optical object discriminating device, the lens vibrating mechanism has a crank mechanism which transforms rotational motion into linear reciprocating motion.

With the optical object discriminating device of this embodiment, the lens vibrating mechanism can be simplified in construction by using a crank mechanism as the lens vibrating mechanism.

In one embodiment, in the optical object discriminating device, the lens vibrating mechanism has an actuator.

With the optical object discriminating device of this embodiment, the device construction can be downsized by using an actuator as the lens vibrating mechanism.

In one embodiment, in the optical object discriminating device, the lens vibrating mechanism vibrates the lens upon reception of an air flow by a blade attached to a lens holder.

With the optical object discriminating device of this embodiment, since motor or other component parts requiring driving force are not needed as the lens vibrating mechanism, the manufacturing cost for device construction can be reduced.

In one embodiment, in the optical object discriminating device, the objective lens is a progressive lens, and the distance between the focal position of the objective lens and the surface of the measuring object is changed by changing a position at which the first beam becomes incident on the progressive lens.

With the optical object discriminating device of this embodiment, the device construction can be downsized by using the progressive lens.

In one embodiment, in the optical object discriminating device, the distance between the focal position of the progressive lens and the surface of the measuring object is changed by shifting the progressive lens within a plane substantially vertical to the first beam.

With the optical object discriminating device of this embodiment, since the vibration width of the progressive lens serving as the objective lens can be reduced, the device construction can be downsized.

In one embodiment, in the optical object discriminating device, an optical switch including liquid crystals is placed on an optical axis of the first beam that is to become incident on the progressive lens.

With the optical object discriminating device of this embodiment, by virtue of the use of the optical switch using liquid crystals, the distance between the focal position of the progressive lens serving as the objective lens and the surface of the measuring object can be changed without causing vibrations of any component parts constituting the device. Therefore, the device construction can be simplified and downsized, and the reliability can be improved.

In one embodiment, in the optical object discriminating device, a variance of the distance between the focal position of the objective lens and the surface of the measuring object is set larger than heights of unevenness of the surface of the measuring object.

With the optical object discriminating device of this embodiment, since the variance of the distance between the focal position of the objective lens and the surface of the measuring object is larger than heights of unevenness of the surface of the measuring object, a reflected light signal from the focal position of the objective lens can reliably be obtained.

In one embodiment, in the optical object discriminating device, a variance of the distance between the focal position of the objective lens and the surface of the measuring object is 5 mm to 15 mm.

With the optical object discriminating device of this embodiment, since the variance of the distance between the focal position of the objective lens and the surface of the measuring object is set to 5 mm to 15 mm, most measuring objects that are discriminable can be covered.

In one embodiment, the optical object discriminating device includes:

an objective part which condenses and applies the first beam onto the measuring object;

a condenser part which condenses light that has passed through the objective part out of the light reflected by the measuring object; and a pinhole part placed between the condenser part and the first and second light receiving elements, wherein the objective part comprises an objective lens, and has a mechanism which changes a distance between a focal position of the objective lens and a surface of the measuring object, and wherein the signal processing part calculates a ratio of a focus signal which is an output of the first light receiving element in a focused state in which the distance between the objective lens and the measuring object surface is substantially equal to the focal length of the objective lens, to a defocus signal which is an output of the second light receiving element in a defocused state in which the distance between the objective lens and the measuring object surface is different from the focal length of the objective lens.

With the optical object discriminating device of this embodiment, by dividing a reflected light signal into two signals and using signals of the focused state and the defocused state, the discrimination accuracy of the measuring object can be improved.

In one embodiment, in the optical object discriminating device, the light projecting part includes an objective part which condenses and applies the first beam onto the measuring object;

a condenser part which condenses light that has passed through the objective part out of the light reflected by the measuring object; and a pinhole part placed between the condenser part and the first and second light receiving elements, wherein the objective part comprises an objective lens, and has a mechanism which changes a distance between a focal position of the objective lens and a surface of the measuring object, and wherein the signal processing part processes a focus signal which is an output of the first light receiving element in a focused state in which the distance between the objective lens and the measuring object surface is substantially equal to the focal length of the objective lens, and a defocus signal which is an output of the second light receiving element in a defocused state in which the distance between the objective lens and the measuring object surface is different from the focal length of the objective lens.

With the optical object discriminating device of this embodiment, reflected light is divided into two beams, a first reflected beam and a second reflected beam, and received by a first light receiving element and a second light receiving element, respectively. Then, a focus signal in a focused state outputted by the first light receiving element and a defocus signal in a defocused state outputted by the second light receiving element are measured as polarized components orthogonal to each other. Thus, the discrimination accuracy of the measuring object can be improved.

In one embodiment, in the optical object discriminating device, the signal processing part calculates a ratio of the focus signal to the defocus signal.

With the optical object discriminating device of this embodiment, by calculating the ratio of the focus signal to the defocus signal that are polarized components orthogonal to each other, the discrimination accuracy of the measuring object can be improved.

In one embodiment, in the optical object discriminating device, the signal processing part calculates a difference between the focus signal and the defocus signal.

With the optical object discriminating device of this embodiment, by the signal processing part calculating the difference between the focus signal and the defocus signal, the discrimination accuracy of the measuring object can be improved.

In one embodiment, in the optical object discriminating device, the signal processing part calculates a difference between the focus signal and the defocus signal, and calculates a ratio of the difference to the focus signal.

With the optical object discriminating device of this embodiment, since influence of variations in the reflectance of the surface of the measuring object can be reduced, the discrimination accuracy of the measuring object can be improved.

In one embodiment, in the optical object discriminating device, a modulation signal is applied to the semiconductor light emitting element to apply light intensity modulation, and wherein the signal processing part calculates a difference between a first output signal that the light receiving part outputs on condition that the modulation signal is at an H level, and a second output signal that the light receiving part outputs on condition that the modulation signal is at an L level.

With the optical object discriminating device of this embodiment, intensity modulation is applied to the semiconductor light emitting element, and the signal processing part calculates a difference between the first output signal and the second output signal corresponding to an H level and an L level of the modulation signal, respectively. Thus, disturbance light noise coming incident on the light receiving part can be eliminated.

In one embodiment, in the optical object discriminating device, the modulation signal applied to the semiconductor light emitting element is a rectangular wave.

With the optical object discriminating device of this embodiment, since the modulation signal applied to the semiconductor light emitting element is a rectangular wave, the disturbance-light-noise elimination effect can be improved.

In one embodiment, in the optical object discriminating device, an emission quantity of the semiconductor light emitting element upon the L level is substantially 0 W.

With the optical object discriminating device of this embodiment, since the emission quantity in the L level is substantially 0 W, disturbance light noise alone can be measured by the second output signal in the L level state. Therefore, the disturbance-light-noise elimination effect can be improved.

In one embodiment, in the optical object discriminating device, modulation frequency of the light intensity modulation is not lower than 50 kHz.

With the optical object discriminating device of this embodiment, since the semiconductor light emitting element is modulated at frequencies of and above the frequency band of general disturbance light noise, the disturbance-light-noise elimination effect can be improved.

In one embodiment, in the optical object discriminating device, modulation frequency of the light intensity modulation is 100 Hz to 10 kHz.

With the optical object discriminating device of this embodiment, since the frequency band of general disturbance light noise and the modulation frequency of the semiconductor light emitting element does not overlap with each other, the disturbance-light-noise elimination effect can be enhanced.

In one embodiment, in the optical object discriminating device, the signal processing part comprises:

a first sample-and-hold circuit which permits a first output signal derived from the light receiving part to pass therethrough as it is when the modulation signal is at an H level, and which samples and holds the first output signal obtained with the modulation signal at the H level when the modulation signal is at an L level;

a second sample-and-hold circuit which permits a second output signal derived from the light receiving part to pass therethrough as it is when the modulation signal is at an L level, and which samples and holds the second output signal obtained with the modulation signal at the L level when the modulation signal is at an H level; and a difference circuit which takes a difference between a signal outputted by the first sample-and-hold circuit and a signal outputted by the second sample-and-hold circuit.

With the optical object discriminating device of this embodiment, the first sample-and-hold circuit samples and holds the first output signal in the H level state, and the second sample-and-hold circuit samples and holds the second output signal in the L level state. Then, the difference circuit calculates a difference between the first output signal and the second output signal. Thus, a circuit construction for eliminating disturbance light noise can be realized.

In one embodiment, in the optical object discriminating device, the signal processing part has:

an amplification part which amplifies a signal detected by the light receiving part; and an amplification degree changing part which changes over an amplification degree of the amplification part in response to a signal strength of the light receiving part.

In one embodiment, in the optical object discriminating device, the amplification degree changing part holds a signal strength of the amplification part at a specified time and compares the held value with a reference value to determine an amplification degree of the amplification part.

With the optical object discriminating device of this embodiment, by holding the signal strength at a specified time, the amplification degree can be changed over with the use of the signal strength at a desired time in signal strength that varies with time.

In one embodiment, in the optical object discriminating device, the signal processing part has:

an amplification part which amplifies a signal detected by the light receiving part; and an amplification degree changing part which changes over an amplification degree of the amplification part in response to a signal strength of the light receiving part, the amplification degree changing part holds a signal strength of the amplification part at a specified time and compares the held value with a reference value to determine an amplification degree of the amplification part, the amplification part further has a first amplifier and a second amplifier, and the amplification degree changing part has a first amplification degree changer and a second amplification degree changer and a peak hold circuit part and a sample-and-hold circuit part, the signal processing part has:

a first signal processing circuit to which a signal detected by the first light receiving element is inputted and which has the first amplifier and the peak hold circuit and the first amplification degree changer; and a second signal processing circuit to which a signal detected by the second light receiving element is inputted and which has the second amplifier and the sample-and-hold circuit and the second amplification degree changer, wherein the first amplification degree changer determines an amplification degree of the first amplifier based on an output value of the peak hold circuit, and the second amplification degree changer determines an amplification degree of the second amplifier based on an output of the sample-and-hold circuit.

With the optical object discriminating device of this embodiment, the first amplification degree changer determines the amplification degree of the first amplifier based on an output value of the peak hold circuit, while the second amplification degree changer determines the amplification degree of the second amplifier based on an output value of the sample-and-hold circuit. Thus, it is preferable to use a peak hold circuit for determination of the amplification degree of the first amplifier and use a sample-and-hold circuit for determination of the amplification degree of the second amplifier.

In one embodiment, in the optical object discriminating device, the signal processing part has a function of holding an output signal of the amplification part, and by using a modulation signal applied to the semiconductor light emitting element, determines a timing for holding an output signal of the amplification part in order to compare with the reference value.

With the optical object discriminating device of this embodiment, by using a pulse signal which is to be used as the modulation signal for the semiconductor light emitting element, it becomes easily achievable to hold the output signal of the amplification part at any necessary time.

In one embodiment, in the optical object discriminating device, the first signal processing circuit has a peak position detecting part which detects a time point at which the peak hold circuit holds a peak value of a focus signal, which is an output of the first light receiving element in the focused state, as a reference time, and the second signal processing circuit has a timing detection part which determines a timing for the sample-and-hold circuit to sample and hold a defocus signal, which is output of the second light receiving element in the defocused state, based on the reference time detected by the peak position detecting part and the modulation signal applied to the semiconductor light emitting element.

With the optical object discriminating device of this embodiment, the time at which the defocus signal is to be sampled and held by the sample-and-hold circuit of the second signal processing circuit is determined by using as a reference time the time at which the peak position of the focus signal is detected by the peak position detecting part of the first signal processing circuit. Thus, the timing at which the defocus signal is to be sampled and held can be determined with easy and high accuracy.

In one embodiment, in the optical object discriminating device, the amplification degree changing part increases or decreases the amplification degree of the amplification part by one step when the output signal level of the amplification part is out of a set reference value range.

With the optical object discriminating device of this embodiment, since changeover of the amplification degree by the amplification degree changer is performed by one step, the circuit construction having a circuit function for selecting a targeted amplification degree can be simplified.

In one embodiment, in the optical object discriminating device, the amplification part included in the signal processing part has an amplifier group in which a plurality of amplifiers are connected in series.

With the optical object discriminating device of this embodiment, since the amplification part is provided by a serial connection of a plurality of amplifiers, the amplification degree can be divided by the plurality of amplifiers. Thus, even when a circuit construction of a large amplification degree is necessary, the circuit operation can be stabilized.

In one embodiment, in the optical object discriminating device, the amplification degree changing part opens input connection resistances of specified amplifiers out of the amplifier group in setting the amplification part to a specified amplification degree.

With the optical object discriminating device of this embodiment, whereas some amplifiers in the amplifier group need to be given by using those of small amplification degrees in a case where the dynamic range of signal amplification is very wide, the amplification degree can be set to 1 by setting the input resistances of the amplifiers. Thus, a wide dynamic range of amplification degree and stable circuit operation can be implemented.

In one embodiment, in the optical object discriminating device, the first signal processing circuit outputs a first signal containing the focus signal, the second signal processing circuit outputs a second signal containing the defocus signal, and the signal processing part has an A/D conversion part which digitizes the first signal and the second signal, and a digital signal processing circuit which calculates a ratio of the focus signal to the defocus signal, or a difference between the focus signal and the defocus signal, or a ratio of a difference between the focus signal and the defocus signal to the focus signal, based on a first amplification degree signal representing an amplification degree of the first amplifier, a second amplification degree signal representing an amplification degree of the second amplifier and the first and second signals digitized by the A/D conversion part.

With the optical object discriminating device of this embodiment, in the signal processing part, as means for calculating the ratio or difference of the focus signal and the defocus signal, first and second signals outputted by the first and second signal processing circuits, respectively, are converted from analog to digital form by the A/D conversion part and digitally processed by the signal processing part. Thus, desired calculations can be fulfilled simply.

In one embodiment, in the optical object discriminating device, the digital signal processing circuit has a memory which accumulates the first signal and the second signal both digitized, and the memory has such storage capacity that waveform data of at least half a period or more in changes of the focal position can be accumulated for each of the first signal and the second signal.

With the optical object discriminating device of this embodiment, by virtue of the provision of the memory capable of storing waveform data of the digitized first and second signals each by at least half a period or more, a signal of a targeted time can reliably taken out of the memory and put into use.

In one embodiment, in the optical object discriminating device, the digital signal processing circuit has a memory which stores the first signal and the second signal both digitized, and the memory accumulates waveform data of one period in changes of the focal position for each of the first signal and the second signal.

With the optical object discriminating device of this embodiment, by storing waveform data of the digitized first and second signals each by one period, a targeted time can be used with higher efficiency.

In one embodiment, in the optical object discriminating device, the first signal processing circuit has a peak position detecting part which detects a time point at which the peak hold circuit holds a peak value of the focus signal as a reference time, and the second signal processing circuit has a timing detection part which determines a timing for the sample-and-hold circuit to sample and hold the defocus signal based on the reference time detected by the peak position detecting part and a modulation signal applied to the semiconductor light emitting element, the A/D conversion part starts an A/D conversion with a trigger signal given by detection of the reference time by the peak position detecting part of the first signal processing circuit, and the digital signal processing circuit has a memory which stores analog-to-digital converted digital data.

With the optical object discriminating device of this embodiment, the A/D conversion by the A/D conversion part is started with a trigger signal given by a reference time for the peak position of a focus signal detected by the peak position detecting part of the first signal processing circuit. Then, by accumulating the analog-to-digital converted signal waveforms in the memory, a means for performing the calculation of desired data can be provided simply.

In one embodiment, in the optical object discriminating device, in a process of accumulating digital data into the memory starting at the reference time detected by the peak position detecting part of the first signal processing circuit, during a time period from the reference time until a time point when the sample-and-hold circuit part starts sampling and holding at a timing determined by the timing detection part of the second sample-and-hold circuit, when the peak position detecting part detects a new reference time, digital data that have been stored in the memory by the new reference time are all cleared, the A/D conversion part starts A/D conversion of first and second signals with a trigger signal given by the detection of the new reference time by the peak position detecting part, wherein digital data are stored in the memory.

With the optical object discriminating device of this embodiment, by the first and second signal processing circuits of the above construction, even if a peak position is detected again because of large unevenness of surface of the measuring object by the first signal processing circuit during a time period from a detection of a peak position by the first signal processing circuit until a time point when the second signal processing circuit starts a desired sampling and holding, digital data of signal waveform start to be accumulated once more in the memory from the time of the new peak position detection. Thus, there is no possibility of performing calculations using erroneous waveforms, so that the discrimination accuracy of the measuring object can be improved.

In one embodiment, in the optical object discriminating device, the digital signal processing circuit based on a reference time detected by the peak position detecting part, extracts a focus signal at the reference time contained in the first signal as well as a defocus signal at a specified time contained in the second signal from among digital data stored in the memory, based on a first amplification degree signal representing an amplification degree of a first amplifier of the first signal processing circuit and a second amplification degree signal representing an amplification degree of a second amplifier of the second signal processing circuit, calculates a ratio of the focus signal to the defocus signal, or a difference between the focus signal and the defocus signal, or a ratio of a difference between the focus signal and the defocus signal to the focus signal.

With the optical object discriminating device of this embodiment, the digital signal processing circuit extracts, to do calculation, a focus signal at a reference time by the first signal and a defocus signal at a specified time by the second signal from among digital data of signal waveform accumulated in the memory. In this signal processing, the digital signal processing circuit uses desired timing signals representing a reference time and a specified time, respectively, by a first signal and a second signal of the first signal processing circuit part as well as first and second amplification degree signals. Thus, signal processing is simplified and facilitated, allowing calculations to be achieved quickly.

In one embodiment, in the optical object discriminating device, the digital signal processing circuit has a digital signal computing part which detects a peak position of the first signal based on the digitized first signal within the digital data stored in the memory, on an assumption that time data of the peak position detected by the digital signal computing part is taken as a reference time, extracts a focus signal at the reference time, from the digitized second signal within the digital data stored in the memory, extracts a defocus signal at a specified time determined by the timing detection part based on the reference time and the modulation signal, and calculates a ratio of the focus signal to the defocus signal, or a difference between the focus signal and the defocus signal, or a ratio of a difference between the focus signal and the defocus signal to the focus signal, based on a first amplification degree signal representing an amplification degree of the first amplifier and a second amplification degree signal representing an amplification degree of the second amplifier.

With the optical object discriminating device of this embodiment, the digital signal processing circuit has the digital signal computing circuit, and digitally processes time data (reference time) of the peak position of the first signal and the defocus signal at a desired time of the second signal by using digital data representing signal waveforms accumulated in the memory. Thus, the need for circuits for use of timing measurement of the first signal processing circuit and the second signal processing circuit is eliminated, so that circuit construction can be simplified.

In one embodiment, in the optical object discriminating device, the digital signal processing circuit, in a process of extracting the focus signal and the defocus signal from among digital data stored in the memory, extracts, as a focus signal, a plurality of times before and after the reference time, or a plurality of times before the reference time, or an average value of a plurality of focus signals at a plurality of times after the reference time within the digital data stored in the memory, extracts, as a defocus signal, a plurality of times before and after a specified time determined by the timing detection part based on the reference time and the modulation signal, or a plurality of times before the reference time, or an average value of a plurality of defocus signals at a plurality of times after the reference time within the digital data stored in the memory, and calculates a ratio of the focus signal to the defocus signal, or a difference between the focus signal and the defocus signal, or a ratio of a difference between the focus signal and the defocus signal to the focus signal, based on a first amplification degree signal representing an amplification degree of the first amplifier of the first signal processing circuit and a second amplification degree signal representing an amplification degree of the second amplifier of the second signal processing circuit.

With the optical object discriminating device of this embodiment, in extracting a focus signal and a defocus signal at a desired time from within digital data representing signal waveforms accumulated in the memory, an average value of signal strength of a plurality of focus signals and defocus signals around a desired time is used. Thus, errors due to noise can be reduced.

In one embodiment, in the optical object discriminating device, the digital signal processing circuit in a process of discriminating the measuring object by calculating a ratio of the focus signal to the defocus signal, or a difference between the focus signal and the defocus signal, or a ratio of a difference between the focus signal and the defocus signal to the focus signal, performs the calculation to a plurality of times, and calculates an average of results of these plurality of times of calculations to thereby discriminate the measuring object.

With the optical object discriminating device of this embodiment, since the measuring object is discriminated by averaging results of a plurality of times of calculations using a focus signal and a defocus signal, the discrimination accuracy of the measuring object can be improved.

In one embodiment, in the optical object discriminating device, when a distance to the measuring object is larger than a specified value, light emission of the semiconductor light emitting element is turned off or decreased.

With the optical object discriminating device of this embodiment, when the distance to the measuring object becomes larger than a specified value, output of the semiconductor light emitting element is turned off or decreased. As a result, standby power in a state in which measurement is unnecessary can be reduced, and moreover the possibility that emitted light may harm human bodies or the like can be prevented.

In one embodiment, in the optical object discriminating device, emission state of the semiconductor light emitting element meets Class 1 of Safety Standards for laser products.

With the optical object discriminating device of this embodiment, even if laser light from the device should become incident directly on human eyes, there is no possibility that human bodies may be harmed.

In one embodiment, in the optical object discriminating device, the objective part is implemented by an objective lens;

an optical window is formed at part of a casing;

a distance between the objective lens and the optical window is shorter than a focal length of the objective lens.

With the optical object discriminating device of this embodiment, by virtue of this constitution, even in cases where dust or some other object that causes light to be scattered or diffused is deposited on the optical window through which the first beam is outputted, reflected light derived from the deposit hardly becomes incident on the light receiving part because the reflected light is out of the focal length of the objective lens. Therefore, misoperations in the discrimination of the measuring object can be prevented.

In one embodiment, there is provided a cleaner in which the optical object discriminating device described above is mounted in a head portion of the cleaner. With this cleaner, discrimination of the measuring-object floor surface can be automatically performed, preferably.

In a self-propelled cleaner of one embodiment, the optical object discriminating device described above is mounted. This self-propelled cleaner is enabled to automatically detect the type of a floor surface while running by itself, most preferably.

In one embodiment, in the optical object discriminating device, the light projecting part collimates light emitted from the semiconductor light emitting element and applies the light toward the measuring object, and the optical object discriminating device further comprises:

a condenser part which condenses light that is applied from the light projecting part and then is reflected by the measuring object; and a light splitting part which splits light derived from the condenser part into a plurality of divided beams, wherein the polarization-state selector part selects beams of mutually different polarization directions out of the plurality of split beams, and the light receiving part receives the plurality of beams selected by the polarization-state selector part.

According to this embodiment, light emitted from the semiconductor light emitting element is collimated by the light projecting part and moreover applied to a measuring object. Light reflected by this measuring object is condensed by the condenser part, and the condensed light is split into a plurality of split beams by the light splitting part. With respect to the plurality of split beams, beams of mutually different polarization directions are selected by the polarization-state selector part, and the beams selected by the polarization-state selector part are received by the light receiving part, and then a signal derived from the light receiving part is processed by the signal processing part. Since the polarization state of reflected light reflected by the surface changes in response to the state of the surface of the measuring object, the type of the measuring object is discriminated based on intensities of beams of a plurality of polarization directions received by the light receiving part.

Since the light projecting part collimates light emitted from the semiconductor light emitting element and outputs the light toward the measuring object, there is no need for, for example, a condenser lens and a driving system for setting the focal point of the condenser lens coincident with the measuring object. Accordingly, the optical system and mechanism for applying light to the measuring object can be relatively simplified, so that cost reduction and downsizing becomes implementable.

In addition, the light projecting part has only to be capable of generating light that can be treated substantially as collimated light, and perfect collimated light does not necessarily need to be generated.

In one embodiment, in the optical object discriminating device, polarization directions of a plurality of beams selected by the polarization-state selector part are orthogonal to each other.

In this embodiment, since the polarization directions of the plurality of beams are orthogonal to each other, the ratio of intensity of the plurality of beams incident on the light receiving part can be made larger, so that the discrimination accuracy can be improved.

In one embodiment, in the optical object discriminating device, an angle formed by an optical axis of the light projecting part and the measuring object and an angle formed by an optical axis of the condenser part and the measuring object are substantially equal to each other.

In this embodiment, since a specular reflection component of light applied from the light projecting part can be condensed by the condenser part, the quantity of light received by the light receiving part from the condenser part via the light splitting part and the polarization-state selector part can be made relatively larger. Accordingly, the discrimination accuracy can be improved.

In one embodiment, the optical object discriminating device further comprises a light branching part which is placed between the light projecting part and the measuring object and which branches a light beam derived from the light projecting part into a plurality of light beams, wherein at least one of the plurality of light beams branched by the light branching part becomes incident on the measuring object at an incident angle of substantially zero degrees.

In this embodiment, even if the position of the surface of the measuring object has changed in a direction vertical to the surface of the detection-objected part with respect to the light projecting part and the condenser part, a change in the quantity of light condensed by the condenser part is relative small. Therefore, degradation of the discrimination accuracy due to changes in the surface position of the measuring object can be prevented.

In one embodiment, the optical object discriminating device further comprises a linear polarizer which attenuates light other than light that becomes incident on the measuring object at an incident angle of substantially zero degrees out of a plurality of beams branched by the light branching part.

In this embodiment, the linear polarizer absorbs a specified component of, and thereby attenuates, light that is other than light that becomes incident on the measuring object at an incident angle of substantially zero degrees out of a plurality of beams branched by the light branching part and that does not contribute to the discrimination of the measuring object. Therefore, such disadvantages as the possibility that the light may be reflected by the casing so as to become incident on the light receiving part and result in stray light can be prevented, so that the discrimination accuracy can be improved.

In one embodiment, in the optical object discriminating device, a polarization direction of a beam polarized by the linear polarizer is substantially orthogonal to a polarization direction of a beam emitted by the semiconductor light emitting element.

In this embodiment, intensity of light that does not contribute to the discrimination of the measuring object can be attenuated most efficiently. Therefore, stray light that becomes incident on the light receiving part can be effectively reduced so that the discrimination accuracy of the measuring object can be improved.

In one embodiment, in the optical object discriminating device, an incident angle of incidence on the linear polarizer for light beams other than the light beam that becomes incident on the measuring object at the angle of substantially zero degrees out of a plurality of light beams branched by the light branching part is set to such an angle that their specularly reflected light does not become incident on the light receiving part.

In this embodiment, reflected light of light that does not contribute to the discrimination of the measuring object can be prevented from becoming incident on the light receiving part, so that the discrimination accuracy of the measuring object can be improved.

In one embodiment, in the optical object discriminating device, the condenser part is implemented by a plurality of lenses.

In this embodiment, light reflected by the measuring object can be condensed by the condenser part with high efficiency.

In one embodiment, in the optical object discriminating device, the condenser part is implemented by one lens.

In this embodiment, the optical system of the condenser part can be made small-sized and low-priced, allowing a cost reduction of the optical object discriminating device to be achieved.

In one embodiment, in the optical object discriminating device, a lens of the condenser part closest to the measuring object is so formed that a focus of the lens is positioned on the measuring object.

In this embodiment, since light that has passed through a lens closest to the measuring object is formed into collimated light in the condenser part, the condenser part is enabled to achieve efficient condensation of light reflected by the measuring object.

In one embodiment, in the optical object discriminating device, the light branching part is formed by a cubic type beam splitter.

In this embodiment, measurement efficiency can be improved by suppressing loss of light quantity at the light branching part, and moreover light can be let incident on the measuring object and further reflected light can be led thereto by one beam splitter. Thus, the optical system can be made simple and low in price.

In one embodiment, in the optical object discriminating device, a length of one side of the cubic type beam splitter meets a condition expressed by following Equation (1):

$$\alpha \geq (a+L) \times d/f \quad (1)$$

where '$\alpha$' is the length of one side of the beam splitter, '$a$' is a diameter of a spot at which light from the light projecting part is applied to the measuring object, '$L$' is a diameter of a lens of the condenser part closest to the measuring object, '$f$' is a focal length of the lens, and '$d$' is a distance along an optical axis from a light application surface of the measuring object to a surface of the beam splitter on its one side closer to the measuring object.

In this embodiment, the beam splitter can be set to such a size that almost no loss of light is involved. Therefore, loss of light quantity can be suppressed and degradation of the discrimination efficiency can be prevented.

In one embodiment, in the optical object discriminating device, the light branching part is formed of a half mirror.

In this embodiment, by making the half mirror inclined against the traveling direction of light from the light projecting part, incidence of stray light on the light receiving part can be prevented efficiently.

In one embodiment, in the optical object discriminating device, lengths of two sides of the half mirror meet conditions expressed by following Equations (2) and (3):

$$\alpha \geq (a+L) \times d/f \quad (2)$$

$$\beta \geq 2^{1/2}(a+L) \times d/f \quad (3)$$

where '$\alpha$' is the length of one side of the half mirror, '$\beta$' is the length of the other side of the half mirror, '$a$' is a diameter of a spot at which light from the light projecting part is applied to the measuring object, '$L$' is a diameter of a lens of the condenser part closest to the measuring object, '$f$' is a focal length of the lens, and '$d$' is a distance along an optical axis from a light application surface of the measuring object to a surface of the beam splitter on its one side closer to the measuring object.

In this embodiment, since the half mirror can be set to such a size that almost no loss of light is involved. Therefore, loss of light quantity can be suppressed and degradation of the discrimination efficiency can be prevented.

In one embodiment, in the optical object discriminating device, the light splitting part is formed of a beam splitter.

In this embodiment, reflected light condensed by the condenser part is split by the beam splitter. Therefore, loss of light quantity can be suppressed and degradation of the discrimination efficiency can be prevented.

In one embodiment, in the optical object discriminating device, the light splitting part is formed of a diffraction grating.

In this embodiment, the light splitting part is formed of a diffraction grating. Therefore, reflected light condensed by the condenser part can be split with simplicity and low cost.

In one embodiment, in the optical object discriminating device, out of light diffracted by the diffraction grating, +1st-order diffracted light and −1st-order diffracted light are polarized by the polarizer.

In this embodiment, the +1st-order diffracted light and the −1st-order diffracted light are substantially equal in light quantity to each other. Therefore, by performing the discrimination process with the +1st-order diffracted light and the −1st-order diffracted light, the discrimination accuracy of the measuring object can be improved.

In one embodiment, in the optical object discriminating device, the diffraction grating of which the light splitting part is formed has such a grating groove depth that a light quantity of the 0th-order diffracted light is made substantially zero.

In this embodiment, the light quantity of the 0th-order diffracted light by the diffraction grating is set to substantially zero, it becomes possible to almost entirely eliminate the light quantity of order numbers that are out of contribution to the discrimination. Thus, the quantity of light received by the light receiving part is increased, so that the discrimination accuracy of the measuring object can be increased.

In one embodiment, in the optical object discriminating device, the diffraction grating forming the light splitting part is a blazed type one.

In this embodiment, using a blazed type diffraction grating makes it possible to increase the diffraction efficiency of diffracted light of a specified order, allowing the discrimination accuracy to be improved.

In one embodiment, in the optical object discriminating device, 0-th diffracted light and 1st-order diffracted light out of light diffracted by the blazed type diffraction grating are polarized by linear polarizers.

In this embodiment, since the 0th-order diffracted light and the 1st-order diffracted light are larger in light quantity than the other diffracted light, the discrimination efficiency can be enhanced by enhancing the use efficiency of light.

In one embodiment, in the optical object discriminating device, 0th-order diffracted light and 1st-order diffracted light diffracted by the blazed type diffraction grating are substantially equal in light quantity to each other.

In this embodiment, since the discrimination of the measuring object is performed based on mutually substantially equal 0th-order diffracted light and 1st-order diffracted light, the discrimination accuracy can be improved.

In one embodiment, in the optical object discriminating device, the polarization-state selector part is formed of two linear polarizers whose polarization directions are orthogonal to each other.

In this embodiment, since polarization components contained in reflected light by the measuring object can be analyzed with high accuracy, changes in polarization characteristics by reflection on the measuring object can be analyzed effectively, so that the discrimination accuracy of the measuring object can be improved.

In one embodiment, in the optical object discriminating device, the light splitting part and the polarization-state selector part are integrally formed by a polarization beam splitter.

In this embodiment, since the light splitting part and the polarization-state selector part can be formed by one polarization beam splitter, the parts count can be cut down, allowing a cost reduction and a downsizing to be achieved.

In one embodiment, in the optical object discriminating device, the light receiving part is formed of two photodiodes.

In this embodiment, since the light receiving part is formed of two photodiodes, the discrimination accuracy can be made relatively high and the optical system can be made up with simplicity and low cost.

In one embodiment, in the optical object discriminating device, the light receiving part is formed of a divided type photodiode having a plurality of light receiving areas.

In this embodiment, since a plurality of light beams can be received by one divided type photodiode as described above, space for placement of the light receiving part can be reduced, allowing a small-size optical object discriminating device to be obtained.

It is noted that the divided type photodiode refers to a photodiode in which a plurality of light receiving areas are formed on one chip.

In one embodiment, in the optical object discriminating device, the semiconductor light emitting element is a laser diode.

In this embodiment, the laser diode has a substantially single polarization direction of its emitted light, light to be applied to the measuring object can be obtained without using, for example, a polarizer or the like.

In one embodiment, in the optical object discriminating device, the semiconductor light emitting element is formed of an LED with which a linear polarization element is provided.

In this embodiment, by combining the LED and the linear polarization element together, light of a substantially single polarization direction can be obtained with relatively low cost.

In one embodiment, in the optical object discriminating device, light to be applied to the measuring object is linearly polarized light.

In this embodiment, since linearly polarized light is applied to the measuring object, changes in polarized light in correspondence to the type of this measuring object can be detected with high accuracy. Thus, the measuring object can be discriminated with high accuracy.

In one embodiment, in the optical object discriminating device, a spot of light applied to the measuring object has a diameter of 1 mm or more.

In this embodiment, since influence of disturbance at the application surface of the measuring object is relatively small, degradation of the discrimination efficiency can be prevented.

In one embodiment, in the optical object discriminating device, the signal processing part has a plurality of amplifiers connected in series.

In this embodiment, even if light received by light receiving part is weak because of a low reflectance of the measuring object so that a signal derived from the light receiving part is weak, the received signal can be amplified to a specified level.

In one embodiment, in the optical object discriminating device, the signal processing part calculates a ratio of two signals derived from the two photodiodes.

In this embodiment, since polarization characteristics of light reflected by the measuring object can be detected with high accuracy, the discrimination accuracy of the measuring object can be improved.

In one embodiment, in the optical object discriminating device, the signal processing part calculates a ratio of a plurality of signals derived from the divided type photodiode.

In this embodiment, since polarization characteristics of light reflected by the measuring object can be detected with high accuracy, the discrimination accuracy of the measuring object can be improved.

In one embodiment, in the optical object discriminating device, the signal processing part calculates a ratio of a sum of two signals derived from the two photodiodes to a difference between the two signals.

In this embodiment, change characteristics of polarization due to the surface state of the measuring object can be obtained by the difference between the two signals, while a quantity of reflected light at the surface of the measuring object can be obtained by the sum of the two signals. Even when variations in the reflectance of the surface of the measuring object are involved, influence of variations in the reflectance can be reduced by calculating the ratio, making it possible to achieve high-accuracy discrimination.

In one embodiment, in the optical object discriminating device, the signal processing part calculates a ratio of a sum of a plurality of signals derived from the divided type photodiode to a difference between the plurality of signals.

In this embodiment, change characteristics of polarization due to the surface state of the measuring object can be obtained by the difference between the two signals, while a quantity of reflected light at the surface of the measuring object can be obtained by the sum of the two signals. Even when variations in the reflectance of the surface of the measuring object are involved, influence of variations in the reflectance can be reduced by calculating the ratio, making it possible to achieve high-accuracy discrimination.

In a self-propelled cleaner of the present invention, the optical object discriminating device as described above is mounted.

In this embodiment, since the self-propelled cleaner includes the optical object discriminating device, there can be obtained a self-propelled cleaner capable of, while running by itself, detecting the type of the floor surface with high accuracy and performing the cleaning properly in response to the type.

In one embodiment, in the optical object discriminating device, the light projecting part has a first light branching element which splits light emitted from the semiconductor light emitting element into a first beam and a second beam, and moreover applies the first beam to the measuring object, and the optical object discriminating device further comprises:

a condenser part which includes a first condenser lens that condenses reflected light reflected by the measuring object; and a light splitting part which includes a second light branching element that splits a light beam condensed by the condenser part into a first reflected beam and a second reflected beam, and wherein the polarization-state selector part has a first linear polarizer to which the first reflected beam is to be incident and which permits a component of the first reflected beam of a specified polarization direction to pass therethrough, and a second linear polarizer to which the second reflected beam is to be incident and which permits a component of the second reflected beam of a polarization direction orthogonal to the specified polarization direction to pass therethrough, the light receiving part has a first light receiving element which receives the first reflected beam that has passed through the first linear polarizer and a second light receiving element which receives the second reflected beam that has passed through the second linear polarizer, the signal processing part, to which a first light reception signal outputted by the first light receiving element and a second light reception signal outputted by the second light receiving element are inputted, measures polarization information as to the reflected light based on the first and second light reception signals, and a specularly reflected light component out of the reflected light reflected by a surface of the measuring object becomes incident on places within light receiving surfaces of the first and second light receiving elements via the condenser part.

In this embodiment, a first beam split by the first light branching element of the light projecting part is applied to a measuring object, and reflected light reflected by the measuring object is condensed by the condenser part. The condensed beam is split into first and second reflected beams by the second light branching element. After passing through the first and second linear polarizers, the first and second beams whose polarization directions are orthogonal to each other are received by the first and second light receiving elements. Then, received signals detected by the first and second light receiving elements processed by the signal processing circuit part, by which depolarization characteristics of reflected beams reflected by the measuring object are evaluated. According to this invention, received signals that change in response to surface roughness of the measuring object are obtained, and the type of the measuring object can be discriminated.

In this embodiment also, specular reflection components of the reflected beams reflected by the surface of the measuring object become incident on the light receiving surfaces of the first and second light receiving elements via the condenser part. That is, in this invention, even when the first beam from the light projecting part has become incident obliquely on the surface of the measuring object with a change in its incident angle thereon, the optical system is enabled to receive specularly reflected light components corresponding to the angle of the oblique incidence by means of the first and second light receiving elements.

Accordingly, in this embodiment, even when the optical object discriminating device and the measuring object surface are inclined relative to each other so that the incident angle of the first beam incident on the surface of the measuring object has changed, specularly reflected light components containing information as to the surface state of the measuring object can be led to the first and second light receiving elements. Therefore, with the optical object discriminating device of this invention, even with a relative inclination against the surface of the measuring object, degradation of the discrimination accuracy of the surface state of the measuring object does not occur and high-accuracy discrimination of the measuring object can be achieved.

In one embodiment, in the optical object discriminating device, assuming that a focal length of the first condenser lens is f (mm) and an optical path ranging from the measuring object via the first light branching element to the first condenser lens is a1 (mm), following Equation (4) is satisfied:

$$f < a1 \qquad (4).$$

With the optical object discriminating device of this constitution, the optical path length a1 (mm) between the first condenser lens and the measuring object is longer than the focal length f (mm). Therefore, even when the incident angle θ of the first beam incident on the surface of the measuring object has changed, the specular-reflection optical axis of reflected light reflected by the surface of the measuring object is directed toward the light receiving surface of the light receiving element. Therefore, the discrimination accuracy of the measuring object can be improved.

In one embodiment, in the optical object discriminating device, assuming that a radius of the first condenser lens is r1 (mm) and an angle formed by the first light beam and a normal line of the surface of the measuring object is θ (radian), following Equation (5) is satisfied:

$$\tan^{-1}(r1/a1) > 2\theta \qquad (5).$$

With the optical object discriminating device of this constitution, a double of the incident angle θ of the first beam on the measuring object surface is set smaller than the arctangent of a value resulting from dividing the radius r1 (mm) of the first condenser lens by the optical path length a1 (mm) between the first condenser lens and the measuring object. As a result of this, even when the incident angle θ of the first beam incident on the surface of the measuring object has changed, specularly reflected light containing the information as to the surface state of the measuring object securely becomes incident on the first condenser lens and is diffracted by the first condenser lens toward the first and second light receiving elements. Therefore, the discrimination accuracy of the measuring object can be improved.

In one embodiment, in the optical object discriminating device, assuming that a distance of an optical path ranging from the first condenser lens via the second light branching element to the first and second light receiving elements is b1 (mm), following Equation (6) is satisfied:

$$1/f = (1/a1) + (1/b1) \qquad (6).$$

With the optical object discriminating device of this constitution, the focal length f of the first condenser lens, the optical path length between the first condenser lens and the measuring object, and the optical path length between the first condenser lens and the first and second light receiving elements satisfy the relationship of Gauss' lens formula. Accordingly, even when the incident angle of the first beam incident on the surface of the measuring object has changed, specularly reflected light components of reflected light containing information as to the surface state of the measuring object can be condensed onto the light receiving surfaces of the first and second light receiving elements. Thus, signal light (first and second reflected beams) can be received by the first and second light receiving elements with high efficiency, and higher-accuracy discrimination of the measuring object can be achieved.

In one embodiment, in the optical object discriminating device, assuming that a radius of the first condenser lens is r1 (mm), a length of one side of the second light branching element is Lb (mm), and a distance between a reflecting surface of the second light branching element and the first and second light receiving elements is x1 (mm), then following Equation (7) is satisfied:

$$x1 < (Lb/2) \cdot (b1 - r1)/r1 \qquad (7).$$

With the optical object discriminating device of this constitution, the distance x1 between the second light branching element and the first, second light receiving elements satisfy the relationship of Equation (7). That is, the length of one side of the second light branching element is set to a value which is obtained by multiplying one half of Lb (mm) by a value resulting from subtracting the radius r1 (mm) of the first condenser lens from the optical path length b1 (mm) between the first condenser lens and the first, second light receiving elements and further dividing the resulting value by the radius r1 (mm) of the first condenser lens, the value of the length being larger than the distance x1 (mm) between the second light branching element and the first, second light receiving elements.

Thus, specularly reflected light components containing information as to the surface state of the measuring object can be condensed by the first condenser lens and let effectively incident on the second light branching element and split. Therefore, the discrimination accuracy of the measuring object can be improved.

In one embodiment, in the optical object discriminating device, assuming that a distance of an optical path ranging from the measuring object via the first light branching element to the first condenser lens is a1 (mm), a distance of an optical path ranging from the first condenser lens via the second light branching element to the first and second light receiving elements is b1 (mm), a size of the light receiving surfaces of the first and second light receiving elements is d (mm), and a beam diameter of the first light beam at the surface of the measuring object is φ (mm), then following Equation (8) is satisfied:

$$d > (b1/a1) \cdot \phi \qquad (8).$$

With the optical object discriminating device of this constitution, the beam diameter φ (mm) of the first beam at the surface of the measuring object and the size d (mm) of the light receiving surfaces of the first, second light receiving elements satisfy the relationship of Equation (8). That is, a value (b1/a1) obtained by dividing the optical path length b1 (mm) between the first condenser lens and the first, second light receiving elements by the optical path length a1 (mm) between the first condenser lens and the measuring object is multiplied by the beam diameter φ of the first beam, where the resulting value is set smaller than the size d (mm) of the light receiving surfaces of the first, second light receiving elements. As a result of this, all the specularly reflected light components derived from the beam spot area of the first beam incident on the measuring object surface can be led onto the light receiving surfaces of the first, second light receiving elements. Therefore, higher-accuracy discrimination of the measuring object becomes achievable. It is noted that the size d (mm) of the light receiving surfaces of the first, second light receiving elements is, as an example, the diameter of circular-shaped light receiving surfaces or the length of their one side of rectangular-shaped light receiving surfaces.

In one embodiment, in the optical object discriminating device, a second condenser lens is placed on an optical axis between the first condenser lens and the second light branching element.

With the optical object discriminating device of this constitution, since the second condenser lens is placed between the first condenser lens and the first, second light receiving elements, a specularly reflected beam of reflected light containing information as to the surface state of the measuring object can be condensed onto the light receiving elements with high efficiency even upon a change in the incident angle of the first beam incident on the surface of the measuring object. Accordingly, the discrimination accuracy of the measuring object can be improved.

In one embodiment, in the optical object discriminating device, assuming that an optical path length ranging from the measuring object via the first light branching element to the first condenser lens is a2 (mm) and a focal length of the first condenser lens is f1 (mm), then a2 (mm) and f1 (mm) are substantially equal to each other.

With the optical object discriminating device of this constitution, since the optical path length between the first condenser lens and the measuring object is substantially equal to the focal length of the first condenser lens, specularly reflected light components after the passage through the first condenser lens become a nearly parallel beam of light. As a result, the nearly parallel-beamed specularly reflected light components can effectively be condensed on the light receiving surfaces of the first, second light receiving elements by the second condenser lens subsequent to the first condenser lens. Therefore, measurement accuracy of the surface state of the measuring object can be improved, so that higher-accuracy discrimination of the measuring object becomes achievable.

In one embodiment, in the optical object discriminating device, assuming that a radius of the first condenser lens is r1 (mm), and an angle formed by the first light beam and a normal line of the surface of the measuring object is θ (radian), following Equation (9) is satisfied:

$$\tan^{-1}(r1/a2) > 2\theta \qquad (9).$$

With the optical object discriminating device of this constitution, a double of the incident angle θ of the first beam on the measuring object surface is set smaller than the arctangent of a value (r1/a2) resulting from dividing the radius r1 (mm) of the first condenser lens by the optical path length a2 (mm) between the first condenser lens and the measuring object. As a result of this, even when the incident angle θ of the first beam incident on the surface of the measuring object has changed, specularly reflected light containing the information as to the surface state of the measuring object securely becomes incident on the first condenser lens and is diffracted by the second condenser lens toward the first and second light receiving elements. Therefore, the discrimination accuracy of the measuring object can be improved.

In one embodiment, in the optical object discriminating device, assuming that an optical path length between the first, second light receiving elements and the second condenser lens is b2 (mm) and that a focal length of the second condenser lens is f2 (mm), the optical path length b2 (mm) and the focal length f2 (mm) are substantially equal to each other.

With the optical object discriminating device of this constitution, the optical path length b2 (mm) between the second condenser lens and the first, second light receiving elements and the focal length f2 (mm) of the second condenser lens are substantially equal to each other. Accordingly, even when the incident angle θ of the first beam against the surface of the measuring object has changed, the specularly reflected light components formed into a substantially parallel beam of light by the first condenser lens can effectively be condensed within the light receiving surfaces of the light receiving elements by the second condenser lens. Therefore, measurement accuracy of the surface state of the measuring object can be improved, so that higher-accuracy discrimination of the measuring object becomes achievable.

In one embodiment, in the optical object discriminating device, assuming that a length of one side of the second light branching element is Lb (mm), a radius of the second condenser lens is r2 (mm), and an optical path length between a reflecting surface of the second light branching element and the first, second light receiving elements is x2 (mm), following Equation (10) is satisfied:

$$x2 < (Lb/2) \cdot (b2 - r2)/r2 \qquad (10).$$

With the optical object discriminating device of this constitution, the distance x2 (mm) between the reflecting surface of the second light branching element and the first, second light receiving elements satisfies the relationship of Equation (10). That is, the value obtained by multiplying one half of the one-side length Lb (mm) of the second light branching element by a value which results from subtracting the radius r2 (mm) of the second condenser lens from the optical path length b2 (mm) between the second condenser lens and the first, second light receiving elements, and further dividing the resulting value by the radius r2 (mm) of the second condenser lens is set larger than the distance x2 (mm) between the second light branching element and the first light receiving element.

Thus, specularly reflected light components which are condensed via the first condenser lens and the second condenser lens and which contains information as to the surface state of the measuring object can effectively be let incident on the second light branching element and then split. Therefore, the discrimination accuracy of the measuring object can be improved.

In one embodiment, in the optical object discriminating device, the radius r2 (mm) of the second condenser lens is not less than the radius r1 (mm) of the first condenser lens.

With the optical object discriminating device of this constitution, since the radius r2 (mm) of the second condenser lens is not less than the radius r1 (mm) of the first condenser lens, specularly reflected light components that spread in diffusion directions after the passage through the first condenser lens can be condensed toward the first, second light receiving elements by the second condenser lens. Therefore, the discrimination accuracy of the measuring object can be further improved.

In one embodiment, in the optical object discriminating device, assuming that a distance between the first condenser lens and the second condenser lens is S (mm), and a beam diameter of the first beam on the measuring object is φ (mm), following Equation (11) is satisfied:

$$r2/r1 > (S \cdot (\phi/2) + a2 \cdot r1)/(a2 \cdot r1) \qquad (11).$$

With the optical object discriminating device of this constitution, since specularly reflected light components that spread in diffusion directions after the passage through the first condenser lens can securely be condensed toward the first, second light receiving elements by the second condenser lens, the discrimination accuracy of the measuring object can be improved.

In one embodiment, in the optical object discriminating device, assuming that a size of light receiving surfaces of the first and second light receiving elements is d (mm), following Equation (12) is satisfied:

$$d > (b2/a2) \cdot \phi \qquad (12).$$

With the optical object discriminating device of this constitution, the beam diameter φ (mm) of the first beam on the surface of the measuring object and the size d (mm) of the light receiving surfaces of the first, second light receiving elements satisfy the relationship of Equation (12). That is, a value (b2/a2) which is obtained by dividing the optical path length b2 (mm) between the first, second light receiving elements and the second condenser lens by the optical path length a2 (mm) between the first condenser lens and the measuring object, and further multiplying the resulting value by the beam diameter φ (mm) of the first beam is set smaller than the size d (mm) of the light receiving surfaces of the first, second light receiving elements. The size d (mm) of the light receiving surfaces of the first, second light receiving elements is, as an example, the diameter of circular-shaped light receiving surfaces or the length of their one side of rectangular-shaped light receiving surfaces.

As a result of this, all the specularly reflected light components derived from the beam spot area of the first beam incident on the measuring object surface can be led onto the light receiving surfaces of the first, second light receiving elements. Therefore, higher-accuracy discrimination of the measuring object becomes achievable.

In one embodiment, in the optical object discriminating device, with respect to a light beam to be split into two beams by the first light branching element, the first beam is a component reflected by the first light branching element, and the second beam is component transmitted by the first light branching element.

With the optical object discriminating device of this constitution, since the first beam to be applied to the measuring object is the component reflected by the first light branching element, reflected beams reflected by the first, second light receiving elements are transmitted by the first light branching element. Therefore, the specularly reflected light component reflected by the measuring object is led via the first light branching element and the first condenser lens to the first, second light receiving elements regardless of the size of the first light branching element.

Thus, in this embodiment, since the first beam is the component to be reflected by the first light branching element, constraints on the size or placement of optical parts are alleviated to a large extent.

In contrast to this, when the first beam is the component to be transmitted by the first light branching element, the reflected beam by the measuring object is reflected by the first light branching element so as to be incident on the first, second light receiving elements. Therefore, because of the requirement that the specularly reflected light component reflected by the measuring object be incident on the reflecting surface of the first light branching element, larger constraints are involved for the placement of the optical parts.

In one embodiment, in the optical object discriminating device, the second light branching element and the first and second linear polarizers are implemented by polarization beam splitters.

With the optical object discriminating device of this constitution, since a plurality of optical parts (second light branching element and first, second linear polarizers) can be implemented by one part (polarization beam splitter), the optical object discriminating device can be simplified in construction.

In one embodiment, in the optical object discriminating device, the distance from the surface of the measuring object to the first light branching element is about 15 mm, which is preferable for reception of specularly reflected light derived from the surface of the measuring object.

In a cleaner of one embodiment, the optical object discriminating device is mounted on a head portion of the cleaner. With this cleaner, the floor surface, which is the measuring object, can automatically be discriminated, preferably.

In a self-propelled cleaner of one embodiment, the optical object discriminating device is mounted thereon. Thus, the self-propelled cleaner is enabled to automatically detect the type of the floor surface while running by itself, most preferably.

As apparent from the above description, according to the optical object discriminating device of the present invention, light is applied to a measuring object and depolarization characteristics of its reflected light are evaluated, by which changes in received signals corresponding to surface roughness can be obtained. Thus, the type of the measuring object can be discriminated.

Further, when optical object discriminating device of the present invention is mounted on a cleaner or a self-propelled cleaner, the cleaner or the self-propelled cleaner is enabled to have a function of automatically discriminating the type of the floor surface and optimizing the operation condition of the cleaner.

In one embodiment, the optical object discriminating device includes a semiconductor light emitting element, a light projecting part which collimates light emitted from the semiconductor light emitting element and applies the light to a measuring object which is an object to be measured, a condenser part which condenses light applied from the light projecting part and reflected by the measuring object, a light splitting part which splits light derived from the condenser part into a plurality of split beams, polarization-state selector parts which selects beams of mutually different polarization directions out of the plurality of split beams, respectively, a light receiving part which receives a plurality of beams selected by the polarization-state selector parts, and a signal processing part which processes a signal derived from the light receiving part. Thus, by measuring changes in polarization state of reflected light reflected by the measuring object, the type of the measuring object can be discriminated with relatively high accuracy. Further, since collimated light is applied to the measuring object, the optical system can be simplified, allowing a cost reduction and a downsizing of the optical object discriminating device to be achieved.

In one embodiment, in the optical object discriminating device, light emitted from the light projecting part is split by a first light branching element into first, second beams, and a first beam out of the first, second beams is let incident on the surface of the measuring object at a specified incident angle θ so as to be thereby reflected, and the reflected light is condensed by a first condenser lens and further split by a second light branching element into first, second reflected beams, which are received by first, second light receiving elements as first, second reflected beams having polarization directions orthogonal to each other by first, second linear polarizers, respectively. Since these first, second reflected beams contain information corresponding to surface roughnesses of the measuring object, polarization information as to the reflected light is measured and depolarization characteristics of the reflected light reflected by the surface of the measuring object are evaluated in the signal processing circuit based on first, second received signals outputted by the first, second light receiving elements. Thus, the type of the measuring object can be discriminated.

Furthermore, specularly reflected light out of the reflected light reflected by the surface of the measuring object is let incident within the light receiving surfaces of the first, second light receiving elements via the first condenser lens. Even when an oblique incidence has occurred due to a change in the incident angle of the first beam on the measuring object, the specularly reflected light component of the reflected light corresponding to the incident angle can be received by the first, second light receiving elements. Thus, according to the optical object discriminating device of this invention, even with an inclination relative to the surface of the measuring object, high-accuracy discrimination of the measuring object can be achieved without degrading the discrimination accuracy of the surface state of the measuring object.

Further, when the optical object discriminating device of this one embodiment is mounted on a cleaner or a self-propelled cleaner, the cleaner or the self-propelled cleaner is enabled to have a function of automatically discriminating the type of the floor surface and optimizing the operation condition of the cleaner.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 9B is an outlined view showing Configuration Example 1 of the sixth embodiment;

FIG. 26B is a view showing results of conducting an object discrimination experiment by an optical object discriminating device;

FIG. 36 is a schematic view showing a configuration of an eighteenth embodiment of the optical object discriminating device of the invention;

FIG. 41A is a view showing a configuration of a modification example of the output system of the seventeenth and eighteenth embodiments, and FIG. 41B is a view showing a configuration equivalent to the output system of the seventeenth and eighteenth embodiments;

DETAILED DESCRIPTION OF THE INVENTION

Hereinbelow, the present invention is described in detail by embodiments thereof illustrated in the accompanying drawings.

First Embodiment

Figure 1:
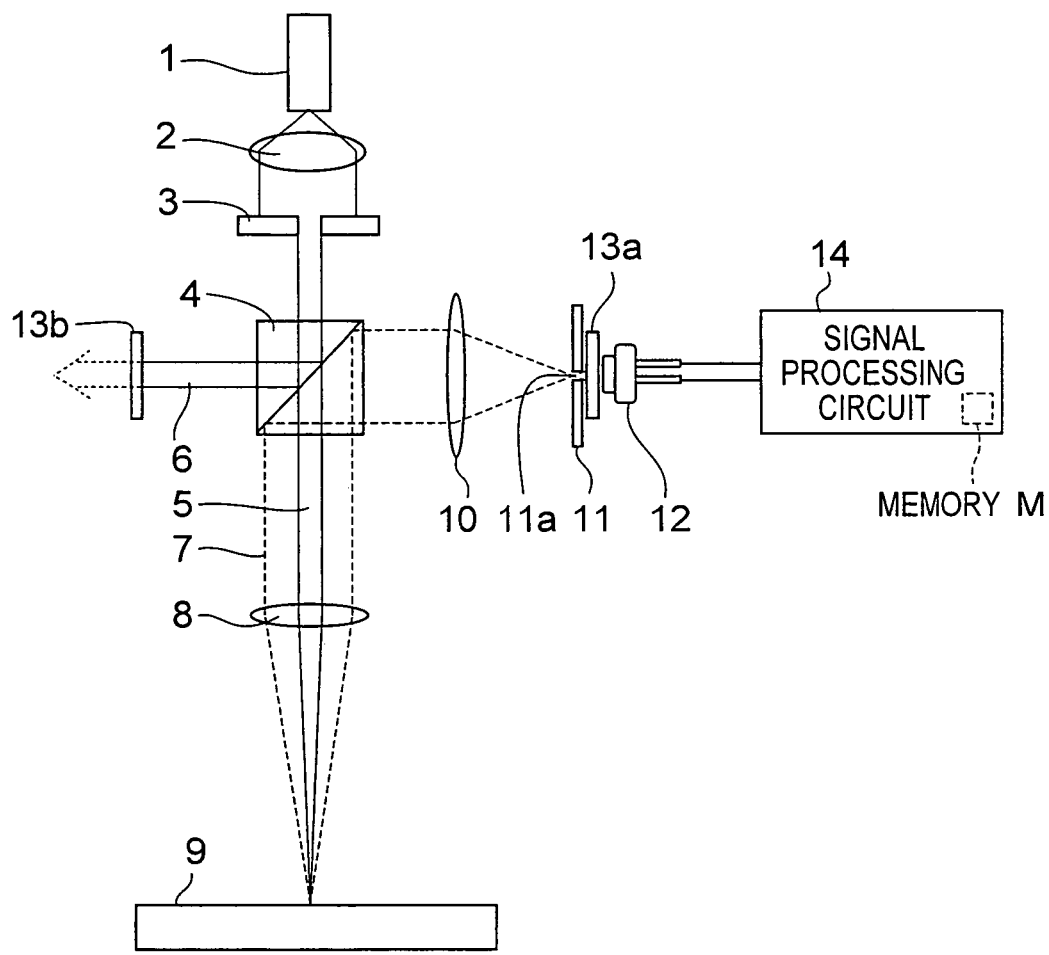
FIG. 1 is a view showing a configuration of a first embodiment of the optical object discriminating device according to the present invention.

FIG. 1 is an outlined configurational view of an optical object discriminating device according to a first embodiment of the invention. FIG. 1 shows a locus of a light beam and principal optical parts, and does not show such components as those for holding the optical parts. In this case, the semiconductor light emitting element serving as a light source may be given by an LED (Light Emitting Diode) or LD (Laser Diode) or the like, either of which may be adopted only if its light density on a measuring object 9 is at a desired value or more. It is noted that LDDs are higher in collimatability than LEDs and therefore capable of condensing a light beam into a smaller beam diameter and therefore enhancing the light quantity per unit area. Thus, LDs are preferred. From these reasons, an LD is shown as an example of the semiconductor light emitting element in this embodiment of the invention, and LDs are adopted as an example of the semiconductor light emitting element in the following embodiments.

The optical object discriminating device of this first embodiment includes a semiconductor laser 1, a collimator lens 2, an aperture 3 having a circular-shaped opening, a non-polarization beam splitter 4, and an objective lens 8. The semiconductor laser 1, the aperture 3, the non-polarization beam splitter 4 as a first light branching element, and the objective lens 8 as an objective part constitute a light projecting part.

In the first embodiment, the optical object discriminating device also includes a condenser lens 10, a pinhole part 11, a linear polarizer 13a forming a polarization-state selector part, a light receiving part 12 implemented by a light receiving element such as a photodiode, and a signal processing circuit 14 as a signal processing part.

Light emitted from the semiconductor laser 1 is converted into a parallel beam of light by the collimator lens (CL) 2, and only part of the beam around the beam center that becomes generally uniform in light intensity by the circular-opened aperture 3 is permitted by the aperture 3 to pass therethrough, with the beam cross-sectional configuration transformed into a circular shape. Subsequently, the beam is split into a first beam 5 that passes through the non-polarization beam splitter 4, and a second beam 6 that is reflected by the non-polarization beam splitter 4 to go on generally parallel to the surface of the measuring object 9.

When this occurs, the second beam 6 reflected by the non-polarization beam splitter 4 departs from the optical system. The second beam 6 is reflected by, for example, a casing side wall (not shown) surrounding the optical system or the like, and in some cases may be detected as noise light by the light receiving part 12. To eliminate such noise light, a linear polarizer 13b as a stray light prevention part is set on the optical axis of the second beam 6 so as to be orthogonal to the polarization direction of the second beam 6. As a result, the second beam 6 is inhibited from passing through the linear polarizer 13b, thus neither being applied to the casing side wall nor making a noise light source.

The first beam 5 that has passed through the non-polarization beam splitter 4 becomes incident on a center of the objective lens 8, being focused on the measuring object 9 by the objective lens 8. In this connection, the measuring object 9 is placed at a nearly focal length of the objective lens 8. The first beam 5 reflected by the measuring object 9 diffuses in all directions. Since the distance between the objective lens 8 and the measuring object 9 is nearly the focal length of the objective lens 8, light that has passed through the objective lens 8 out of the light reflected by the measuring object 9 forms a parallel reflected beam 7 having a lens aperture of the objective lens 8 as shown in FIG. 1. On the other hand, light that does not pass through the objective lens 8 out of the light reflected by the measuring object 9 diffuses, and does not contribute to signals afterwards.

Further, the optical object discriminating device shown in FIG. 1 is provided with a light shielding means (not shown) by which the reflected light that does not pass through the objective lens 8 is prevented from going incident on the light receiving part 12. Although this light shielding means is provided also in the following embodiments, its description will be omitted.

The reflected beam 7, after formed into a parallel light beam by the objective lens 8, becomes incident again on the non-polarization beam splitter 4, where the beam is split a light beam that passes through the non-polarization beam splitter 4 and a light beam that is reflected by the non-polarization beam splitter 4. It is noted that the light beam that passes through the non-polarization beam splitter 4 is omitted in FIG. 1. The beam that is reflected by the non-polarization beam splitter 4 is condensed by the condenser lens 10, while the beam that has passed through the pinhole 11 positioned at the focal length of the condenser lens 10, passing via the linear polarizer 13a as the polarization-state selector part, is detected by the light receiving element 12.

The pinhole part 11 is located at the focal position of the condenser lens 10. Therefore, when the measuring object 9 is located at a place other than the focal position of the objective lens 8, the reflected beam 7 condensed by the condenser lens 10 is defocused on the surface of the pinhole part 11, so that the quantity of light that passes through a pinhole 11a of the pinhole part 11 decreases to a large extent.

With such a placement, an optical signal directed to the light receiving part 12 can be increased in signal intensity with respect to the measuring object 9 set at the focal length of the objective lens 8, and moreover the beam diameter on the measuring object 9 can be decreased. As a result, the quantity of light of the reflected beam 7 is increased, making it achievable to discriminate the measuring object 9 with high accuracy.

The light receiving part 12, after converting the incident optical signal into an electric signal, transmits the electric signal to the succeeding-stage signal processing circuit 14.

The first beam 5 applied to the measuring object 9 is reflected by the surface of the measuring object 9, thus scattering. Generally, when light scatters, the reflected light changes in polarization state depending on the configuration of the reflecting surface. For example, as with surfaces of optical mirrors, a polarization state of incident light is retained through reflection by a surface having profile unevenness sufficiently smaller than the wavelength of the incident light. By contrast, when the reflecting surface has larger heights of unevenness relative to the wavelength of the incident light, reflected light yields multiple scattering, so that the reflection shows a depolarization characteristic.

In other words, the unevenness state of the surface of the measuring object 9 can be known by measuring polarization information on reflected light. In this embodiment, as shown in FIG. 1, the linear polarizer 13a as a polarization-state selector part is set immediately before the light receiving part 12 so that the light receiving part 12 detects only a polarized component that oscillates in a particular direction.

Now, referring to FIG. 1, assuming that linear polarization of light emitted from the LD (semiconductor laser) 1 is directed along a direction vertical to the drawing sheet, the linear polarizer 13a is also positioned so as to permit the light of polarization in the direction vertical to the drawing sheet. With such a placement, light intensity of the component of the above polarization direction out of the reflected beam 7 is measured by the light receiving part 12, and the level of the light intensity is detected by the signal processing circuit 14.

In this case, on the basis that the degree of depolarization of the reflected beam 7 is dependent on the degree of unevenness of the surface of the measuring object 9, the type (material) of the measuring object 9 can be discriminated by measuring the light intensity of the component of the above polarization direction by the signal processing circuit 14. In particular, for discrimination of the type (material) of the measuring object 9 from among measuring objects of a plurality of known different materials (surface configurations), information as to the degree of depolarization obtained from measuring objects of a plurality of known different materials may be preparatorily inputted into a memory M included in the signal processing circuit 14. Then, the type (surface configuration) of the measuring object 9, which is the object of measurement, can be discriminated more effectively by a comparison between the known information and measurement results.

Further, the first beam 5 becomes incident on the measuring object 9 nearly vertically and as an S wave. Here is given a brief description of the S wave. When the oscillating direction of incident light is vertical to an incident surface containing an optical axis of the incident light and its specularly reflected light, the incident light becomes an S wave. On the other hand, when the oscillating direction of incident light is parallel to the incident surface, the incident light becomes a P wave. The P wave has a component whose oscillating direction of light is vertical to the reflecting surface, and this vertical oscillating direction is vertical to the oscillating direction of light that is permitted to pass through the linear polarizer 13a set immediately before the light receiving element 12. As a result of this, the component of the P wave having the vertical oscillating direction becomes a noise component to the degree of depolarization by reflection. Therefore, it is preferable that the first beam 5 becomes incident vertically on the surface of the measuring object 9 and so does it as an S wave.

Since the measuring object 9 is located at the focal position of the objective lens 8, light reflected and diffused by the measuring object 9 is formed into a parallel light beam by the objective lens 8. Also, since the pinhole part 11 is located at the focal position of the condenser lens 10, the reflected beam 7 is condensed most on the surface of the pinhole part 11. Generally, on condition that reflected light is ideally a parallel beam, the beam diameter (beam waist) at the most light-condensed surface becomes about a few to several tens of μm although varying depending on the lens used. The diameter of the pinhole 11a is somewhat larger than the beam waist.

With such a placement, when the measuring object 9 is out of the focal length of the objective lens 8, the reflected beam does not become a parallel beam but becomes defocused on the surface of the pinhole part 11, thus hardly passing through the pinhole part 11. Therefore, a signal resulting when the measuring object 9 is located at a place near the focus having a large S/N ratio is extracted as a signal necessary for discrimination to perform the discrimination, so that any misdetection can be prevented and discrimination accuracy can be improved. As described at the beginning of this embodiment, LDs (semiconductor lasers) that condense light more on the measuring object 9 even for enhancement of the S/N ratio as described above so as to be able to enhance the light intensity are preferable as the semiconductor light emitting element.

On the other hand, as the light receiving part 12, any one that converts an optical signal into an electric signal can satisfy the function of the present invention, and particularly, a photodiode, if used, is suitable for downsizing the device construction and makes it possible to reduce the cost of the device, thus quite preferable. Further, in the case where the photodiode and the succeeding-stage signal processing circuit 14 are fabricated on one semiconductor substrate, it becomes possible to reduce noise that comes up along a wire or the like that interconnects the photodiode and the signal processing circuit 14. Moreover, in the case where the photodiode and the signal processing circuit 14 are made on one substrate, the chip area can be reduced so that a cost reduction can be achieved.

Furthermore, the light receiving part may also be so structured that a plurality of photodiodes are arrayed. For example, the structure may be that a plurality of divided photodiodes are arrayed in one line, and CCDs, CMOS imager or other image pickup devices are also usable.

When the light receiving part is implemented by one photodiode, information that can be obtained from this one photodiode is light intensity only. However, when a light receiving part including a plurality of photodiodes is used as described above, light intensity distribution can be measured by output signals of the plurality of photodiodes. In this case, the measuring object 9, which is the object of measurement, can be discriminated more accurately, compared with measurements of only the intensity.

Figure 2:
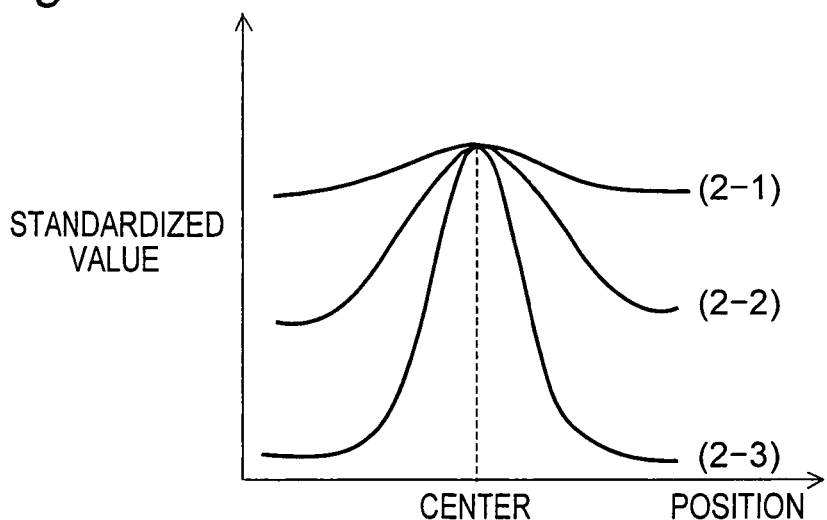
FIG. 2 is a conceptual view showing received light intensity distributions in a case where the device has a light receiving part including a group of light receiving elements in the first embodiment.

FIG. 2 shows received light intensity distributions of a value (standardized value) which is standardized by a maximum value out of light intensities at individual positions in a case where the light receiving part 12 includes a plurality of photodiodes as described above, the light intensities having been detected by the photodiodes of the individual positions.

In the case where the measuring object 9 has a smooth surface, the reflected beam 7 is low in the degree of depolarization, so that light passing through the linear polarizer 13a serving as the polarization-state selector part becomes more intense in a neighborhood of the optical axis center. Accordingly, as shown by a waveform (2-3) in FIG. 2, a sharp light intensity distribution centered on the optical axis results.

On the other hand, in the case where the measuring object 9 has such a surface of larger unevenness that the reflected beam 7 yields multiple scattering to a larger extent, a light intensity distribution which has a profile of a low maximum value and which is a broad distribution results as shown by a waveform (2-1) in FIG. 2. Further, a waveform (2-2) shown in FIG. 2 shows a profile of a light intensity distribution in the case where unevenness of the surface of the measuring object 9 is smaller than those of the (2-1) of FIG. 2 and larger than those of the (2-3) of FIG. 2.

In addition, effects of the arrangement that the above light receiving part is implemented by a light receiving element group composed of a plurality of light receiving elements are applicable also to the following embodiments. However, description of those effects will be omitted in the following embodiments.

Figure 3A:
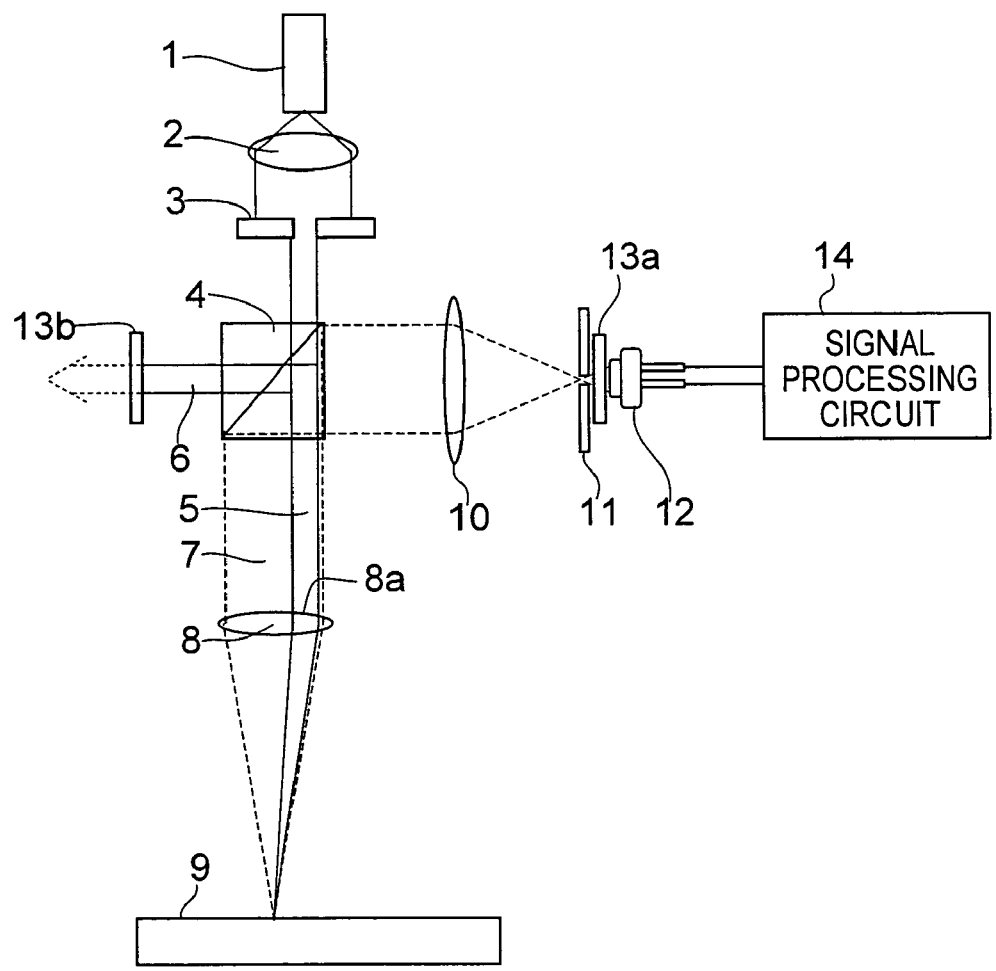
FIG. 3A is a view showing a configuration of a modification example of the first embodiment and FIG. 3B is a view showing a light intensity distribution in the modification example.
Figure 3B:
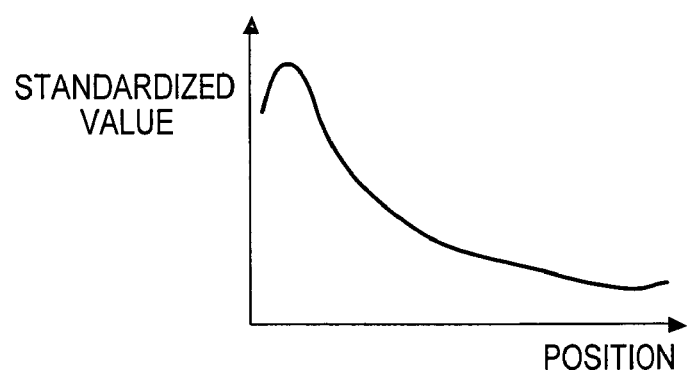

Next, FIG. 3A shows an outlined configuration of an optical object discriminating device which is a modification example of the foregoing first embodiment. In this modification example, as shown in FIG. 3A, constituent parts are similar to those of the first embodiment shown in FIG. 1, where the incident position of the first beam 5 on the objective lens 8 differs from that of the first embodiment.

Also in this modification example, since the first beam 5 becomes incident on the measuring object 9 as an S wave, the polarization direction of light outputted from the LD 1 is vertical to the drawing sheet, and along with this, the polarization direction of light that is permitted to pass through the linear polarizer 13a is also set to a direction vertical to the drawing sheet.

In this modification example, since the first beam 5 becomes incident on an edge portion 8a of the objective lens 8, the first beam 5 goes incident on the measuring object 9 with a specified incident angle. When the first beam 5 is reflected by the measuring object 9, the component with its polarization retained is the most intense in the direction of specular reflection. Therefore, letting incident light (first beam 5) obliquely incident on the measuring object 9 causes the spatial distribution of depolarization by reflection and diffusion to be changed.

In this modification example, the light intensity in a specified direction of polarization direction condensed by the objective lens 8 and detected by the light receiving part 12 is changed as compared with the first embodiment, in which the first beam 5 is let incident on a center portion of the objective lens 8. In this modification example, in particular, since light that is scattered backward by the measuring object 9 can be led in larger quantity to the light receiving part 12, the reflected beam 7 directed toward the light receiving part 12 contains an increased quantity of depolarized light component. Accordingly, in this modification example, even higher-accuracy discrimination of the measuring object 9 becomes achievable, compared with the above first embodiment.

Also in this modification example, the light intensity becomes a maximum to the specular reflection axis. In the case where the light receiving part 12 is implemented by a light receiving element group composed of a plurality of light receiving elements disposed in array as described above, the peak intensity position of a light intensity distribution detected by the light receiving part 12 shifts toward an end side from the center of the light receiving element group. With respect to the light intensity distribution in this case, as shown in FIG. 3A, tail configuration in the light intensity distribution can be measured in more detail, so that the measuring object 9 can be discriminated with high accuracy.

Second Embodiment

Figure 4:
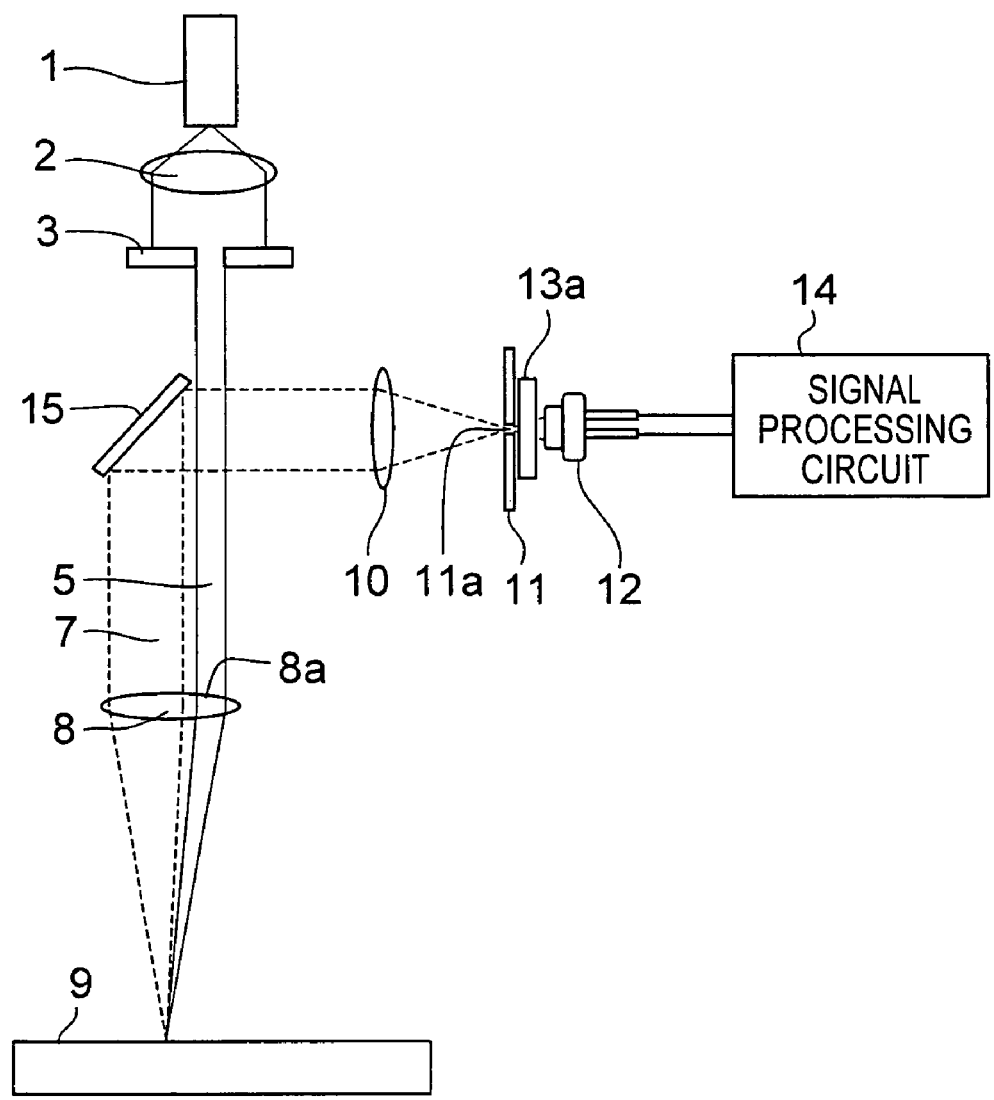
FIG. 4 is a view showing a configuration of a second embodiment of the invention.

FIG. 4 shows an outlined configuration of an optical object discriminating device according to a second embodiment of the invention. In FIG. 4, a locus of a light beam and principal optical parts are shown, and such components as those for holding the optical parts are not shown. Also in FIG. 4, the same constituent parts as those of the first embodiment shown in FIG. 1 are designated by the same reference numerals as those of the constituent parts in FIG. 1, and their description is omitted. This second embodiment differs from the foregoing first embodiment in that a mirror 15 as a lead part is included in place of the non-polarization beam splitter 4 of the modification example of the first embodiment.

In the second embodiment, the first beam 5 outputted from the aperture 3 is incident directly on the edge portion 8a of the objective lens 8, being focused on the measuring object 9 placed at the focal length of the objective lens 8. Further, since the first beam 5 becomes incident on the measuring object 9 as an S wave, the polarization direction of the LD 1 is vertical to the drawing sheet and, along with this, the polarization direction of light that is permitted to pass through the linear polarizer 13 is also set to a direction vertical to the drawing sheet. The light reflected and diffused by the measuring object 9 is formed again into a parallel reflected beam 7 by the objective lens 8.

This second embodiment includes a mirror 15 as a lead part. The mirror 15 changes the traveling direction of the reflected beam 7 so that the reflected beam 7 is directed toward the light receiving part 12. The mirror 15 is so placed as not to overlap with the first beam 5.

By the placement of the mirror 15 as shown above, it becomes possible to eliminate excess light that is to be lost as the second beam 6 in the first embodiment and its modification example. Accordingly, the ratio of the quantity of light that can be used as signal light out of the quantity of light emitted from the LD 1 can be increased. As a result of this, emission intensity of the LD 1 can be reduced, thus making it achievable to reduce current consumption of the whole device.

In addition, as the lead part, for example, most preferable is a mirror in which a hole larger in diameter than the beam diameter of the first beam 5 is formed (not shown), and it is more preferable that the mirror hole is placed so as to permit the first beam 5 to pass therethrough.

Third Embodiment

Figure 5:
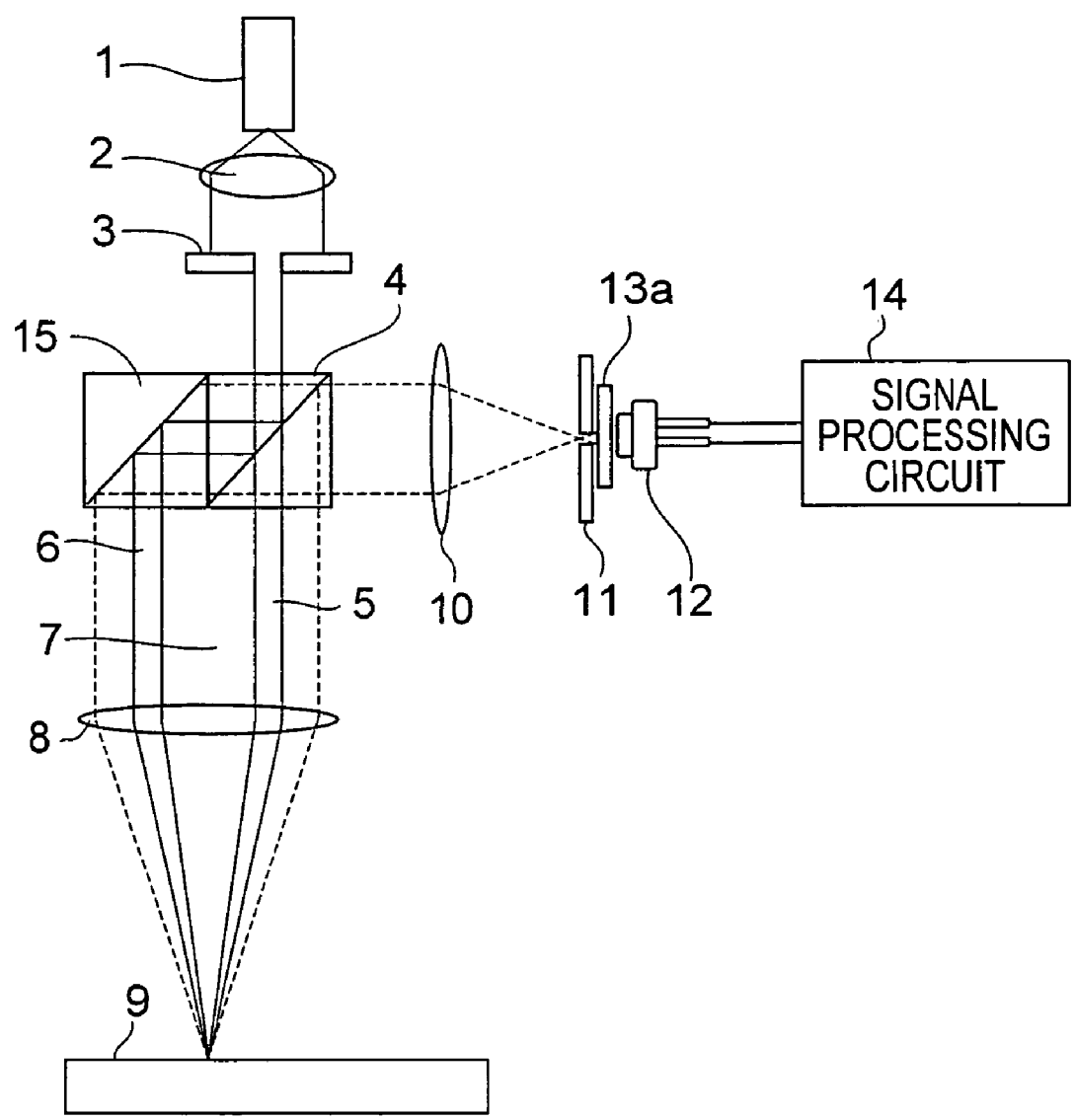
FIG. 5 is a view showing a configuration of a third embodiment of the invention.

Next, FIG. 5 shows an outlined configuration of an optical object discriminating device according to a third embodiment of the invention. In FIG. 5, a locus of a light beam and principal optical parts are shown, and such components as those for holding the optical parts are not shown. Also in FIG. 5, the same constituent parts as those of the first embodiment shown in FIG. 1 are designated by the same reference numerals as those of the constituent parts in FIG. 1, and their description is omitted.

This third embodiment differs from the foregoing first embodiment in that the linear polarizer 13*b* is not included while a mirror 15 as an optical axis changing part is included in adjacency to the non-polarization beam splitter 4.

In this third embodiment, the first beam 5 that has passed through the non-polarization beam splitter 4 is incident on the objective lens 8, while the second beam 6 reflected by the non-polarization beam splitter 4 is reflected by the mirror 15 with the result that its traveling direction becomes parallel to the first beam 5, thus coming incident on the objective lens 8 like the first beam 5. The two beams 5, 6 incident on the objective lens 8 are applied to an identical point on the measuring object 9 placed at the focal position of the lens 8.

The two beams 5, 6 reflected by the measuring object 9 are refracted by the objective lens 8 so as to be formed again into a parallel reflected beam 7. As indicated by broken line in FIG. 5, a portion of the reflected beam 7 is changed in traveling direction by the non-polarization beam splitter 4, while another portion of the reflected beam 7 is changed in traveling direction by the mirror 15. Thus, the reflected beam 7 becomes one identical beam of light directed toward the light receiving part 12, going incident on the condenser lens 10. Processing of the beam 7 after the incidence on the condenser lens 10 is similar to that of the first embodiment or the second embodiment.

According to the optical system as shown in this third embodiment, since excess light to be lost by the second beam 6 in the first embodiment and its modification example can be eliminated, the ratio of the quantity of light that can be used as signal light out of the total quantity of light emitted from the LD 1 can be increased as in the foregoing second embodiment. As a result of this, emission intensity of the LD 1 can be reduced, thus making it achievable to reduce current consumption of the whole device.

Further, in this third embodiment, since a common optical part in which the beam splitter 4 and the mirror 15 are incorporated into one unit can be adopted, the optical object discriminating device can be implemented quite easily without the need for any special hole drilling for the mirror such as illustrated in the second embodiment.

Fourth Embodiment

Figure 6:
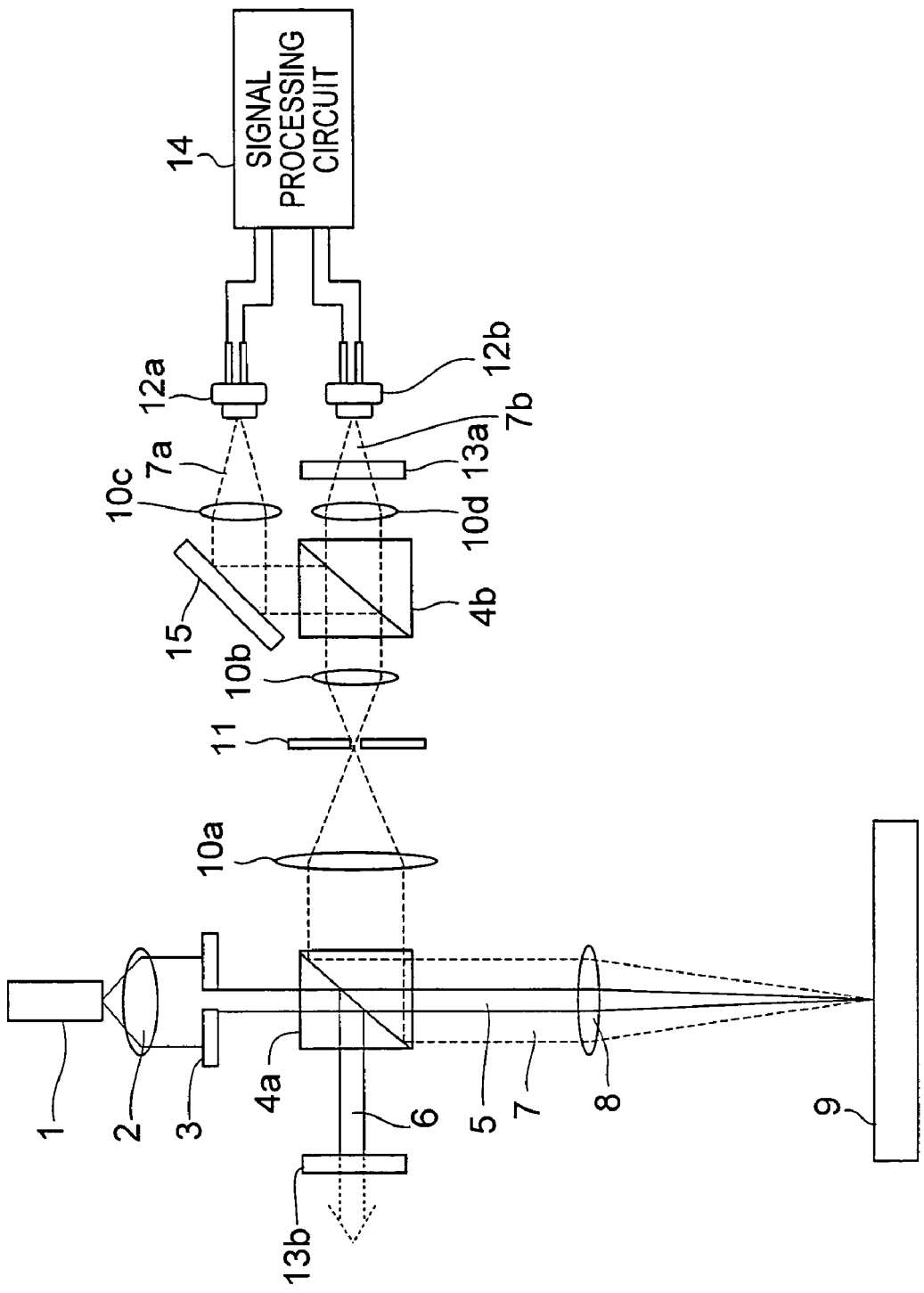
FIG. 6 is a view showing a configuration of a fourth embodiment of the invention.

Next, FIG. 6 shows an outlined configuration of an optical object discriminating device according to a fourth embodiment of the invention. In FIG. 6, a locus of a light beam and principal optical parts are shown, and such components as those for holding the optical parts are not shown. Also in FIG. 6, the same constituent parts as those of the first embodiment shown in FIG. 1 are designated by the same reference numerals as those of the constituent parts in FIG. 1.

In this fourth embodiment, a second non-polarization beam splitter 4*b* serving as a second light branching element is included in addition to a first non-polarization beam splitter 4*a* which is identical in construction to the non-polarization beam splitter 4 of the first embodiment and which serves as a first light branching element. The second non-polarization beam splitter 4*b* is placed between the pinhole part 11 and the linear polarizer 13*a*, while a second condenser lens 10*b* is placed between the pinhole part 11 and the second non-polarization beam splitter 4*b*. Further, a third condenser lens 10*d* is placed between the second non-polarization beam splitter 4*b* and the linear polarizer 13*a*.

Further included are a mirror 15 that reflects light, which has been reflected by the second non-polarization beam splitter 4*b*, toward a second light receiving element 12*a*, and another third condenser lens 10*c* placed between the mirror 15 and the second light receiving element 12*a*. These second light receiving element 12*a* and a first light receiving element 12*b* constitute the light receiving part.

In this fourth embodiment, the reflected beam 7 that has been reflected by the measuring object 9 and formed into a parallel beam by the objective lens 8 passes through the pinhole part 11 via the first non-polarization beam splitter 4*a* and a first condenser lens 10*a*, then being incident on the second condenser lens 10*b*. The pinhole part 11 is placed at the focal position of the second condenser lens 10*b*.

Accordingly, the reflected beam 7 is formed again into a parallel beam by the second condenser lens 10*b*, and split by the second non-polarization beam splitter 4*b* into two beams, a second reflected beam 7*a* and a first reflected beam 7*b*. In this connection, as shown in FIG. 6, the second reflected beam 7*a* represents a light beam that is reflected upward by the second non-polarization beam splitter 4*b*, and the first reflected beam 7*b* represents a light beam that has passed through the second non-polarization beam splitter 4*b*. The second reflected beam 7*a* is changed in traveling direction by the mirror 15, becoming parallel to the first reflected beam 7*b*. As a result of this, the second and first two light beams 7*a* and 7*b*, which have become identical in traveling direction, are condensed by the third condenser lenses 10*c* and 10*d* and detected by the second light receiving element 12*a* and the first light receiving element 12*b*, respectively. In this connection, between the first light receiving element 12*b* and the third condenser lens 10*d* is placed the linear polarizer 13*a*, which is so placed that the polarization direction of light to be thereby transmitted becomes identical to the polarization direction of the first beam 5.

In this fourth embodiment, the second light receiving element 12*a* receives light of all the polarization directions out of the second reflected beam 7*a* split by the second non-polarization beam splitter 4*b*. In contrast to this, the first light receiving element 12*b* receives the first reflected beam 7*b* via the linear polarizer 13*a*, and so receives light of a component in a specified polarization direction selected by the linear polarizer 13*a*. Thus, as described in the foregoing first to third embodiments, the signal detected by the first light receiving element 12b reflects the surface state of the measuring object 9.

As to the measuring object 9, which has various reflectances, a surface state of the measuring object 9 is measured only by an absolute value of an intensity signal detected by the first light receiving element 12b, it cannot be distinguished which is dominant for the contribution to the absolute value of the intensity signal, a polarization disorder at the surface of the measuring object 9 or merely the magnitude of the reflectance of the measuring object 9. In other words, even with a large degree of depolarization by the measuring object 9, when the reflectance of the surface of the measuring object 9 is a large one, it can occur that the intensity signal shows an output intensity over a certain level, causing a possibility that a misdetection may occur.

By contrast, in this fourth embodiment, since the second light receiving element 12a receives the light of all the polarization directions of the second reflected beam 7a, a signal outputted by the second light receiving element 12a is equivalent to a measurement of reflectance of the measuring object 9. Therefore, the signal processing circuit 14 calculates the output ratio of the second and first two light receiving elements 12a, 12b. With the calculated ratio of output signals, the surface state of the measuring object 9 is measured. Thus, in measurement of the surface state of the measuring object 9, influences of variations in signal intensity due to the reflectance of the surface of the measuring object 9 can be reduced. Consequently, according to the fourth embodiment, high-accuracy discrimination of the surface state of the measuring object 9 can be achieved.

Fifth Embodiment

Figure 7:
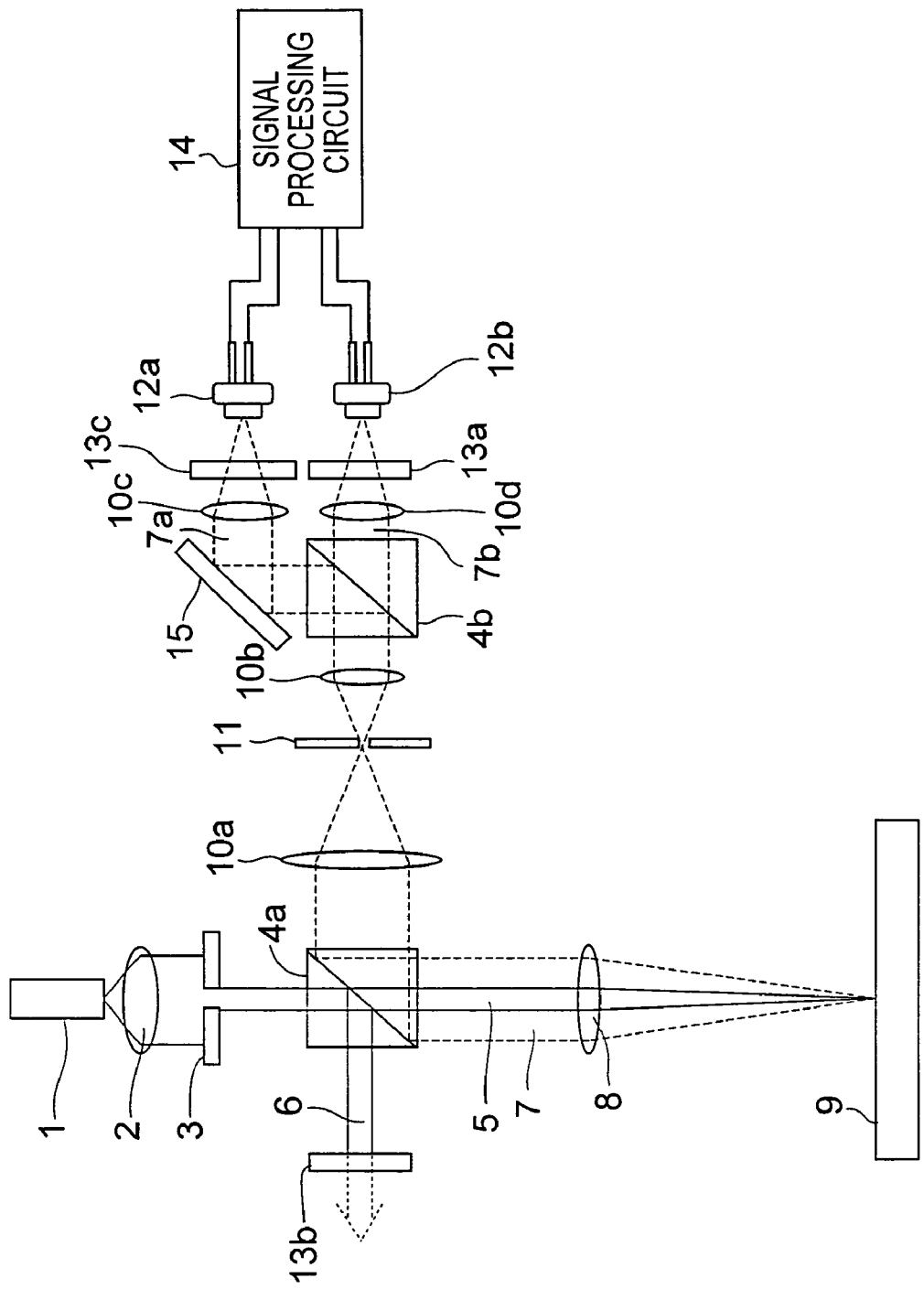
FIG. 7 is a view showing a configuration of a fifth embodiment of the invention.

Next, FIG. 7 shows an outlined configuration of an optical object discriminating device according to a fifth embodiment of the invention. In FIG. 7, only a locus of a light beam and principal optical parts are shown, and such components as those for holding the optical parts are not shown. Also in FIG. 7, the same constituent parts as those of the fourth embodiment shown in FIG. 6 are designated by the same reference numerals as those of the constituent parts in FIG. 6.

The fifth embodiment differs from the foregoing fourth embodiment in that the optical object discriminating device includes a second linear polarizer 13c which is placed between the third condenser lens 10c and the second light receiving element 12a and which serves as a second polarization-state selector element. In addition, in this fifth embodiment, the same linear polarizer 13a as in the fourth embodiment is included as a first linear polarizer 13a serving as the first polarization-state selector element. In this fifth embodiment, the second linear polarizer 13c is set on an optical axis of the second light receiving element 12a and the third condenser lens 10c.

A polarization direction selected by the first linear polarizer 13a and a polarization direction selected by the second linear polarizer 13c are generally orthogonal to each other, the polarization direction selected by the first linear polarizer 13a is generally parallel to the polarization direction of the first beam 5, and the polarization direction selected by the second linear polarizer 13c is generally vertical to the polarization direction of the first beam 5.

That is, the optical object discriminating device is so arranged that the polarization direction selected by the second linear polarizer 13c becomes orthogonal to the polarization direction selected by the first linear polarizer 13a and orthogonal to the polarization direction of the first beam 5 emitted by the LD 1.

As described before, the polarization state of the reflected beam 7 resulting after the first beam 5 is reflected by the measuring object 9 is due to the surface state of the measuring object 9. Therefore, the smoother the reflecting surface of the measuring object 9 is, the higher the ratio of a component of the reflected beam 7 in the same polarization direction as the polarization direction of an incident beam (first beam 5) becomes, while the lower the ratio of a component of the reflected beam 7 in the polarization direction orthogonal to the polarization direction of the incident beam (first beam 5) becomes. For example, assuming that the light quantity of the reflected beam 7 is 2I (in any arbitrary unit), the reflected beam 7 is split into a second reflected beam 7a of light quantity I and a first reflected beam 7b of light quantity I. The light quantity I of each of the first and second reflected beams 7b, 7a is a quantity of light containing the components of all the polarization directions.

Now, given one state as the surface state of the measuring object 9, it is assumed that, for each of the first, second reflected beams 7b, 7a, a light quantity of a component in the same polarization direction as that of the first beam 5 is $\alpha I$, a light quantity of a component orthogonal to the polarization direction of the first beam 5 is $\beta I$, and a sum of light quantities of the other polarization directions is $(1-\alpha-\beta)I$. In this case, the first reflected beam 7b, as a result of having passed through the first linear polarizer 13a, comes to have the light quantity $\alpha I$ and goes incident on the first light receiving element 12b, while the second reflected beam 7a, as a result of having passed through the second linear polarizer 13c, comes to have the light quantity $\beta I$ and goes incident on the second light receiving element 12a.

Accordingly, from calculation of measurement results by this fifth embodiment, i.e., by the signal processing circuit 14 calculating a ratio of an output signal derived from the first light receiving element 12b to an output signal derived from the second light receiving element 12a, a result of $\alpha I/\beta I = \alpha/\beta$ can be obtained.

In contrast to this, in the fourth embodiment, as a result of the signal processing circuit 14 calculating a ratio of an output signal derived from the first light receiving element 12b to an output signal derived from the second light receiving element 12a, a result of $\alpha I/I = \alpha$ can be obtained.

It is noted here that the factors $\alpha$ and $\beta$ are each a value of not more than 1, where the larger the value of $\alpha$, the smaller the value of $\beta$. Therefore, with the ratio $\alpha/\beta$ calculated in this fifth embodiment, the effects of depolarization due to the surface state of the measuring object 9 can be reflected better than with the ratio $\alpha$ calculated in the fourth embodiment. Thus, according to the fifth embodiment, discrimination accuracy is improved as compared with the fourth embodiment.

In the fifth embodiment, a difference between the output signal from the first light receiving element 12b and the output signal from the second light receiving element 12a may be calculated instead of calculating the ratio by the signal processing circuit 14. In this case also, the discrimination accuracy can be improved. However, to reduce errors due to variations of the surface reflectance of the measuring object 9, it is preferable to calculate the difference and thereafter calculate a ratio of the difference to the sum of the output signals of the two light receiving elements 12a, 12b. That is, a result of this calculation is $(\alpha-\beta)/(\alpha+\beta)$. The difference between $\alpha$ and $\beta$ increases with increasing smoothness of the reflecting surface of the measuring object 9, and the difference between α and β decreases with increasing roughness of the surface. Therefore, higher-accuracy discrimination of the measuring object 9 can be achieved. It is noted that the denominator (α+β) is a value not more than 1 so that variations of the calculation result due to the surface reflectance of the measuring object 9 are reduced.

Further, the same effects as in the fifth embodiment can be obtained also with a configuration in which the second non-polarization beam splitter 4b shown in FIG. 7 is replaced with a polarization beam splitter while the first linear polarizer 13a and the second linear polarizer 13c are removed. The polarization beam splitter is a beam splitter which splits an incident beam of light in such a way that a polarization direction of a transmitted beam and a polarization direction of a reflected beam become orthogonal to each other. In this case, the entirely same effects as with the arrangement shown in FIG. 7 can be obtained, and the parts count can also be reduced in correspondence to the absence of the linear polarizers.

Figure 8A:
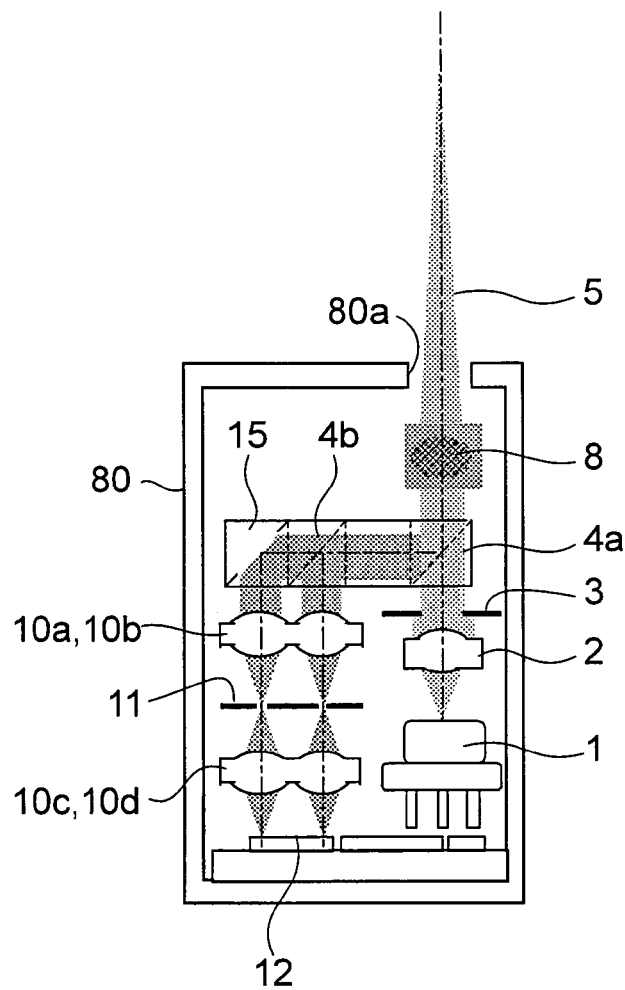
FIG. 8A is a view showing a configuration of the fifth embodiment in which the optical system is housed in a casing 80.

Further, it is also allowable that the optical system in the fourth or fifth embodiment is accommodated in a casing 80 having an optical window 80a as shown in FIG. 8A. The first beam 5 is outputted from the optical window 80a. In this arrangement, by integrating the non-polarization beam splitter 4b and the mirror 15 into a unit and by using a lens group including the third condenser lenses 10c, 10d fabricated on one plate, the distance between the second reflected beam 7a and the first reflected beam 7b can be reduced. Thus, it becomes possible to fabricate the second light receiving element (photodiode) 12a and the first light receiving element (photodiode) 12b on one identical semiconductor substrate, so that the manufacturing cost can be reduced.

Figure 8B:
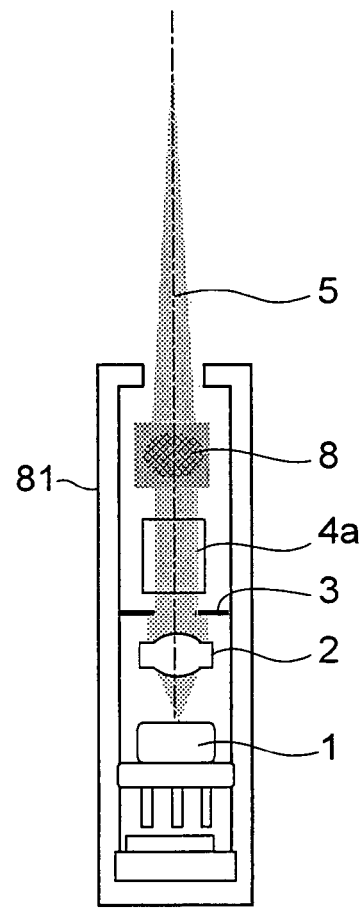
FIG. 8B is a view showing an example in which a light projecting part is housed in the casing.
Figure 8C:
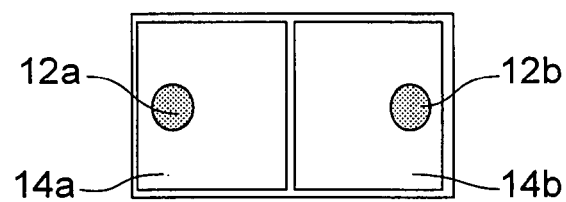
FIG. 8C is a view showing an example in which a photodiode and a signal processing circuit are formed on one semiconductor substrate.

Further, by setting signal processing circuits 14a, 14b between the second light receiving elements 12a, 12b as shown in FIG. 8C, there can be obtained such a large noise reduction effect as described before, and moreover a large cost reduction can be realized. In addition, FIG. 8B shows a light projecting part in a case where the LD 1, the CL 2, the aperture 3, the first non-polarization beam splitter 4a and the objective lens 8 are accommodated in one casing 81.

Sixth Embodiment

Next, a sixth embodiment of the optical object discriminating device of the invention is explained. In each of the optical object discriminating devices of the first to fifth embodiments, since the pinhole part 11 is placed at the focal position of the condenser lens 10 as described above, an intense signal can be obtained when the measuring object 9 is present at the focal position of the objective lens 8.

However, heights of unevenness of the surface of the measuring object 9 are variable actually. With some objects to be discriminated, there is apprehension that almost no surface of the measuring object 9 may be positioned at the focal position of the objective lens 8.

This sixth embodiment provides an optical object discriminating device which is applicable to even such cases where the surface of the measuring object 9 has large heights of unevenness so that it is of low probability that the measuring object 9 be positioned at the focal position of the objective lens 8.

Figure 9A:
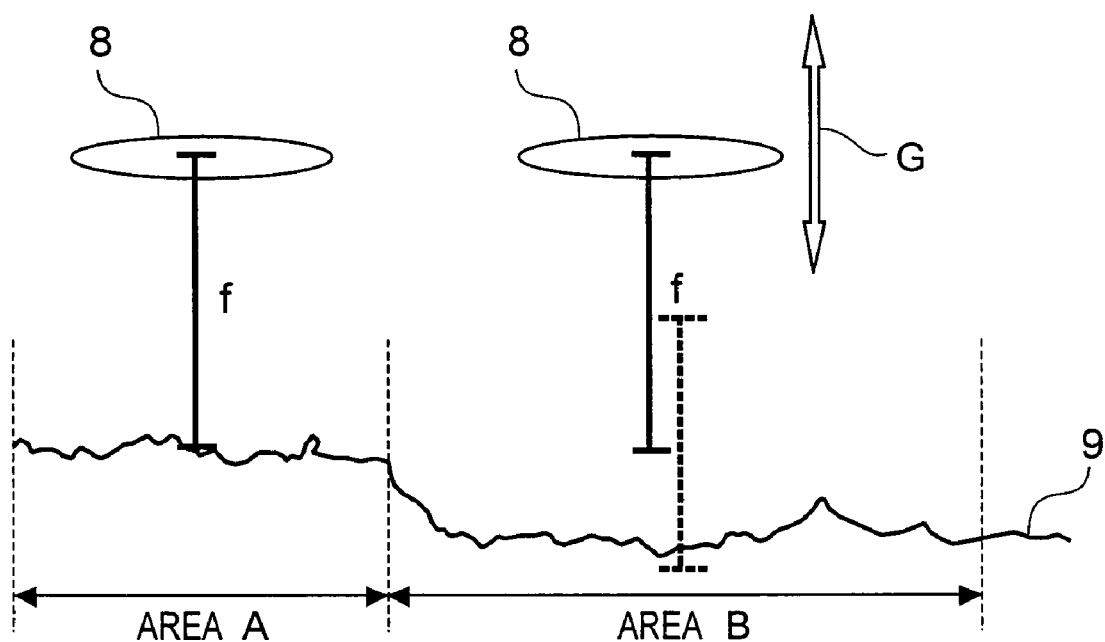
FIG. 9A is a view for explaining the concept of an optical object discriminating device according to a sixth embodiment of the invention, being a schematic view showing a positional relation between a measuring object varying in its surface height and an objective lens.

FIG. 9A schematically shows the construction of part of an optical object discriminating device corresponding to a case where the surface of the measuring object 9 has heights of unevenness. As shown in FIG. 9A, when the objective lens 8 is positioned in an area A relative to the surface of the measuring object 9, the surface of the measuring object 9 is placed at the position of the focal length f of the objective lens 8. In this case, a strong received signal can be obtained, so that high-accuracy discrimination of the measuring object can be achieved.

However, in FIG. 9A, when the objective lens 8 is positioned in an area B, the focal position of the objective lens 8 and the surface of the measuring object 9 become farther away from each other, the surface of the measuring object 9 being no longer positioned at the focal position of the objective lens 8.

Thus, the objective lens 8 is vibrated along a direction shown by arrow G in FIG. 9A so that its distance to the measuring object 9 is changed. This makes it possible to position the focal position of the objective lens 8 at the surface of the measuring object 9 as shown by broken line in FIG. 9A.

It is noted that the lens vibrating system which vibrates the objective lens 8 may be implemented by an actuator. However, since the actuator is small in drive range, it is very difficult to make the focal position of the objective lens 8 at the surface of the measuring object 9 if the surface of the measuring object 9 has large heights of unevenness.

Next, FIG. 9B shows an outlined configuration of Configuration Example 1 of the sixth embodiment. This Configuration Example 1 basically has the configuration of the foregoing fifth embodiment, and differs from the fifth embodiment in that a mechanism which vibrates the objective lens 8 is included. Therefore, in this Configuration Example 1, the difference from the fifth embodiment is explained emphatically.

As shown in FIG. 9B, the lens vibrating system can be made up of a spring 19 and a solenoid coil 17. A pulse power supply 16 is connected to the solenoid coil 17. The objective lens 8 is held by a lens holder 18, and an iron core 21 is fixed to the lens holder 18. Further, one end of the coil spring 19 is connected to one side of the lens holder 18 opposite to the iron core 21 side, and the other end of the coil spring 19 is connected to a fixing plate 20. The iron core 21 is partly inserted generally along the center axis of the solenoid coil 17.

With this configuration of the lens vibrating system, the objective lens 8 can be vibrated in the direction of arrow G by vibrating the lens holder 18 in the direction of arrow G with a force of the solenoid coil 17 attracting the iron core 21 and a restoring force of the spring 19. A pulse-modulated current derived from the pulse power supply 16 is flowing through the solenoid coil 17. While a pulse signal issued from the pulse power supply 16 is on, attracting force acts on the solenoid coil 17 so that the objective lens 8 is swung toward the solenoid coil 17. On the other hand, while the pulse signal is off, tensile force by the spring 19 fixed to the 20 goes active so that the objective lens 8 is swung toward the measuring object 9.

By the modulation frequency of this pulse signal, lens vibrations of any arbitrary frequency are possible. With this vibration vibrating system using the solenoid coil 17, by virtue of its large movable range, it becomes possible to position the focal position of the objective lens 8 at any position on the surface of the measuring object 9 within the vibration range of the objective lens 8 even with the measuring object 9 having large heights of unevenness of the detection surface.

Figure 10A:
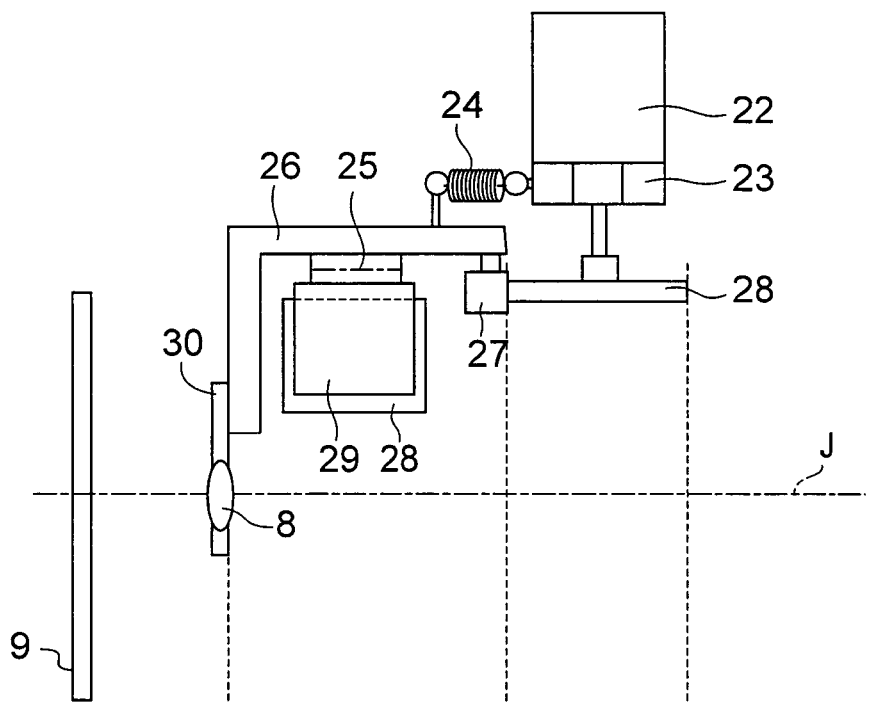
FIG. 10A is one side view of Configuration Example 2 of the sixth embodiment.
Figure 10B:
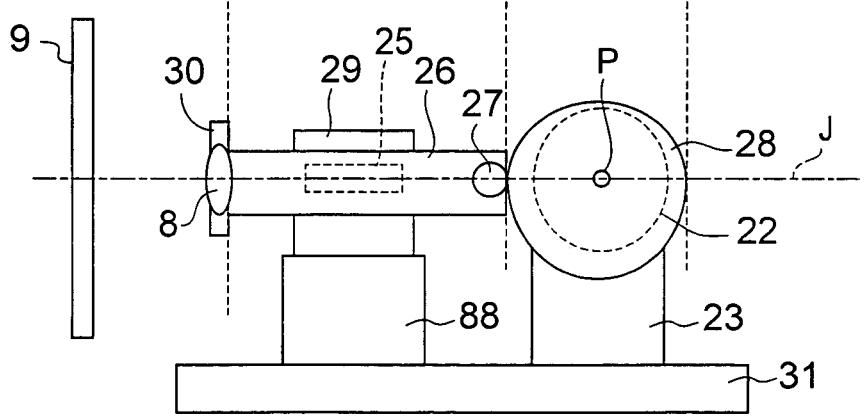
FIG. 10B is another side view of same Configuration Example 2.

Next, FIGS. 10A and 10B show an outlined configuration of Configuration Example 2 of the sixth embodiment. FIG. 10A is a schematic view showing an aspect of Configuration Example 2 as viewed toward a specified plane containing a normal line of the surface of the measuring object 9, and FIG. 10B is a schematic view showing an aspect of Configuration Example 2 as viewed toward a plane vertical to the above-mentioned plane.

In this Configuration Example 2, the lens vibrating system is composed of a cam 28 and a motor 22. The motor 22 is fixed to a motor fixing plate 23, and the motor fixing plate 23 is fixed to a base 31. The cam 28 is connected directly to a rotating shaft of the motor 22. The motor fixing plate 23 is connected to an auxiliary plate 26 by a spring 24.

A bearing 27 is pivotally held at one end portion of the auxiliary plate 26, and the bearing 27 is biased toward the cam 28 by a biasing force of the spring 24.

A lens holder 30 is fixed to the other end portion of the auxiliary plate 26, and the objective lens 8 is fitted to the lens holder 30. Further, a guide 25 is fixed at a mid portion of the auxiliary plate 26. The guide 25 is slidable along an optical axis J under the guide by another auxiliary plate 29. The auxiliary plate 29 is fixed to a fixing base 88, and the fixing base 88 is fixed to the base 31.

The guide 25 is movable only in the same one-dimensional direction which is the same direction as the optical axis J. The spring 24 needs to have such a spring constant that no clearance is formed between the bearing 27 and the cam 28 while the cam 28 is rotating. Also, the motor 22 needs to have such a torque as to cause the cam 28 to be rotated. As shown in FIG. 10B, the height of the motor 22 from the base 31 is set to such a one that an extension line of the rotational center axis of the cam 28 intersects the optical axis J. Properly selecting a configuration of the cam 28 allows the objective lens 8 to be set so as to have a desired lens vibration amplitude. By forming the peripheral profile configuration of the cam 28 into a sine-curve configuration so that the cam 28 is formed into a sine-curve cam, a lens position at any arbitrary time can be calculated. In this case, a distance R from a center P of the cam 28 to its outer diameter can be expressed as R=r+asinθ (mm). For instance, with a setting of a=5 mm, the objective lens 8 is vibrated linearly along the optical axis J in correspondence to a sine curve having an amplitude of 5 (mm), i.e., a vibration width of 10 mm.

Figure 11A:
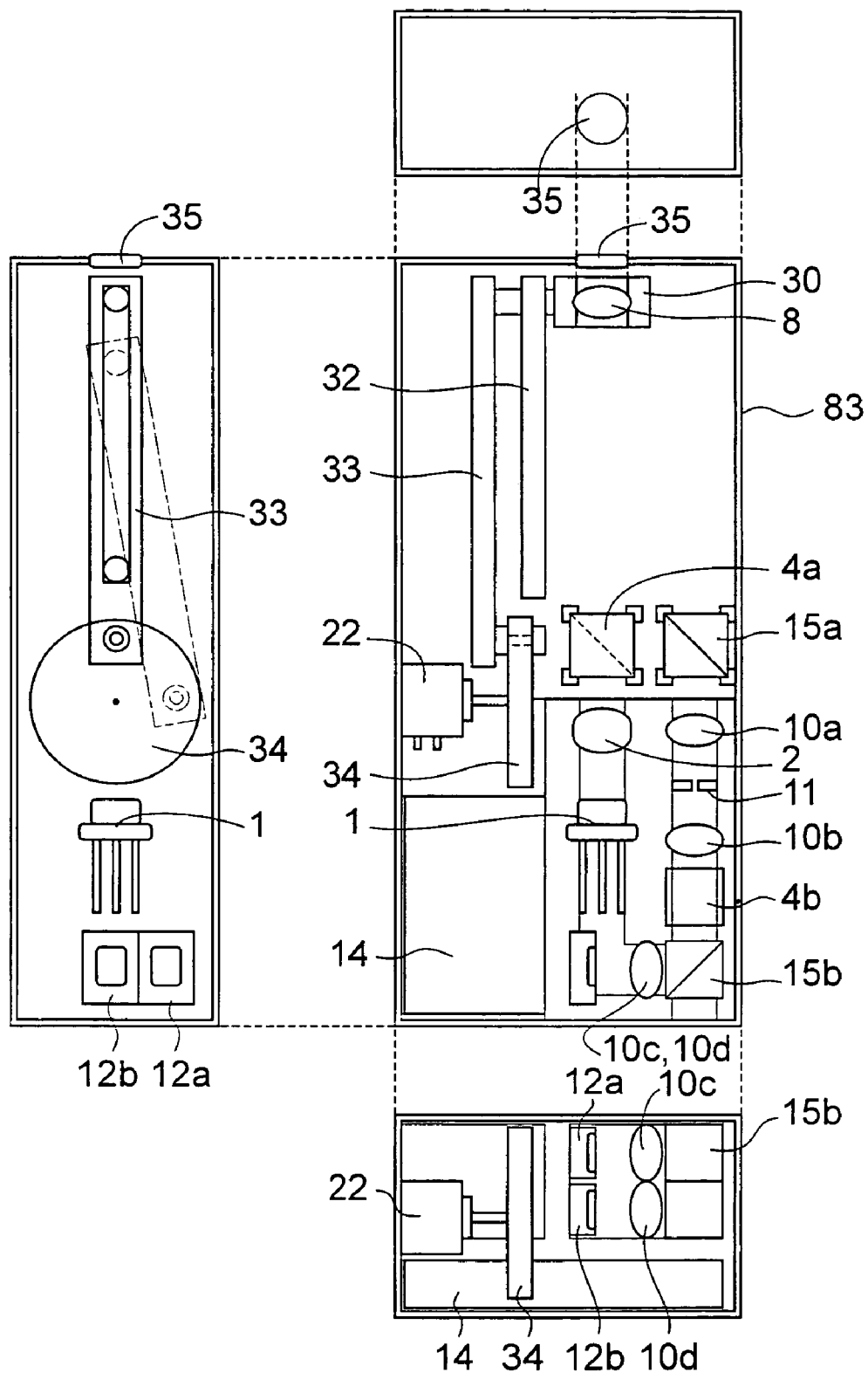
FIG. 11A is a view showing Configuration Example 3 of the sixth embodiment.

Next, FIG. 11A shows an outlined configuration of Configuration Example 3 of the sixth embodiment. FIG. 11A schematically shows a main cross section of Configuration Example 3 in the middle, a top face configuration above, a partial cross section below, and a partial cross-sectional configuration on the left hand as viewed sideways. In this Configuration Example 3, the lens vibrating system is implemented by a vibration system having a crank mechanism which transforms rotational motion of the motor 22 into reciprocating motion of the lens vibration.

As shown in FIG. 11A, the objective lens 8 is held by the lens holder 30 and fixed to a slider 33. The slider 33 slides along a guide 32 fixedly positioned within a casing 83 only in one direction along the optical axis. The slider 33 is pivotally attached at a site shifted from the center of a disc 34. The disc 34 is a perfect circle. Since the motor 22 is connected directly connected to the disc 34, the objective lens 8 reciprocatingly vibrates by one cycle along the optical axis while the motor 22 makes one rotation. Since the radius of the disc 34 is equivalent to the amplitude of the lens vibration, the radius of the disc 34 may appropriately be set larger than heights of unevenness of the surface of the measuring object 9.

Since no spring is used in the structure of Configuration Example 3, there is no fear for occurrence of such malfunctions as elongation of the spring, so that high mechanical reliability is obtained. In the lens vibrating system using the cam 28 shown in Configuration Example 2, occurrence of elongation of the spring 24 leads to a decrease in the spring constant, causing the bearing 27 to separate away from the cam 28, where the lens vibration becomes other than a designed one. By contrast, Configuration Example 3 has no such fears.

Figure 11B:
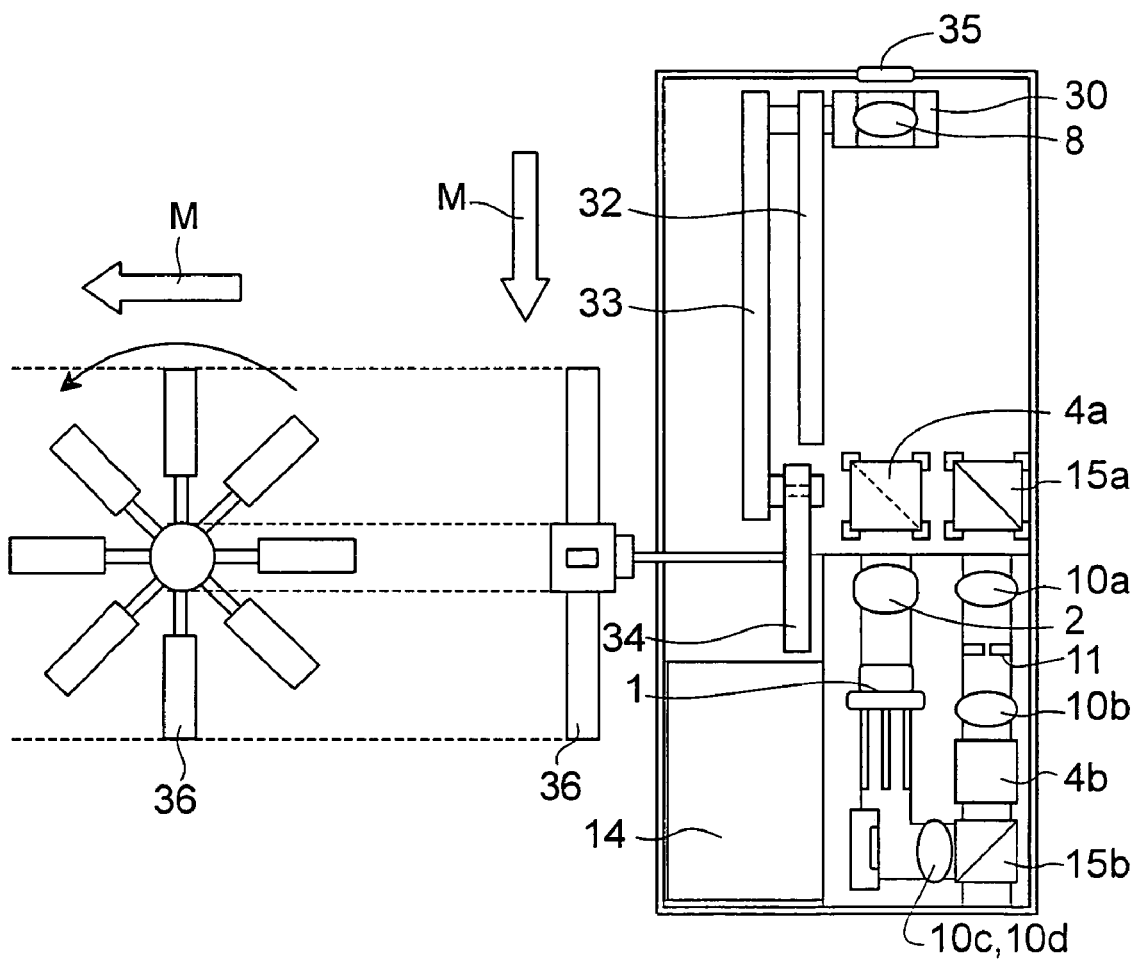
FIG. 11B is a view showing Configuration Example 4 of the sixth embodiment.

Next, FIG. 11B shows an outlined configuration of Configuration Example 4 of the sixth embodiment. FIG. 11B schematically shows a cross section of Configuration Example 4 in the middle, and an aspect of a propeller 36 on the left hand as viewed along a direction of the rotating shaft. In Configuration Example 4 shown in FIG. 11B, the lens vibrating system is one utilizing a flow of water or air. Configuration Example 4 of FIG. 11B differs from the foregoing Configuration Example 3 in that the propeller 36 attached to the rotating shaft is included in place of the motor 22 used in foregoing Configuration Example 3 of FIG. 11A.

That is, the optical object discriminating device of Configuration Example 4 is installed in adjacency to a flow passage M of water or air, where the propeller 36 has a rotational motion given by utilizing power of a medium flowing in the flow passage M so that the objective lens 8 is reciprocated by the crank mechanism so as to be vibrated. In Configuration Example 4, since no such power source as a motor is required, power consumption of the device can be largely reduced.

Configuration Example 4 of FIG. 11B, as will be described later in a twelfth embodiment, is an embodiment which is effective particularly when the optical object discriminating device of the invention is applied to cleaners or self-propelled cleaners. That is, in Configuration Example 4, it is practicable that the objective lens 8 is vibrated by using the suction air of a cleaner as a medium flow. In this case, generally, flooring or other wooden surface, straw tatami mat, and carpet or other wool can be mentioned as the floor surface to be discriminated as the measuring object 9, where heights of unevenness of such measuring objects can be covered by about 10 mm and the vibration range of the focal position is preferably set to 5 mm to 15 mm for coverage including shaggy ones. Although this vibration range is applicable similarly to all the embodiments, yet the description is given only in this Configuration Example 4.

Figure 11C:
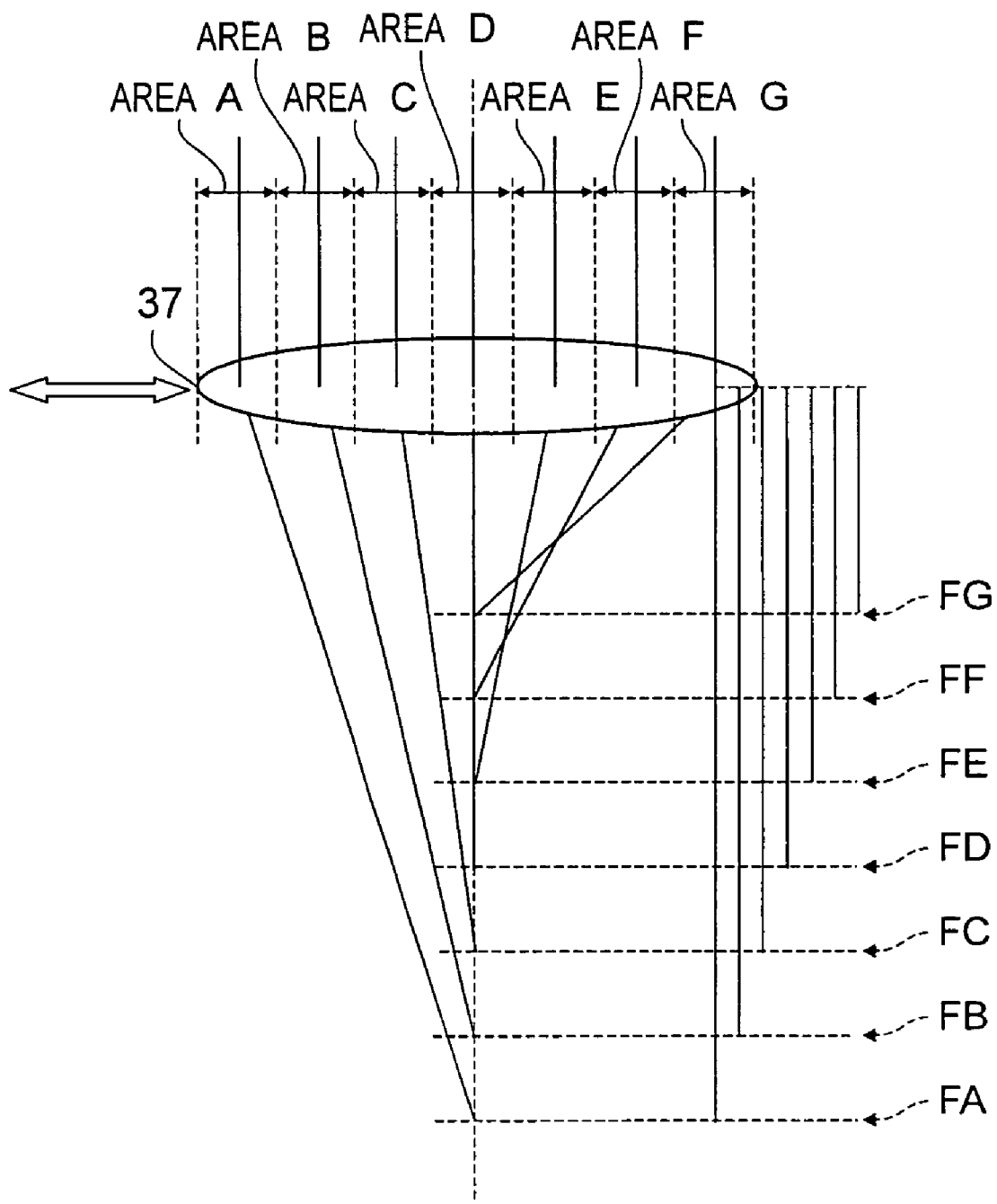
FIG. 11C is a view showing a progressive lens included in Modification Example 1 of the sixth embodiment.

Next, FIG. 11C shows a progressive lens 37 included as an objective lens in Modification Example 1 of the sixth embodiment. The progressive lens 37 shown in FIG. 11C is a lens having a plurality of areas of different focal lengths in one lens. The progressive lens 37, as shown in FIG. 1C, has seven-divided areas A-G, the areas A-G having mutually different focal lengths FA-FG, respectively. The progressive lens 37 is capable of changing the focal position to FA-FG depending on changes in the incident position of light among the areas A-G.

Figure 11D:
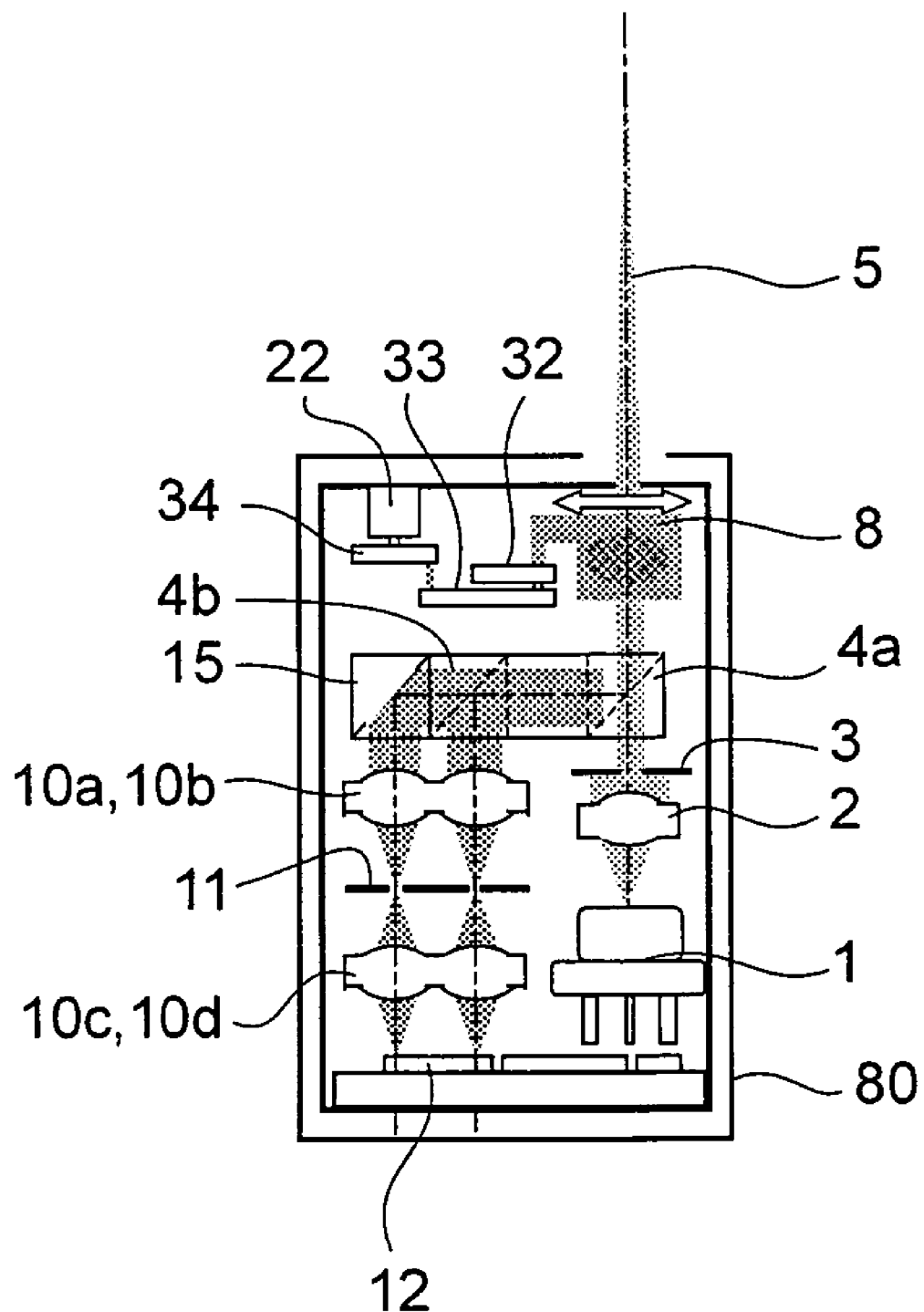
FIG. 11D is a view showing an outlined configuration of Modification Example 1 of the sixth embodiment.

Next, FIG. 11D shows an outlined configuration of Modification Example 1 having the progressive lens 37. Modification Example 1 has a basic configuration shown in FIG. 8A as an example of the fourth and fifth embodiments. Modification Example 1 includes a disc 34 connected to a rotating shaft of a motor 22, and a slider 33 having one end pivotally held on the disc 34. As the disc 34 is rotated by the motor 22 being driven, the slider 33 reciprocates along a guide 32 fixedly positioned within a casing 80 in a direction (indicated by an unfilled arrow) orthogonal to the optical axis of a first beam 5. As a result of this, the progressive lens 37 fitted to the lens holder fixed to the other end of the slider 33 is vibrated in the radial direction. As a result of this, the position of the first beam 5 incident on the progressive lens 37 is shifted in the radial direction so as to make the focal position shifted, thus making it implementable to discriminate the measuring object 9 having a surface of large heights of unevenness.

Figure 11E:
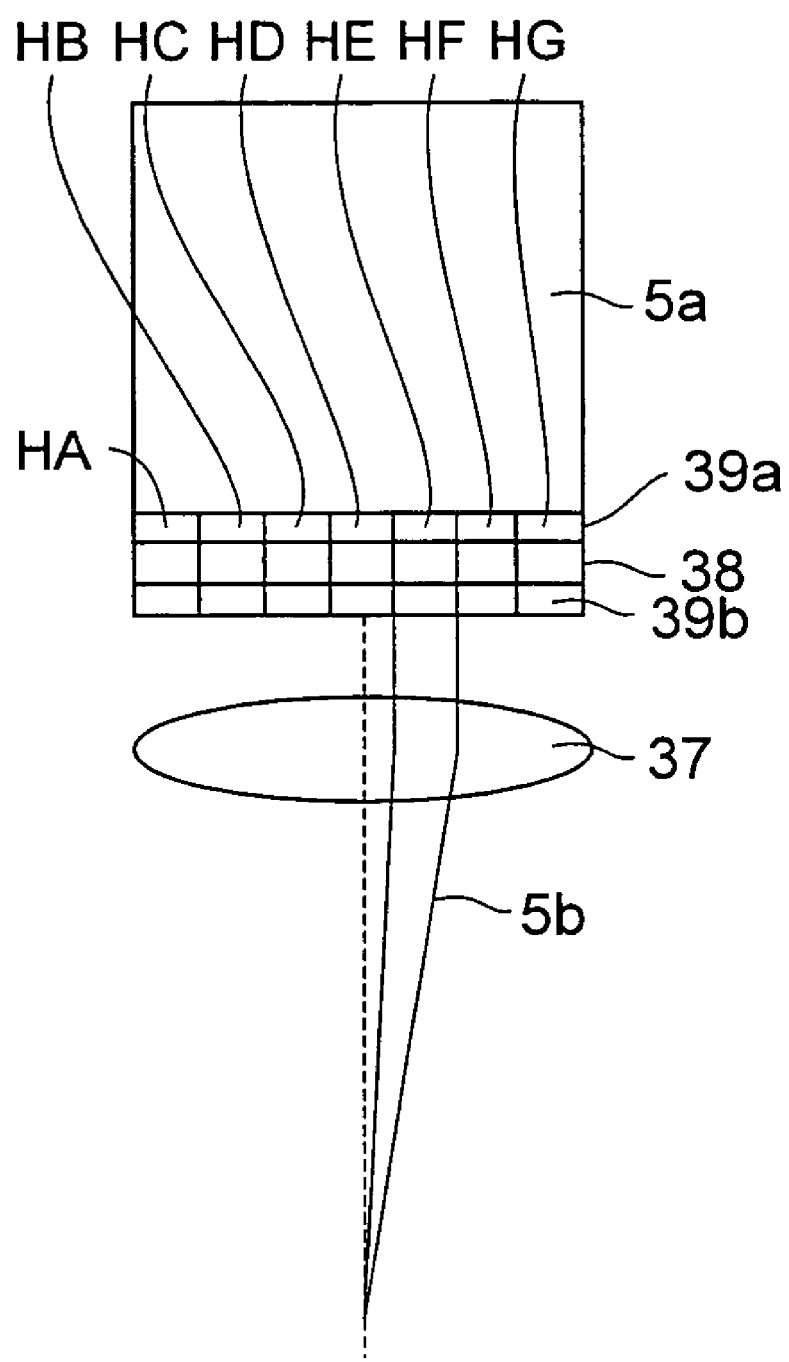
FIG. 11E is a view showing an outlined configuration of Modification Example 2 of the sixth embodiment.

Next, FIG. 11E shows an optical object discriminating device including a progressive lens 37 and a liquid crystal switch 38 as Modification Example 2 of the sixth embodiment. Modification Example 2 has the liquid crystal switch 38 in place of the crank mechanism composed of the motor 22, the slider 33, the guide 32, the disc 34 and the like in foregoing Modification Example 1.

In Modification Example 2, the liquid crystal switch 38 is placed closer to the semiconductor laser 1 than the progressive lens 37. The liquid crystal switch 38 is made up by sandwiching liquid crystals between two linear polarizers 39a, 39b whose transmission polarization directions are orthogonal to each other. The liquid crystal switch 38 is an optical part enabled to transmit light of a particular region by using liquid crystals. Liquid crystals can be made to serve for a function of selecting whether to turn on or off an applied electric signal so as to let incident light go out with its polarization direction remaining as it is or polarized by 90°. Therefore, in the liquid crystal switch 38, for example, only an electric signal to be applied to an area HE out of areas HA-HG is turned on, so that incident light 5a is polarized. As a result, only light that has incident on the area HE out of the incident light 5a is transmitted by the linear polarizer 39b, becoming incident on the area E of the progressive lens 37 as incident light 5b. The incident light 5b is condensed at a focal position FE corresponding to an incidence area E of the progressive lens 37.

Thus, by turning on only the electric signal applied to a desired area out of the areas HA-HG in the liquid crystal switch 38, only this area allows incident light to be transmitted therethrough. Therefore, by letting incident light incident only on a desired area out of the areas A-G of the progressive lens 37, the incident light can be condensed at a focal length out of the focal lengths FA-FG.

Consequently, it becomes implementable to discriminate the measuring object 9 having a surface of large heights of unevenness. In the structure of Modification Example 2 shown in FIG. 11E, no lens vibrating system is present unlike foregoing Configuration Examples 1 to 4 and Modification Example 1. Therefore, there is no need for considering various issues such as physical space due to the vibrating of the lens or misalignment of individual parts due to vibrations, so that the design of the optical system can be facilitated.

As described above, in Configuration Examples 1 to 4 and Modification Examples 1 and 2 of the optical object discriminating device of the sixth embodiment, even cases in which the surface of the measuring object 9 has large heights of unevenness can be managed by changing the position of the focal position to an extent larger than the heights of unevenness of the surface of the measuring object 9, which is achieved by vibrating the position of the objective lens 8 or changing the incident position on the progressive lens 37 as an objective lens or in other ways.

However, as a result of changing the focal position of the objective lens as shown above, signals outputted by the light receiving part 12 composed of the first light receiving elements 12b, 12a, i.e., two signals that are a focus signal in a case where the surface of the measuring object 9 is located at the focal position and a defocus signal in a case where the surface of the measuring object 9 is departed from the focal position are inputted to the signal processing circuit 14 as functions of time and then observed.

The foregoing fifth embodiment has been described on a configuration in which a received signal is split and a ratio or difference of the resulting split signals is calculated and used for discrimination with a view to improving the discrimination accuracy of the measuring object. The fifth embodiment treats signals at the same time point, and particularly, extracts signals at the time when the measuring object surface comes to the focal position of the objective lens 8, followed by signal processing.

In this sixth embodiment, the focal position of the objective lens 8 is normally vibrating, and the above-mentioned focus signal and defocus signal are observed continuously on the time base. Therefore, it is possible to use a focus signal and a defocus signal for the calculation of the ratio or difference. In the fifth embodiment of FIG. 7 also, although a defocus signal is observed by unevenness of the surface of the measuring object 9, yet its time change is due only to the surface configuration of the measuring object 9. That is, for the fifth embodiment, which differs from the sixth embodiment in which the focal position is intentionally changed, it is quite difficult to detect a signal resulting from defocusing to a known distance.

By contrast, with the constitution of the sixth embodiment, since the focal position of the objective lens 8 can be subjected to preparatorily calculated time-base changes, it becomes implementable to detect a signal intentionally defocused by a specific distance from a focal position that has been specifically determined from an output waveform of the light receiving part 12.

As described in the fifth embodiment, in order to use output signals of the first light receiving element 12b and the second light receiving element 12a as discrimination signals, those signals are preferably standardized so that influence of the reflectance of the surface can be reduced. In this case, using the defocus signal as a signal corresponding to the denominator of the standardization makes it possible to further enlarge signal components of the discrimination signal.

This is explained by using an equation shown in the foregoing fifth embodiment. A signal strength of incident light, i.e., a signal in the same polarization direction as the first beam 5 can be expressed as light quantity $\alpha I$ by using a focus signal. Also, a component of a polarization direction orthogonal to the polarization direction of the first beam 5 is assumed to have light quantity $\gamma I$.

Now assuming that the factor $\gamma$ is a constant associated with the degree of depolarization corresponding to a certain defocusing quantity, it holds that $\beta >> \gamma$, in comparison with the factor $\beta$ (focused state) in the fifth embodiment. Accordingly, it holds that $(\alpha/\beta) << (\alpha/\gamma)$. Consequently, by standardizing the light quantity $\alpha I$ in the focused state by the light quantity $\gamma I$ in the defocused state in the signal processing circuit 14, the signal level become higher, compared with the case where the light quantity $\alpha I$ in the focused state by the light quantity $\beta I$ in the focused state. Like this, by utilizing the defocus signal, the accuracy in discriminating the measuring object 9 can be further improved.

Seventh Embodiment

Next, a seventh embodiment of the optical object discriminating device of the invention is explained. The seventh embodiment differs from the foregoing first embodiment in that a modulation signal is applied to the semiconductor laser 1 to effectuate light intensity modulation in the first embodiment. Therefore, in this seventh embodiment, differences from the first embodiment are explained emphatically. It is noted that the seventh embodiment is applicable also to the foregoing second to sixth embodiments.

For optical sensors, measures for disturbance light are indispensable. In the seventh embodiment, the semiconductor laser 1 functions to perform pulsed light emission to electrically eliminate noise due to disturbance light. Below given is a detailed description thereof with reference to a timing chart shown in FIG. 12A.

Figure 12A:
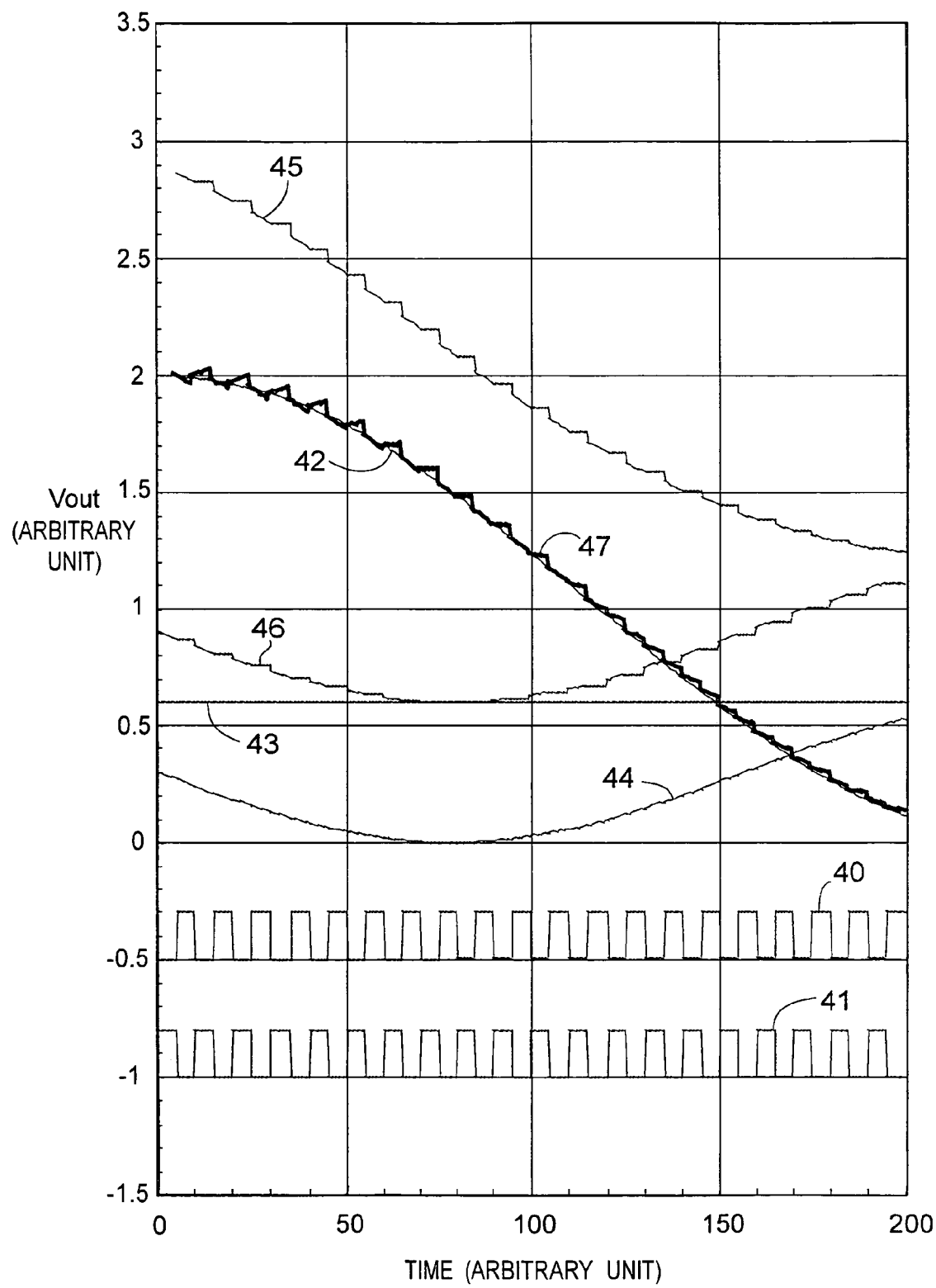
FIG. 12A is a timing chart for explaining signal processing operation in a seventh embodiment of the invention.

Referring to FIG. 12A, reference numeral 40 denotes an LD (semiconductor laser) modulation pulse, and 41 denotes a pulse derived from inversion of the LD modulation pulse. Numeral 42 denotes an original signal obtained by eliminating disturbance light noise from an output signal of the light receiving part 12, and 43 denotes a DC disturbance light noise out of the output signal of the light receiving part 12. Numeral 44 denotes AC disturbance light noise out of the output signal of the light receiving part 12. Numeral 45 denotes a first processing signal which results after the signal processing circuit 14 samples and holds the output signal of the light receiving part 12 in synchronization with the LD modulation pulse 40. Numeral 46 denotes a second processing signal which results after the signal processing circuit 14 samples and holds the output signal of the light receiving part 12 in synchronization with a pulse 41 obtained by revolution of the LD modulation pulse. Numeral 47 is a third processing signal obtained by subtracting the second processing signal from the first processing signal 45 (deriving a difference therebetween).

First, the concept of disturbance light elimination is explained. With the LD modulation pulse 40 on, the signal processing circuit 14 subtracts (derives a difference) the output signal of the light receiving part 12 issued immediately before the turn-on of the LD modulation pulse 40, from the output signal outputted by the light receiving part 12. That is, the signal processing circuit 14 subtracts (DC disturbance light signal 43+AC disturbance light signal 44) from (original signal 42+DC disturbance light signal 43+AC disturbance light signal 44), thereby obtaining a difference signal 47 corresponding to the original signal 42 from which noise due to disturbance light has been eliminated.

Meanwhile, with the LD modulation pulse 40 off, the signal processing circuit 14 subtracts (derives a difference) the output signal of the light receiving part 12 during the turn-off of the LD modulation pulse 40, from the output signal of the light receiving part 12 issued immediately before the turn-off of the LD modulation pulse 40. That is, the signal processing circuit 14 subtracts (DC disturbance light signal 43+AC disturbance light signal 44) from (original signal 42+DC disturbance light signal 43+AC disturbance light signal 44), thereby obtaining a difference signal 47 corresponding to the original signal 42 from which noise due to disturbance light has been eliminated.

Figure 12B:
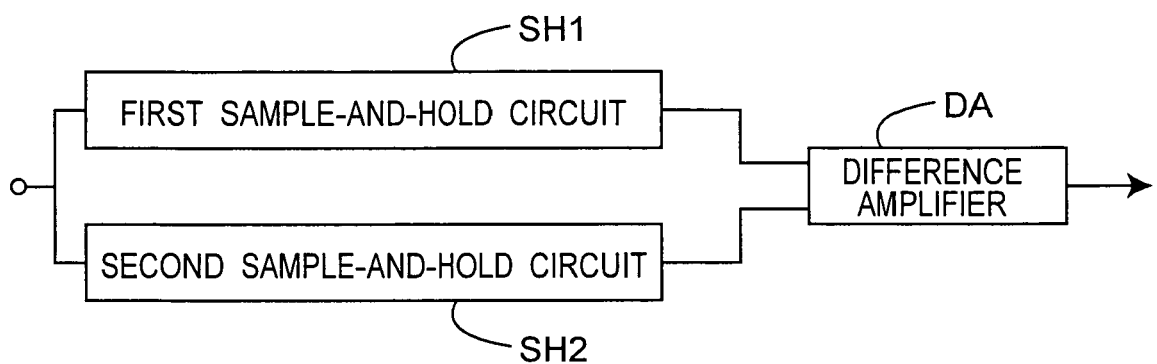
FIG. 12B is a block diagram showing a circuit included in a signal processing circuit of the seventh embodiment.

Next, a configuration for the signal processing circuit 14 to implement the above-described signal processing is explained with reference to FIG. 12B. The signal processing circuit 14 includes a first sample-and-hold circuit SH1, a second sample-and-hold circuit SH2 and a difference amplifier DA.

An output signal PD of the light receiving part 12 is parted into two, entering the first sample-and-hold circuit SH1 and the second sample-and-hold circuit SH2. The first sample-and-hold circuit SH1 generates a first waveform signal for the on-state of the LD modulation pulse 40, and the second sample-and-hold circuit SH2 generates a second waveform signal for the off-state of the LD modulation pulse 40.

With the LD modulation pulse 40 on, the first sample-and-hold circuit SH1 permits the output signal PD (original signal 42+DC disturbance light signal 43+AC disturbance light signal 44) of the light receiving part 12 in that state to pass therethrough as it is.

On the other hand, with the LD modulation pulse 40 off, the first sample-and-hold circuit SH1 samples and holds the output signal PD (original signal 42+DC disturbance light signal 43+AC disturbance light signal 44) immediately before the LD modulation pulse 40 turns off. As a result, the first sample-and-hold circuit SH1 obtains a first processing signal 45 equivalent to (original signal 42+DC disturbance light signal 43+AC disturbance light signal 44).

Meanwhile, with the LD modulation pulse 40 off, the second sample-and-hold circuit SH2 permits the output signal PD (DC disturbance light signal 43+AC disturbance light signal 44) of the light receiving part 12 in that state to pass therethrough as it is. On the other hand, with the LD modulation pulse 40 on, the second sample-and-hold circuit SH2 samples and holds the output signal PD (DC disturbance light signal 43+AC disturbance light signal 44) immediately before the LD modulation pulse 40 turns on. As a result, the second sample-and-hold circuit SH2 obtains a second processing signal 46 equivalent to (DC disturbance light signal 43+AC disturbance light signal 44).

Then, the difference amplifier DA subtracts (derives a difference) the second processing signal 46 outputted by the second sample-and-hold circuit SH2 from the first processing signal 45 outputted by the first sample-and-hold circuit SH1. That is, the difference amplifier DA subtracts (derives a difference) the second processing signal 46 equivalent to (DC disturbance light signal 43+AC disturbance light signal 44) from the first processing signal 45 equivalent to (original signal 42+DC disturbance light signal 43+AC disturbance light signal 44), thereby obtaining a difference signal 47 from which noise due to disturbance light has been eliminated out of the output signal PD of the light receiving part 12.

In order to eliminate DC disturbance light such as sunlight and AC disturbance light such as illumination (fluorescent lamps) of 50 Hz/60 Hz or inverter fluorescent lamps of about 30 to 50 kHz, it is proper that the LD modulation pulse 40 is set to a modulation frequency of 50 kHz or more which is higher than the frequency of inverter fluorescent lamps. Desirably, the LD modulation pulse 40 is set to a modulation frequency of about 1 MHz enough higher than the frequency of inverter fluorescent lamps. Further, it is also possible to set the LD modulation pulse 40 to an LD modulation frequency of about 100 to 10 kHz, where the frequency component of the inverter fluorescent lamp is separated off by an LPF (low-pass filter).

Eighth Embodiment

Next, an optical object discriminating device of an eighth embodiment of the invention is explained. The eighth embodiment differs from the foregoing sixth embodiment in configuration of the signal processing circuit 14.

As described at the end of the sixth embodiment, it is desirable for the signal processing circuit 14 to process the signal outputted by the light receiving part 12 not only in the focused state but also in the defocused state of the objective lens 8.

In this connection, the dynamic range of the level of the defocus signal in the defocused state and the level of the focus signal in the focused state goes 4000 times or more under some conditions. Therefore, it is difficult to amplify the signals in one range for cases including those in which the type of the measuring object 9 is changed.

Figure 13A:
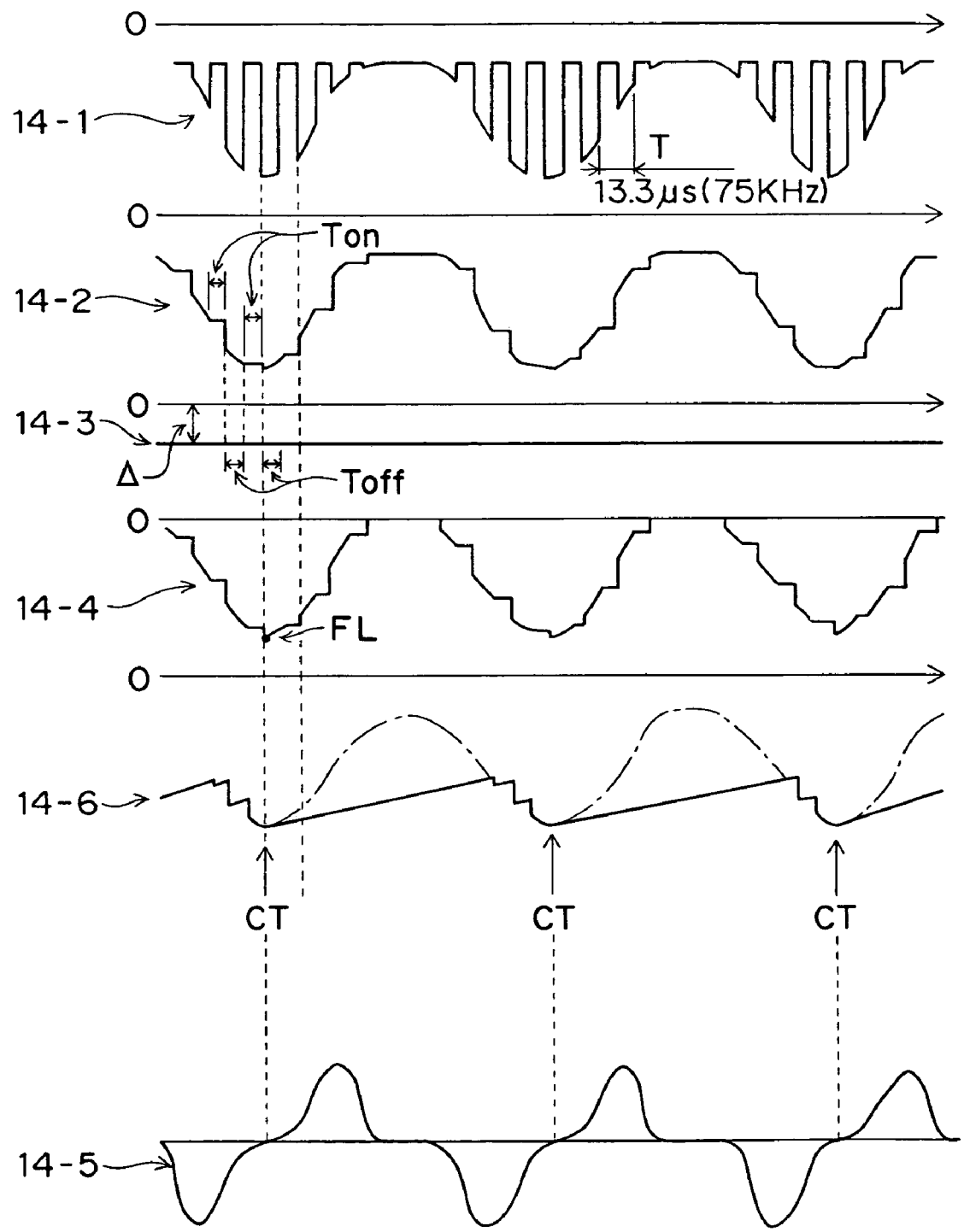
FIG. 13A is a timing chart for explaining signal processing operation of an optical object discriminating device according to an eighth embodiment of the invention.
Figure 13B:
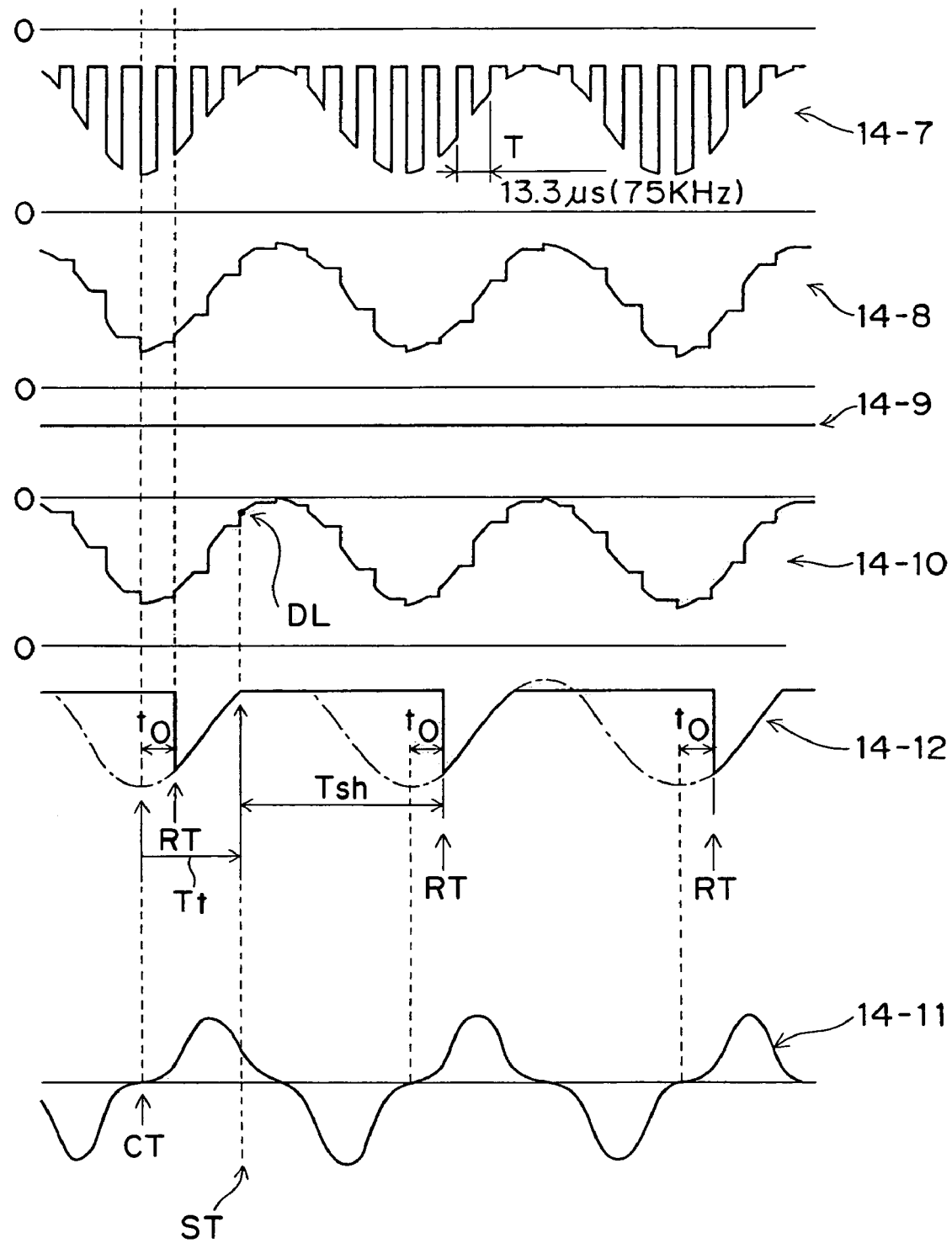
FIG. 13B is a timing chart for explaining signal processing operation of the optical object discriminating device of the eighth embodiment of the invention.
Figure 13C:
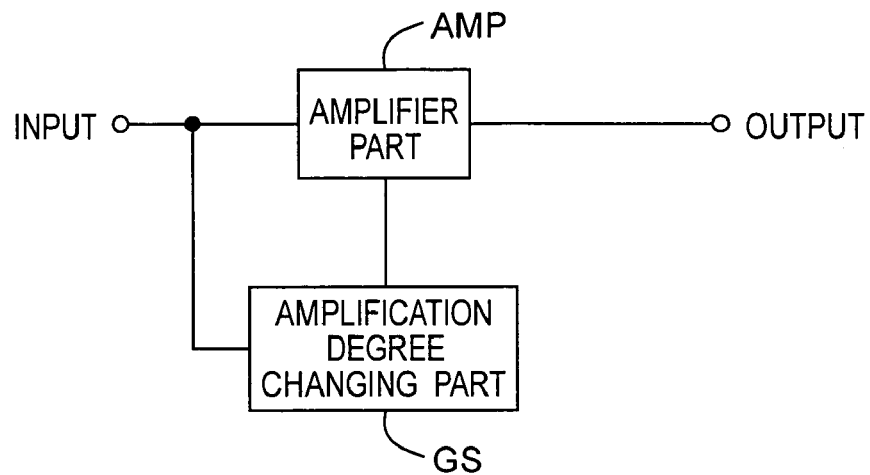
FIG. 13C is a block diagram showing a circuit included in a signal processing circuit of the eighth embodiment.

Accordingly, in the eighth embodiment, as shown in FIG. 13C, the signal processing circuit 14 includes an amplifier part AMP as the amplification part which amplifies an output signal derived from the light receiving part 12, and an amplification degree changing part GS which monitors the level of an output signal derived from the light receiving part 12 and changes over the gain of the amplifier part AMP in response to the level of the output signal. By this amplification degree changing part GS, an output signal amplified by the amplifier part AMP is set to an optimum level.

Operations of the signal processing circuit 14 of the eighth embodiment are described in detail below with reference to timing charts shown in FIGS. 13A and 13B.

FIG. 13A shows signals of the same polarization direction as light emitted by the semiconductor laser 1 (LD emitted light). Referring to FIG. 13A, a signal 14-1 is an output signal of the light receiving part 12. Since the semiconductor laser 1 is pulse modulated, the output signal 14-1 is turned on and off in response to an emission pulse of a specified period T (e.g., 13.3 µs) of the semiconductor laser 1.

A signal 14-2 is a first sample-and-hold signal 14-2 resulting from sampling and holding of the PD output signal 14-1 with the semiconductor laser 1 on (an interval Ton is at a level corresponding to LD-on). Also, a signal 14-3 is a second sample-and-hold signal 14-3 resulting from sampling and holding of the PD output signal 14-1 with the semiconductor laser 1 off (an interval Toff is at a level corresponding to LD-off). The second sample-and-hold signal 14-3 shows a disturbance light level Δ. A signal 14-4 is a difference signal 14-4 resulting from subtracting (deriving a difference) the second sample-and-hold signal 14-3 from the first sample-and-hold signal 14-2 (FL denotes a signal level in the focused state).

A signal 14-5 is a differential signal 14-5 resulting from differentiating the difference signal 14-4. A signal 14-6 is a bottom-hold signal 14-6 resulting from bottom-holding the PD output signal 14-1.

Further, FIG. 13B shows a signal having a polarization direction orthogonal to the photodiode of emitted light of the semiconductor laser 1. Referring to FIG. 13B, a signal 14-7 is an output signal of the light receiving part 12. A signal 14-8 is a first sample-and-hold signal 14-8 resulting from sampling and holding of the level of the output signal 14-7 with the semiconductor laser 1 on. Also, a signal 14-9 is a second sample-and-hold signal 14-9 resulting from sampling and holding of the level of the output signal 14-7 with the semiconductor laser 1 off. A signal 14-10 is a difference signal 14-10 resulting from subtracting (deriving a difference) the second sample-and-hold signal 14-9 from the first sample-and-hold signal 14-8 (DL denotes a signal level in the defocused state).

A signal 14-11 is a differential signal 14-11 of the difference signal 14-10. A signal 14-12 is a third sample-and-hold signal 14-12 resulting from sampling and holding of the first sample-and-hold signal 14-8 at a sample-and-hold timing ST.

Next described is a case where the signal processing circuit 14 detects a signal in the focused state (focus signal) for light of the same polarization direction as emitted light of the semiconductor laser 1, and detects a signal in the defocused state (defocus signal) for light of a polarization direction orthogonal to the polarization direction of emitted light of the semiconductor laser 1. It is noted that the concept is the same also with the other cases.

First, a basic concept on the gain selection of the amplifier part AMP is described. The amplification degree changing part GS, receiving output signals 14-1, 14-7 of the light receiving part 12, monitors the level in the focused state with respect to the output signal 14-1 derived from the light of the same polarization direction as emitted light of the semiconductor laser 1. If the level of the focused-state output signal 14-1 is lower than a lower-limit set level, the gain of the amplifier part AMP is incremented by one step. Conversely, if the level of the focused-state output signal 14-1 is higher than an upper-limit set level, the gain of the amplifier part AMP is decremented by one step.

A further detailed description is given below. The output signal 14-1 shown in FIG. 13A is, as described above, an output signal of the light receiving part 12 derived from light of the same polarization direction as that of emitted light of the semiconductor laser 1. This output signal is, for example, an output signal of the first light receiving element 12b shown in FIG. 9B. It is noted that FIG. 13A shows a case where the semiconductor laser 1 is conditioned by modulation with a modulation pulse of a 75 kHz frequency.

In order to monitor the signal level in the focused state, the amplification degree changing part GS generates a bottom-hold signal 14-6 by bottom-holding the output signal 14-1. Then, the amplification degree changing part GS performs an operation of incrementing the gain of the amplifier part AMP by one step if the level of the bottom-hold signal 14-6 is lower than a lower-limit set level, or decrementing the gain of the amplifier part AMP by one step if the level of the signal 14-6 is higher than an upper-limit set level. Alternatively, it is also permissible that the amplification degree changing part GS generates a sample-and-hold signal instead of the bottom-hold signal of the output signal 14-1 and compares the sample-and-hold signal with lower- and upper-limit set levels. In this case, the amplification degree changing part GS performs an operation of incrementing the amplifier gain by one step if the level of the sample-and-hold signal is lower than the lower-limit set level, or decrementing the amplifier gain by one step if the level of the sample-and-hold signal is higher than the set level. In this case, a timing CT at which the amplification degree changing part GS changes over the gain of the amplifier part AMP is set to a moment that a differential signal 14-5 resulting from differentiation of the difference signal 14-4 turns from negative to positive level.

Meanwhile, the output signal 14-7 shown in FIG. 13B is an output signal of the light receiving part 12 derived from light of the polarization direction orthogonal to the polarization direction of emitted light of the semiconductor laser 1 as described above. This output signal is, for example, an output signal of the second light receiving element 12a shown in FIG. 9B. It is noted that FIG. 13B shows a case where the semiconductor laser 1 is conditioned by modulation with a modulation pulse of a 75 kHz frequency.

In order to monitor the signal level in the defocused state, the amplification degree changing part GS monitors the third sample-and-hold signal 14-12. The third sample-and-hold signal 14-12 is a signal resulting from sampling and holding, at the sample-and-hold timing ST, the first sample-and-hold signal 14-8 that is a result of sampling and holding of the level of the output signal 14-7 with the semiconductor laser 1 on.

The amplification degree changing part GS performs an operation of incrementing the gain of the amplifier part AMP by one step if the level of the third sample-and-hold signal 14-12 is lower than the lower-limit set level, or decrementing the gain of the amplifier part AMP by one step if the level of the signal 14-12 is higher than the upper-limit set level.

In this case, the timing ST at which the sampling and holding is done is set to a moment that a timer has expired from a starting point that is given by the moment CT that the differential signal 14-11 resulting from differentiation of the difference signal 14-10 turns from negative to positive level. This timer, which counts emission pulses to a setting number, expires at Tt in the figure.

A release timing RT of the sampling and holding is set to a moment that a specified time t0 has elapsed since the moment that the differential signal 14-11 resulting from the differentiation of the difference signal 14-10 turns from negative to positive level. Further, a timing at which the gain of the amplifier part AMP is changed over is set to a moment that the differential signal 14-11 resulting from the differentiation of the difference signal 14-10 turns from negative to positive level. As a result, an interval Tsh in the figure is the sample-and-hold period.

Figure 14:
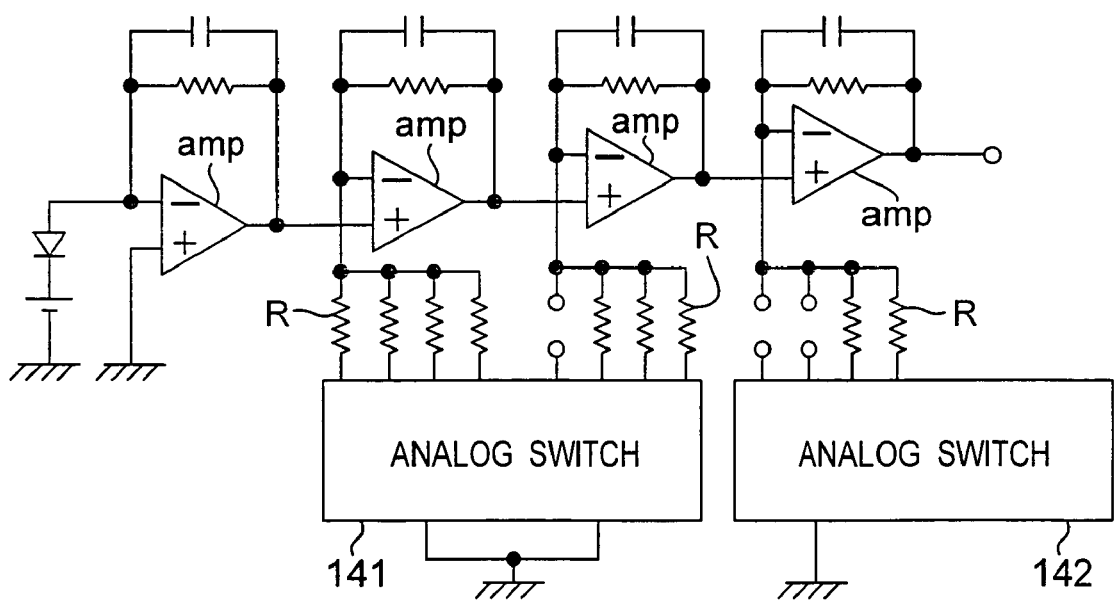
FIG. 14 is a view showing a more detailed circuit construction of the signal processing circuit of the eighth embodiment.

The constitution in which the amplification degree changing part GS changes over the gain of the amplifier part AMP can be implemented by adopting a multi-step gain changing amplification part having a circuit construction shown in FIG. 14 as an example. That is, with a plurality of gain setting resistors R arrayed, the gain of the amplifier part AMP may be changed over with a switch function using analog switches 141, 142. In a case where the amplification degree of the amplifier part AMP has to be set higher because of small output signals 14-1, 14-7 of the light receiving part 12, amplifiers amp of a proper amplification degree are connected together in a plurality of stages as illustrated in FIG. 14 in consideration of stability problems that could occur if the amplification degree is set too large in one stage. In this case also, gain setting resistors for a plurality of amplifiers amp may appropriately be changed over at a time with analog switches 141, 142.

Also, with the amplifier part AMP structured in a plurality of stages, there are some cases where setting the gain of the amplifier amp of each stage evenly causes the amplification degree of each stage to be only slightly over one-time multiplication.

In such a case, it is appropriate that gain setting resistors of a proper number of stages illustrated in FIG. 14 are set open (with the gain of 1 for those stages), while the gain of the other stages is set rather larger. The reason of this is that setting the gain of amplifier of each stage to a proximity to 1, the peaking becomes larger in terms of frequency characteristics.

Thus, with the amplifier part AMP of the signal processing circuit 14 structured as shown in FIG. 14, it becomes implementable to perform signal processing with a wide dynamic range and with proper amplification of output signals of the light receiving part 12.

Ninth Embodiment

Figure 15:
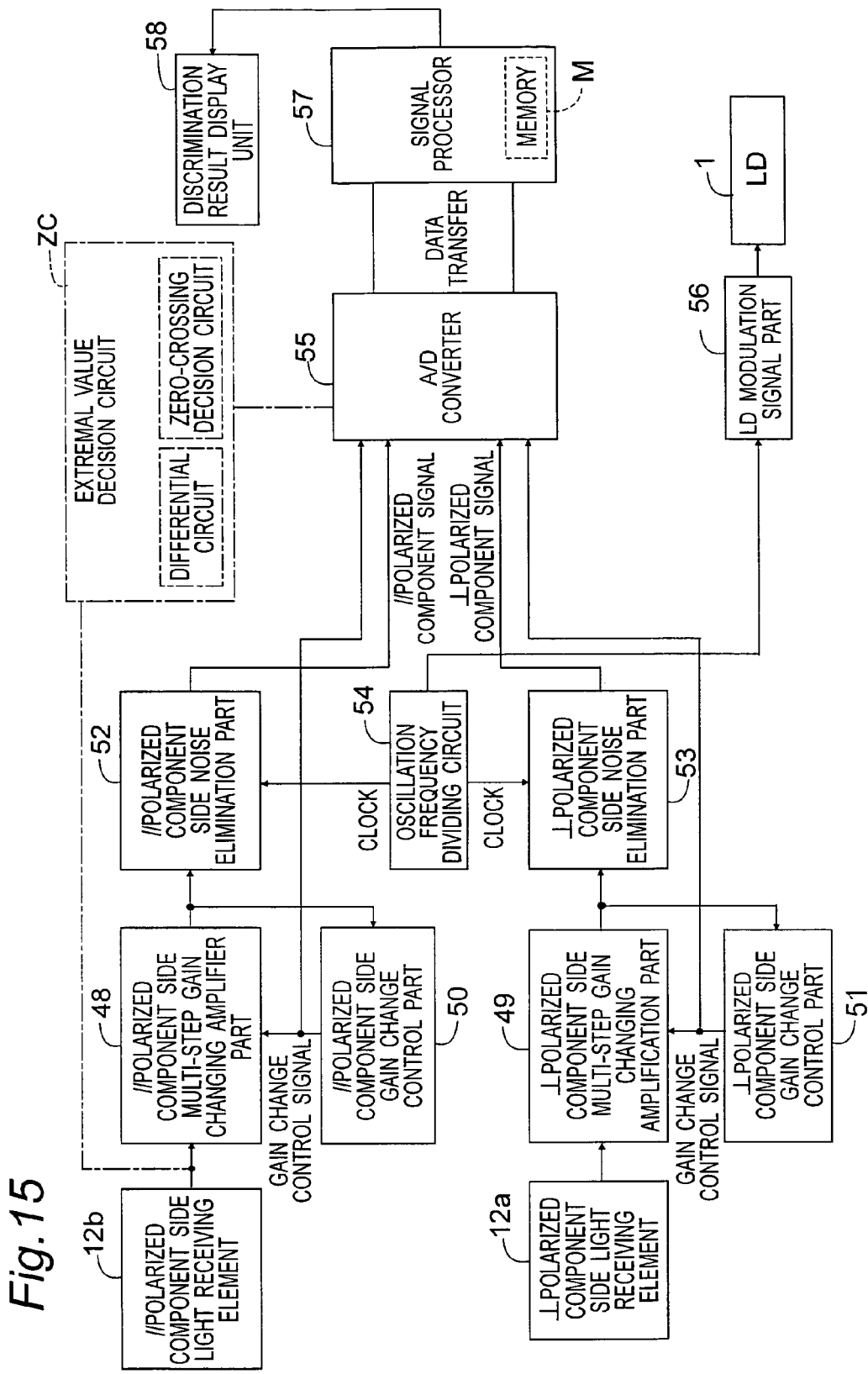
FIG. 15 is a circuit block diagram showing the construction of a signal processing system in a ninth embodiment of the invention.

Next, a block diagram of FIG. 15 shows a construction of a signal processing part included in a ninth embodiment of the optical object discriminating device of the invention. It is noted that this block diagram shows first, second light receiving elements 12b, 12a, a semiconductor laser 1, an oscillation frequency dividing circuit 54 for driving the semiconductor laser 1 by pulse modulation, and an LD modulation signal part 56. Referring to FIG. 15, a multi-step gain changing amplifier part 48, a gain change control part 50 and a noise elimination part 52 constitute a first signal processing circuit, while a multi-step gain changing amplifier part 49, a gain change control part 51 and a noise elimination part 53 constitute a second signal processing circuit. The first and second signal processing circuits, an A/D converter 55 and a signal processor 57 constitute a signal processing part.

The signal processing part of the ninth embodiment can be applied to the signal processing circuit 14 included in the foregoing fifth, sixth, seventh and eighth embodiments.

In addition, the ninth embodiment has the optical system of the fifth embodiment shown in FIG. 7, and any one of focal position shifting mechanisms shown in FIGS. 9A to 11E. Further, the optical object discriminating device of the ninth embodiment has a disturbance light noise elimination circuit shown in FIG. 12B, and an amplification degree changeover circuit shown in FIGS. 13C and 14.

In the ninth embodiment, an explanation is given on the signal processing function. In the ninth embodiment, the first light receiving element 12b shown in FIG. 15 receives a first reflected beam 7b via the first linear polarizer 13a illustrated in FIG. 7, and the second light receiving element 12a shown in FIG. 15 receives a second reflected beam 7a via the second linear polarizer 13c illustrated in FIG. 7. In the first linear polarizer 13a and the second linear polarizer 13b, polarization directions of light transmitted therethrough are orthogonal to each other.

Now the way of direction expression for the orthogonal polarization directions of the first linear polarizers 13a, 13b is defined. That is, a polarized component of the same direction as the polarization direction of emitted light of the semiconductor laser 1 is expressed as "//polarized component," and a polarized component of a direction orthogonal to this //polarized component is expressed as "⊥polarized component." A signal outputted by the second light receiving element 12a and a signal outputted by the first light receiving element 12b are in a substantially identical process flow until they are inputted to the A/D converter 55.

A //polarized component signal outputted by the first light receiving element 12b is explained. When the first light receiving element 12b detects a //polarized component, an outputted //polarized component signal is amplified by the multi-step gain changing amplifier part 48 of the construction shown in FIG. 14. An output of the amplifier part 48 is delivered to the //polarized component side gain change control part 50, where the control part 50 makes a decision as to increment, fixation or decrement, iterating this routine until a proper signal level is reached. The //polarized component signal of the proper signal level is transmitted to the //polarized component side noise elimination part 52. In this noise elimination part 52, as described with reference to FIGS. 12A and 12B, disturbance light noise elimination is performed and the resulting signal is delivered to the A/D converter 55 as a //polarized component signal. In this process, a //polarized component side gain control signal (amplifier's amplification degree signal) representing an amplification degree determined by the gain change control part 50 is also delivered to the A/D converter 55.

On the other hand, a ⊥polarized component signal outputted by the second light receiving element 12a detecting a ⊥polarized component is amplified by the multi-step gain changing amplifier part 49 shown in FIG. 14. This output of the amplifier part 49 is delivered to the polarized component side gain change control part 51, where the control part 51 makes a decision as to increment, fixation or decrement, iterating this routine until a proper signal level is reached. The ⊥polarized component signal of the proper signal level is transmitted to the polarized component side noise elimination part 53. In this noise elimination part 53, as described with reference to FIGS. 12A and 12B, disturbance light noise elimination is performed and the resulting signal is delivered to the A/D converter 55 as a ⊥polarized component signal. In this process, a ⊥polarized component side gain control signal (amplifier's amplification degree signal) representing an amplification degree determined by the gain change control part 51 is also delivered to the A/D converter 55.

The A/D converter 55, as its method, samples signals of totally four channels comprising the //polarized component signal, the //polarized component side amplifier's amplification degree signal, the ⊥polarized component light signal and the ⊥polarized component side amplifier's amplification degree signal at the same time.

Figure 16:
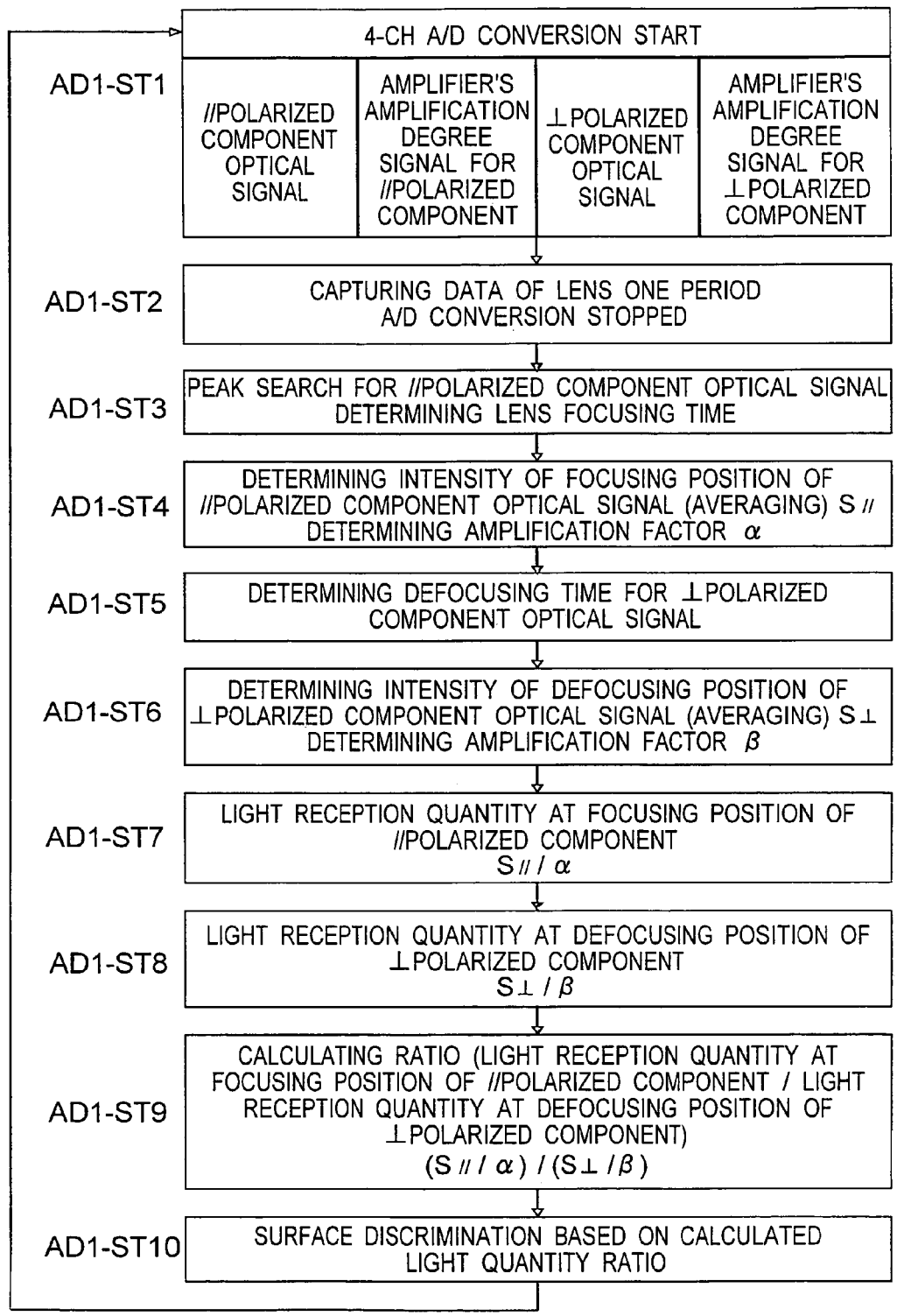
FIG. 16 is a flowchart showing signal processing operation in the ninth embodiment.

FIG. 16 shows a flowchart representing data processing between the A/D converter 55 and the signal processor 57.

First, the A/D converter 55 captures signal data of lens vibration corresponding to one period (in a case where the lens vibrating system is included). It is assumed that A/D conversion by the A/D converter 55 is triggered in an instant trigger fashion (step AD1-ST1).

Next, the A/D converter 55 performs an A/D conversion, by which signal data of the one period of lens vibration are captured into a memory M included in the signal processor 57 (step AD1-ST2). The sampling period for signal data is preferably a time interval in which several thousand pieces of signal data are acquired in one period of the lens.

A signal strength of the //polarized component signal in the focused state is desirably given by an average value of a plurality of pieces of signal data on the reference basis of signal data in the focused state, with respect to a signal data train representing strengths of //polarized component signals converted from analog to digital form by the A/D converter 55 and stored in the memory M. This is intended to reduce the influence of noise and improve the accuracy of discrimination of the measuring object 9. Also, based on a signal data train representing amplification degrees of A/D converted //polarized component signals, the amplification factor α of the amplifier part 48 at a focusing time point is determined (step AD1-ST4).

Also, a defocusing time point is determined by referencing the focusing time point. In order to give a position corresponding to the time of lens vibration by equation, a sine curve cam as shown in FIG. 10 is used as an example in the lens driving system.

As a result, a deviation X from the focal position of the objective lens 8 is given by X=a·sin ωt (mm), where if the frequency ω and amplitude a of lens vibrations are known and if a desired defocusing position X is given, then a time t at the defocusing position X can be calculated. Given a constant current flow through the lens-driving motor 22 allows the frequency ω of lens vibrations to be constant. The time t obtained by the calculation is assumed as a defocusing time (step AD1-ST5).

It is assumed that the signal strength in the defocused state is a strength averaged from a plurality of points of signal data at the defocusing time with respect to the signal data train representing strengths of the ⊥polarized component signal. This averaging is intended to reduce the influence of noise as in the description of the //polarized component signal. Further, based on the signal data train representing amplification degrees of A/D converted ⊥polarized component signals, the amplification factor β of the amplifier part 49 at a defocusing time point is determined (step AD1-ST6).

By dividing the focused-state signal strength $S_{//}$ by the signal amplification factor α, a strength $(S_{//}/α)$ of the focused-state //polarized component signal before passage through the amplifier part 48 is calculated (step AD1-ST7). Also, by dividing the defocused-state signal strength $S_⊥$ by the amplification factor β, a strength $(S_⊥/β)$ of the defocused-state ⊥polarized component signal before passage through the amplifier part 49 is calculated (step AD1-ST8).

Next, a ratio $(S_{//}/α)/(S_⊥/β)$ of the strength $(S_{//}/α)$ of the focused-state //polarized component signal to the strength $(S_⊥/β)$ of the defocused-state ⊥polarized component signal is calculated.

Alternatively, as described in the foregoing fifth and sixth embodiments, a difference $((S_{//}/α)-(S_⊥/β))$ between the strength $(S_{//}/α)$ of the focused-state //polarized component signal and the strength $(S_⊥/β)$ of the defocused-state ⊥polarized component signal may be calculated. Furthermore, a ratio of the difference $((S_{//}/α)-(S_{195}/β))$ to the strength $(S_{//}/α)$ of the focused-state //polarized component signal may be calculated (step AD1-ST9).

The value of the ratio or difference calculated at the step AD1-ST9 is compared with statistical data as to known measuring objects previously inputted in the memory M to discriminate the type of the measuring object 9 (step AD1-ST10). That is, desirably, values obtained from measurements and calculations performed as described above about measuring objects of a plurality of different types of materials are previously inputted in the memory M as known data.

After the discrimination of the type of the measuring object 9 and the output of the discrimination result to a discrimination result display unit 58 as described above, the routine immediately returns to the process of step AD1-ST1 again, where A/D conversion starts. For obtainment of more reliable results, a ratio (focused-state //polarized component signal strength)/defocused-state ⊥polarized component signal strength), which is a result of the processes from step AD1-ST1 to step AD1-ST9, is calculated. It is also possible that by iterating this process a plurality of times and by calculating an average value of a plurality of signal ratios obtained by the plurality of processes, the type of the measuring object 9 is discriminated by the calculated average value. It is noted that the unshown control part keeps the signal processing from step AD1-ST1 to step AD1-ST10 continued until the operator notifies a measurement end.

Modification Example 1 of Ninth Embodiment

Next, Modification Example 1 of the ninth embodiment is explained with reference to a flowchart shown in FIG. 17.

Figure 17:
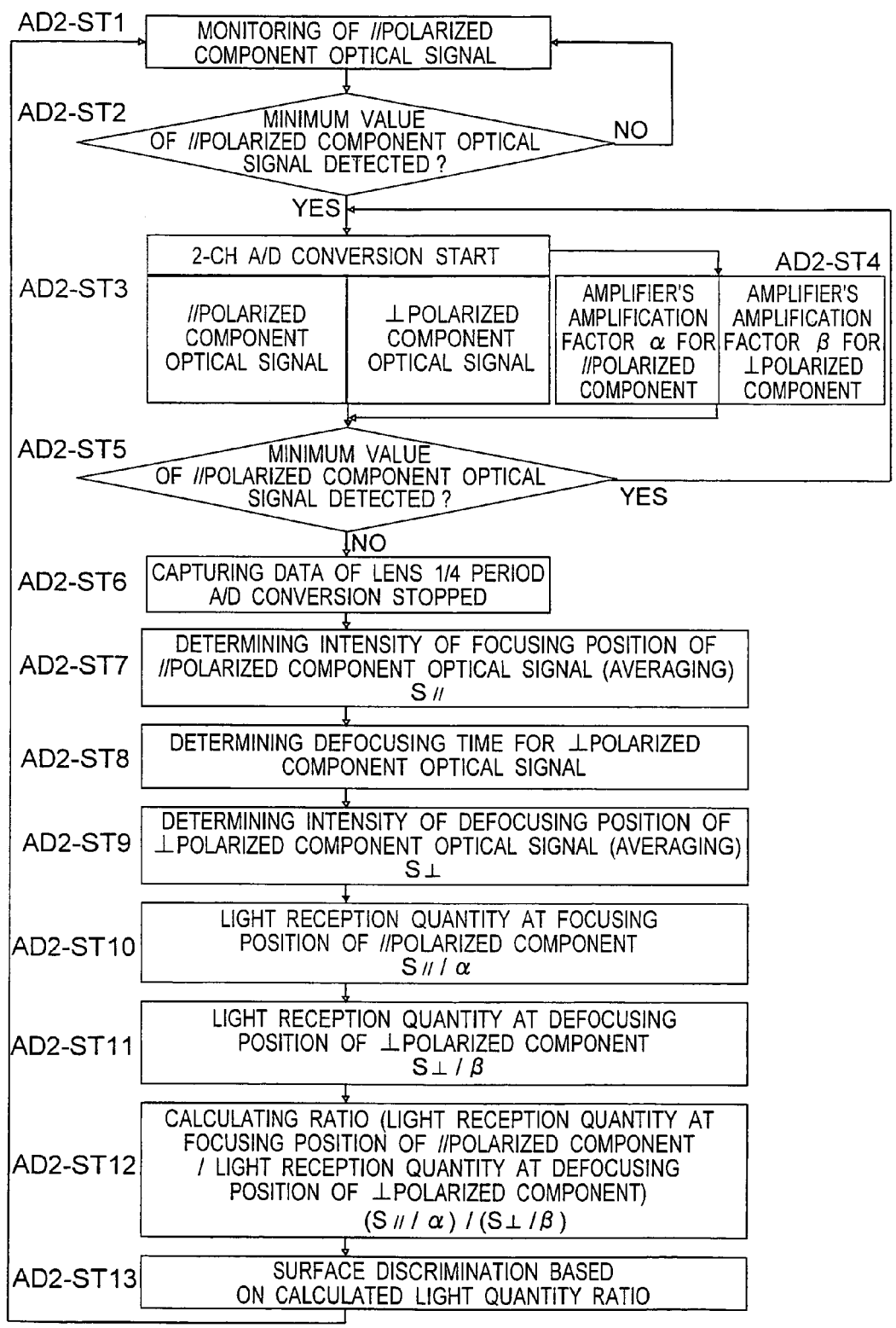
FIG. 17 is a flowchart showing signal processing operation in Modification Example 1 of the ninth embodiment.

In Modification Example 1, as shown in the flowchart of FIG. 17, detection of a peak position (time) of the focused-state //polarized component signal is performed.

First, the signal processing part (signal processing circuit 14) in FIG. 15 is monitoring a //polarized component signal outputted by the first light receiving element 12b (step AD2-ST1).

Next, an extremal value decision circuit ZC included in the signal processing part, upon deciding that the //polarized component signal assumes an minimum value, generates a trigger for a start of A/D conversion by the A/D converter 55 (step AD2-ST2). The extremal value decision circuit ZC is composed of a differential circuit and a zero-crossing decision circuit and the like.

The A/D converter 55, by the trigger, starts 2-ch concurrent A/D conversion for the //polarized component signal and the polarized component signal (step AD2-ST3).

Simultaneously with the start of this A/D conversion, the signal processor 57 captures an amplification factor α for the //polarized component signal and an amplification factor β for the ⊥polarized component signal from the A/D converter 55 (step AD2-ST4).

Even after the start of the A/D conversion, the extremal value decision circuit ZC keeps monitoring a //polarized component signal. The extremal value decision circuit ZC, upon deciding that the //polarized component signal assumes an minimum value, clears data that have been acquired by the A/D converter 55 through A/D conversion by that time, and the A/D converter 55 redoes A/D conversion.

Whereas a //polarized component signal waveform having one peak can be obtained within a half period of vibration of the objective lens 8, there are some cases where the //polarized component signal has two or more peaks within a half period of vibration of the objective lens 8, such as in cases where the surface of the measuring object 9 has large heights of unevenness. In order to meet a case where the //polarized component signal waveform has a plurality of peaks, a peak of the latest time in a half period of vibration is regarded as a true peak when the //polarized component signal waveform has two or more peaks (step AD2-ST5).

The A/D conversion is ended upon acquisition of data of a quarter of the lens vibration period. Thus, only data to be used for surface discrimination can be acquired, the time required for A/D conversion can be reduced to a large extent as compared with the case where signal data corresponding to one period of lens vibration are captured in the signal processor 57 as described in the flowchart of FIG. 16 (step AD2-ST6).

However, the amount of data captured by A/D conversion is not limited to that corresponding to a quarter period of lens vibration, and it is also possible to capture those corresponding to one period of lens vibration as in the ninth embodiment. It is assumed that the time at the focusing in the lens vibration is a time at which a trigger occurs (time at which A/D conversion starts). Also, the focus signal is given by an average value of a plurality of points subsequent to the time of focusing. As a result, influences of noise and the like can be reduced (step AD2-ST7).

A time of defocusing is determined by referencing the time when the trigger has occurred. In order to give a position versus time of lens vibration in equation, a sine curve cam as an example is used in the lens driving system. As a result, a deviation x from the focal position of the objective lens 8 is given by x=a·sin ωt (mm), where if the frequency ω and amplitude a of lens vibrations are known and if a desired defocusing position x is given, then a time t can be calculated. Given a constant current flow through the motor, the frequency ω of lens vibrations can be made constant. Then, a time point after an elapse of the time t since the time point of occurrence of the trigger is taken as a defocusing time (step AD2-ST8).

It is assumed that the signal strength in the defocused state is a strength averaged from a plurality of points of signal data at the defocusing time with respect to the signal data train representing strengths of the polarized component signal (step AD2-ST9).

Next, as with the flowchart of FIG. 16, a strength ($S_{//}/\alpha$) of the focused-state //polarized component signal before passage through the amplifier part 48 is calculated by using the amplification factor α (step AD2-ST10), and a strength ($S_{\perp}/\beta$) of the defocused-state //polarized component signal before passage through the amplifier part 49 is calculated by using the amplification factor β (step AD2-ST11).

Next, a ratio ($S_{//}/\alpha$)/($S_{\perp}/\beta$) of the strength ($S_{//}/\alpha$) of the focused-state //polarized component signal to the strength ($S_{\perp}/\beta$) of the defocused-state polarized component signal is calculated. Further, instead of the ratio, as described in the foregoing fifth and sixth embodiments, a difference between the strength ($S_{//}/\alpha$) of the focused-state //polarized component signal and the strength ($S_{\perp}/\beta$) of the defocused-state polarized component signal, or a ratio of this difference to the strength ($S_{//}/\alpha$) of the focused-state //polarized component signal may be calculated (step AD2-ST12).

The value calculated at the step AD2-ST12 is compared with statistical data of calculated values as to surfaces of measuring objects of known materials previously inputted in the memory M to discriminate the surface state of the measuring object 9 that is the object of detection (step AD2-ST13). That is, desirably, values obtained from measurements and calculations performed as described above about measuring objects of a plurality of different types of materials are previously inputted in the memory M as known data.

Immediately after the discrimination of the type of the measuring object 9 and the output of the discrimination result to the discrimination result display unit 58 as described above, the routine returns to the process of step AD2-ST1 again, where the //polarized component signal is monitored and occurrence of a trigger by the extremal value decision circuit ZC is awaited.

By performing the above-described processes a plurality of times, a plurality of (focused //polarized component signal)/(defocused ⊥polarized component signal) ratios are averaged, thus making it implementable to fulfill surface discrimination of higher accuracy by a plurality of average values.

Modification Example 2 of Ninth Embodiment

Figure 18:
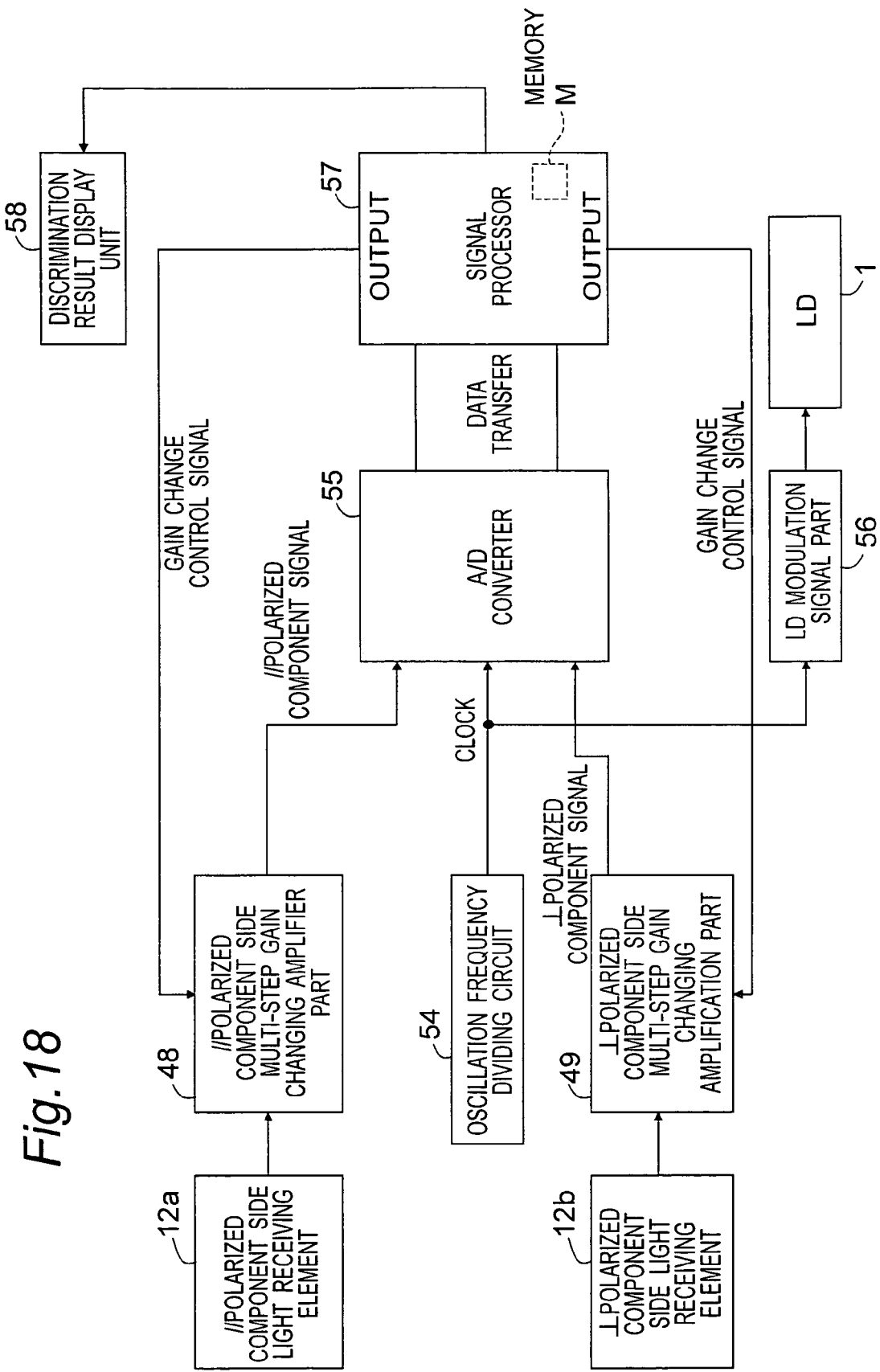
FIG. 18 is a circuit block diagram showing the construction of a signal processing system in Modification Example 2 of the ninth embodiment.

Next, a block diagram of FIG. 18 shows a construction of a signal processing part included in Modification Example 2 of the ninth embodiment. As shown in FIG. 18, this signal processing part adopts a method that processes subsequent to those by the amplifier parts 48 and 49 in FIG. 15 are fulfilled by digital signal processing. The //polarized component side first light receiving element 12*b* receives a first reflected beam 7*b* and transforms the received optical signal into electrical signal. Since emitted light emitted by the semiconductor laser 1 is subject to pulse modulation, the light receiving element 12*b* desirably has such a response speed as to be capable of following the frequency of this pulse modulation.

The //polarized component signal transformed into an electric signal by the //polarized component side first light receiving element 12*b* is amplified by the amplifier part 48. This amplifier part 48 is enabled to change over the gain in multiple steps. A control signal for the gain change is outputted from the signal processor 57 to the amplifier part 48.

The ⊥polarized component side second light receiving element 12*a* receives a second reflected beam 7*a* and transforms the received optical signal into electrical signal. The ⊥polarized component signal transformed into an electric signal by the //polarized component side first light receiving element 12*b* is amplified by the amplifier part 49. This amplifier part 49 is enabled to change over the gain in multiple steps. A control signal for the gain change is outputted from the signal processor 57 to the amplifier part 49.

A baseband signal to be used for the pulse modulation by the semiconductor laser 1 is outputted from the oscillation frequency dividing circuit 54. The baseband signal is inputted also to the A/D converter 55 as a clock signal. With the use of the pieces of data converted from analog to digital form by the A/D converter 55, the discrimination of the measuring object 9 is done. In the signal processor 57, a gain control signal is determined according to the strength of the input signal, and the gain for the amplifier parts 48 and 49 is changed over to an optimum one and reflected in the data acquisition for the next A/D conversion.

Figure 19:
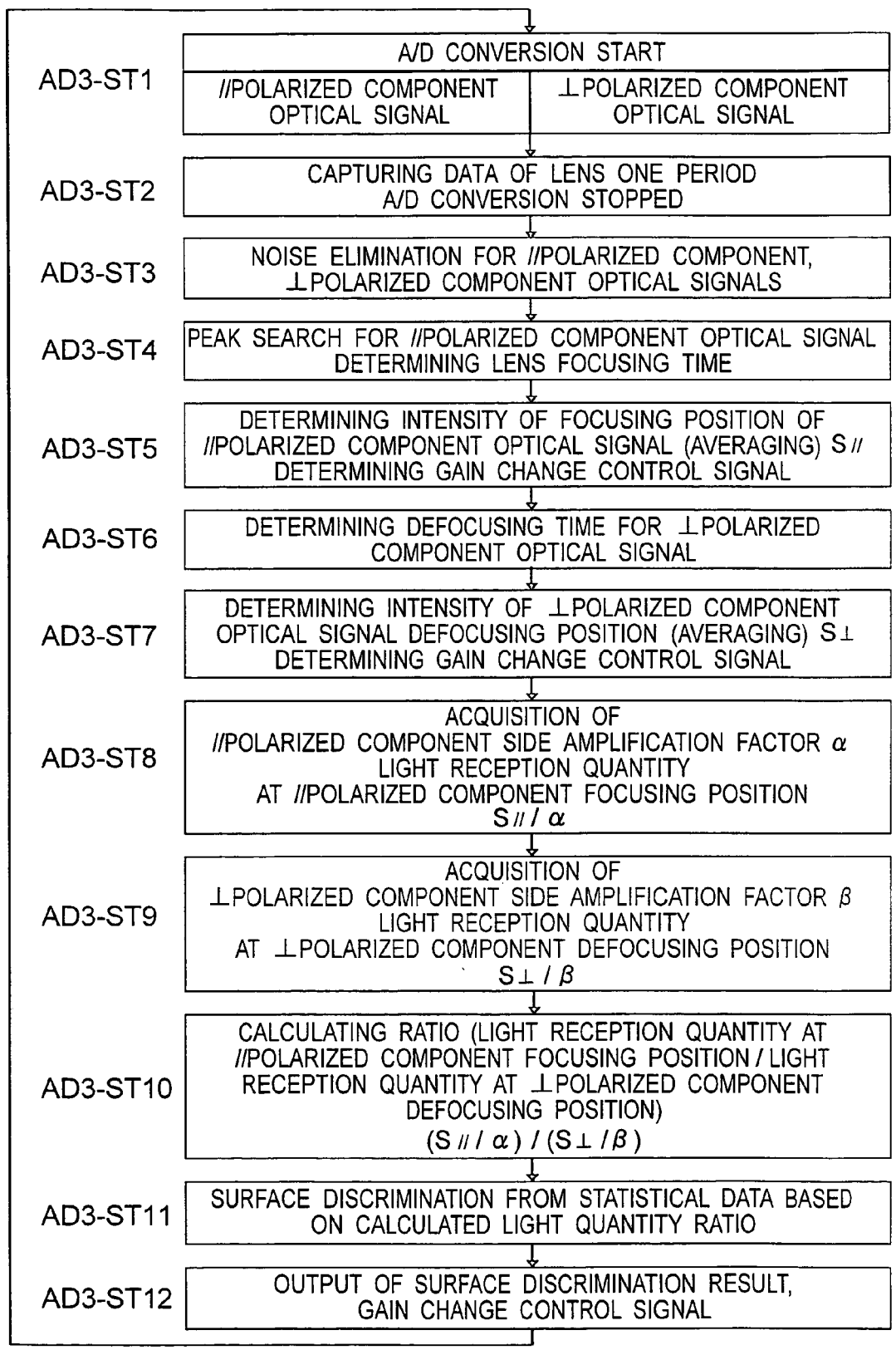
FIG. 19 is a flowchart showing operation of the signal processing system of Modification Example 2 of the ninth embodiment.

Next, processes in the A/D converter 55 and the signal processor 57 shown in FIG. 18 is explained with reference to a flowchart shown in FIG. 19.

First, the A/D converter 55 samples a //polarized component signal and a ⊥polarized component signal concurrently. It is assumed that A/D conversion by the A/D converter 55 is triggered in an instant trigger fashion (step AD3-ST1).

Next, by A/D conversion of the A/D converter 55, signal data of one-period waveform of lens vibration are captured into the memory M included in the signal processor 57, where the A/D conversion is stopped (step AD3-ST2).

Next, the signal processor 57 performs difference computations for both the //polarized component signal and the ⊥polarized component signal on a reference basis of a clock signal for LD pulse modulation. That is, as described with reference to FIGS. 13A and 13B in the foregoing eighth embodiment, with respect to the //polarized component signal, a difference computation between one signal at time "1" of the clock signal and another signal at time "0" of the clock signal is performed. Also, as disclosed with reference to FIG. 13B, with respect to the polarized component signal, a difference computation between one signal at time "1" of the clock signal and another signal at time "0" of the clock signal is performed. By this difference computation, the influence of disturbance light noise is reduced (step AD3-ST3).

Next, a peak search is performed with respect to the //polarized component signal, and a time point of a peak of the //polarized component signal is taken as a focusing time of lens vibration (step AD3-ST4).

The signal strength of the focused-state //polarized component signal is given by an average strength of strength data of a plurality of points on a reference basis of strength data of the focused-state signal in a strength data train of the //polarized component signal stored in the memory M. This is intended to reduce the influence of spike noise and improve the discrimination accuracy of measuring objects. By referencing the strength of the focused-state //polarized component signal, the signal processor 57 determines a gain change control signal for the next-time //polarized component side amplifier part 48. That is, when the //polarized component is weaker in light intensity, the signal processor 57 changes the gain change control signal so as to increase the gain of the amplifier part 48. Conversely, when the //polarized component is stronger in light intensity, the signal processor 57 changes the gain change control signal so as to decrease the gain of the amplifier part 48. Further, when the light intensity is just proper, the signal processor 57 keeps the gain of the amplifier part 48 as it is without changing the gain change control signal (AD3-ST5).

On the other hand, a time of defocusing is determined by referencing the time of focusing. In order to give a position versus time of lens vibration in equation, a sine curve cam as an example is used in the lens driving system. As a result, a deviation x from the focal position of the objective lens 8 is given by x=a·sin ωt (mm), where if the frequency ω and amplitude a of lens vibrations are known and if a desired defocusing position x is given, then a time t can be calculated. Given a constant current flow through the motor that drives the objective lens 8, the frequency ω of lens vibrations can be made constant. A time t given in this way is taken as a defocusing time (step AD3-ST6).

It is assumed that the signal strength in the defocused state is a strength averaged from a plurality of points of signal data at the defocusing time with respect to the signal data train representing strengths of the ⊥polarized component signal. This averaging is intended to reduce the influence of noise as in the case of the //polarized component signal. Further, the gain change control signal for the polarized component side amplifier part 49 is determined in the same manner as for the gain change control signal for the //polarized component side amplifier part 48 (step AD3-ST7).

In this stage, the gain change control signal for the amplifier part 48 with respect to the //polarized component signal obtained by the preceding-time A/D conversion is held remaining in the memory M of the signal processor 57. By doing so, the amplification factor α of the amplifier part 48 in the current-time focusing time is determined. Further, by dividing the strength of the //polarized component signal in the focusing position by α, a strength ($S_{//}/α$) of the //polarized component signal attributed to light received by the //polarized component side light receiving element 12b can be calculated (step AD3-ST8).

Also with respect to the polarized component signal, similarly, the preceding-time gain change control signal for the amplifier part 49 is held remaining in the memory M of the signal processor 57, by which the amplification factor β of the ⊥polarized component side amplifier part 49 at the current-time defocusing time is determined. By dividing the signal strength of the ⊥polarized component signal in the defocusing position by the amplification factor β, a strength ($S_⊥/β$) of the ⊥polarized component signal attributed to light received by the ⊥polarized component side light receiving element 12a can be calculated (step AD3-ST9).

A ratio (($S_{//}/α$)/($S_⊥/β$)) of the strength ($S_{//}/α$) of the focused-state //polarized component signal to the strength ($S_⊥/β$) of the defocused-state polarized component signal, as have been calculated in the step AD3-ST8 and step AD3-ST9, is calculated (step AD3-ST10).

Alternatively, the calculation method for the focused-state //polarized component signal and the defocused-state ⊥polarized component signal may be those for calculating the difference therebetween or the ratio of their difference to the focused-state //polarized component signal, or the like, as described in the fifth and sixth embodiments.

Next, the value calculated at the step AD3-ST10 is compared with statistical data as to known measuring objects previously inputted in the memory M to discriminate the type of the measuring object (step AD3-ST11).

Next, the signal processor 57 outputs the discrimination result of the measuring object also the surface discrimination result display unit 58, and outputs a gain change control signal to the //polarized component side amplifier part 48 and the ⊥polarized component side amplifier part 49 (step AD3-ST12).

Immediately after the signal processor 57 has outputted the signal processing result at the step AD3-ST12, the routine returns to the process of step AD3-ST1 again, where the A/D conversion starts.

For obtainment of more reliable results, it is also possible to perform the following process. That is, as a result of the processes from step (AD3-ST1) to step (AD3-ST12), a ratio (($S_{//}/α$)/($S_⊥/β$)) of the strength ($S_{//}/α$) of the focused-state //polarized component signal to the strength ($S_⊥/β$) of the defocused-state ⊥polarized component signal is calculated and the resulting ratio (($S_{//}/α$)/($S_⊥/β$)) is stored into the memory is iterated a plurality of times. Then, an average value of the plurality of times of ratios is calculated, and the measuring object is discriminated depending on the resulting average value. In this case, the signal processor 57 continues the processes from step (AD3-ST1) to step (AD3-ST12) until the operator notifies a measurement end.

Tenth Embodiment

Next, a tenth embodiment of the optical object discriminating device of the invention is explained. The tenth embodiment is an embodiment applicable to the foregoing first to ninth embodiments.

When the semiconductor laser 1 is used as a light source, it is necessary to give considerations to eye safety. In particular, in cases where the optical object discriminating device is mounted on household electrical appliances such as vacuum cleaners, it is desirable to satisfy Class 1 eye safety.

In a case where the optical object discriminating device is mounted on an vacuum cleaner, basically, it should necessarily be devised that the semiconductor laser 1 does not turn on except when the cleaner is placed on the floor surface. In the case of a vacuum cleaner on which a floor surface discrimination sensor is mounted as the optical object discriminating device of the invention, a decision as to the presence or absence of a floor surface can be made by detecting the presence or absence of reflection from the floor surface depending on light emission of the semiconductor laser 1. Of course, the detection may be done in an additional way by using another sensor.

Figure 20A:
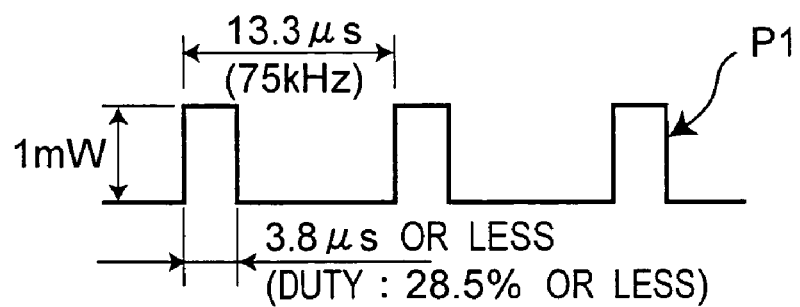
FIGS. 20A and 20B are waveform diagrams each showing an example of emission pulse waveforms of a semiconductor laser for implementing an optical object discriminating device according to a tenth embodiment of the invention.
Figure 20B:
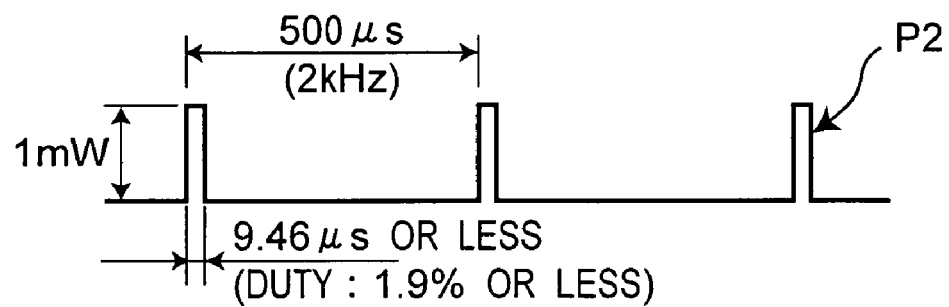

Further, as an operational condition for pulse modulation of the semiconductor laser 1 as a semiconductor light emitting element included in the floor surface discrimination sensor, for example, driving the semiconductor laser 1 by a signal having a pulse waveform shown in FIG. 20A or a pulse waveform shown in FIG. 20B allows case Class 1 eye safety to be satisfied.

Eleventh Embodiment

Next, an eleventh embodiment of the optical object discriminating device of the invention is explained. The eleventh embodiment has a configuration of Configuration Example 3 of the sixth embodiment shown in FIG. 11A including a crank mechanism as an example of the lens vibrating mechanism. As shown in FIG. 11A, a first beam 5 goes out through an optical window 35 attached to a casing 83 in which an optical system and an IC forming the signal processing circuit 14 are housed, and a reflected beam 7 reflected by the measuring object 9 is transmitted by the optical window 35 to come into the casing 83. The optical window 35 is so set as to be within the focal position of the objective lens 8 no matter which position the objective lens 8 is located within the range of lens vibrations.

As described before, since the measuring object 9 is discriminated depending on polarization disturbance of the reflected beam on the measuring object 9, light scatterers such as dust, if deposited on the optical window 35, would make a noise source that would disturb the polarization state of light.

However, in the eleventh embodiment, since the pinhole part 11 is placed at the focal position of the condenser lenses 10a and 10b, the light receiving elements 12a and 12b receive almost no light derived from other than the focal position of the objective lens 8. Therefore, even in any vibration state of the objective lens 8, by virtue of the configuration in which the optical window 35 is placed within the focal length of the objective lens 8, the first beam is never focused on the dust even if dust has deposited on the optical window 35, so that the dust never makes a noise factor. Thus, influences of dust, dirties and the like can be eliminated in the discrimination of the measuring object 9.

Twelfth Embodiment

Figure 21A:
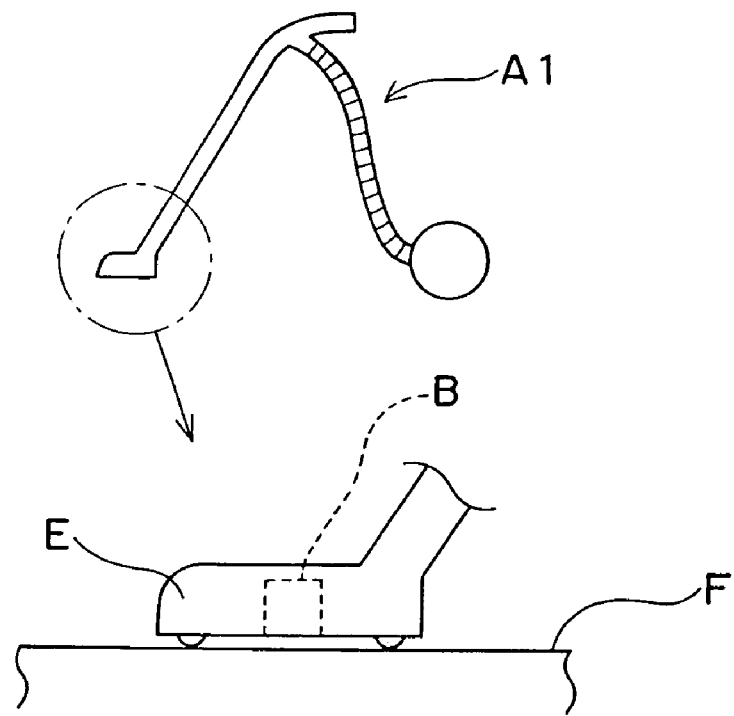
FIG. 21A is a schematic view showing a construction of a cleaner as a twelfth embodiment of the invention.

FIG. 21A shows an outlined configuration diagram in which an optical object discriminating device shown in any one of the foregoing embodiments of the invention is applied to a cleaner. A general outline of the cleaner A is shown above in FIG. 21A, while a head portion E of the cleaner A is shown under magnification below in FIG. 21A. The head portion E has wheels C, and the optical object discriminating device B is incorporated inside the head portion E. An optical window (not shown) is formed at the lower face of the head portion E, where the first beam 5 is emitted through the optical window.

Figure 21B:
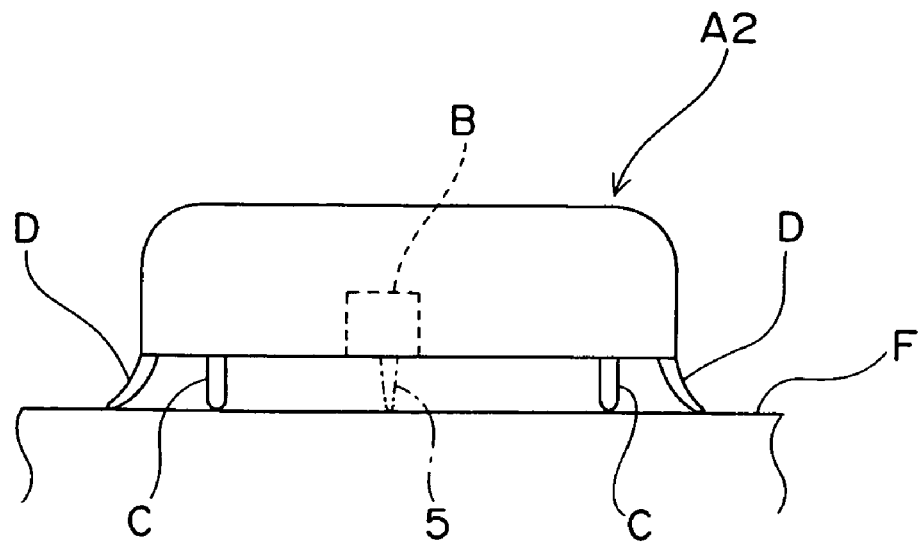
FIG. 21B is a schematic view showing a construction of a self-propelled cleaner as an embodiment of the invention.

Also, FIG. 21B shows an outlined configuration in which an optical object discriminating device shown in any one of the foregoing embodiments of the invention is applied to a self-propelled cleaner A2. An optical window (not shown) is formed at the lower face of the self-propelled cleaner main body, where the first beam 5 is emitted through the optical window as in the cleaner A of FIG. 21A. It is noted that reference character C denotes wheels, and D denotes a guide member attached to the outer edge of the main body lower face.

Generally, types of floor surfaces to be cleaned by the cleaner include flooring or other wooden surface, straw tatami mat, and carpet or other wool. Cleaners that are now commonly widespread have a need for the cleaner's operator to manually change over the operational condition according to the type of the floor surface, thus quite troublesome.

Further, self-propelled cleaners that automatically move to perform cleaning do not permit the operator to change over the operational condition, and do essentially require a sensor for discriminating the type of the floor surface. Such cleaners, by including the optical object discriminating device of the foregoing embodiments of the invention, are enabled to discriminate the type of the floor surface with high accuracy. That is, as described in the foregoing embodiments, with depolarization information about light reflection on known floor surfaces (wood, straw tatami mat, carpet) previously inputted in the memory of the signal processing circuit 14, making a comparison between the known depolarization information and a measurement result of a measuring object allows the type of the floor surface to be discriminated with high accuracy. Also, the optical object discriminating device of the seventh embodiment, having an additional function of eliminating disturbance light of sunlight, fluorescent lamps and the like, is usable even in bright environments such as an indoor environment under illumination, thus very effective for cleaners, particularly self-propelled cleaners.

Thirteenth Embodiment

Figure 22A:
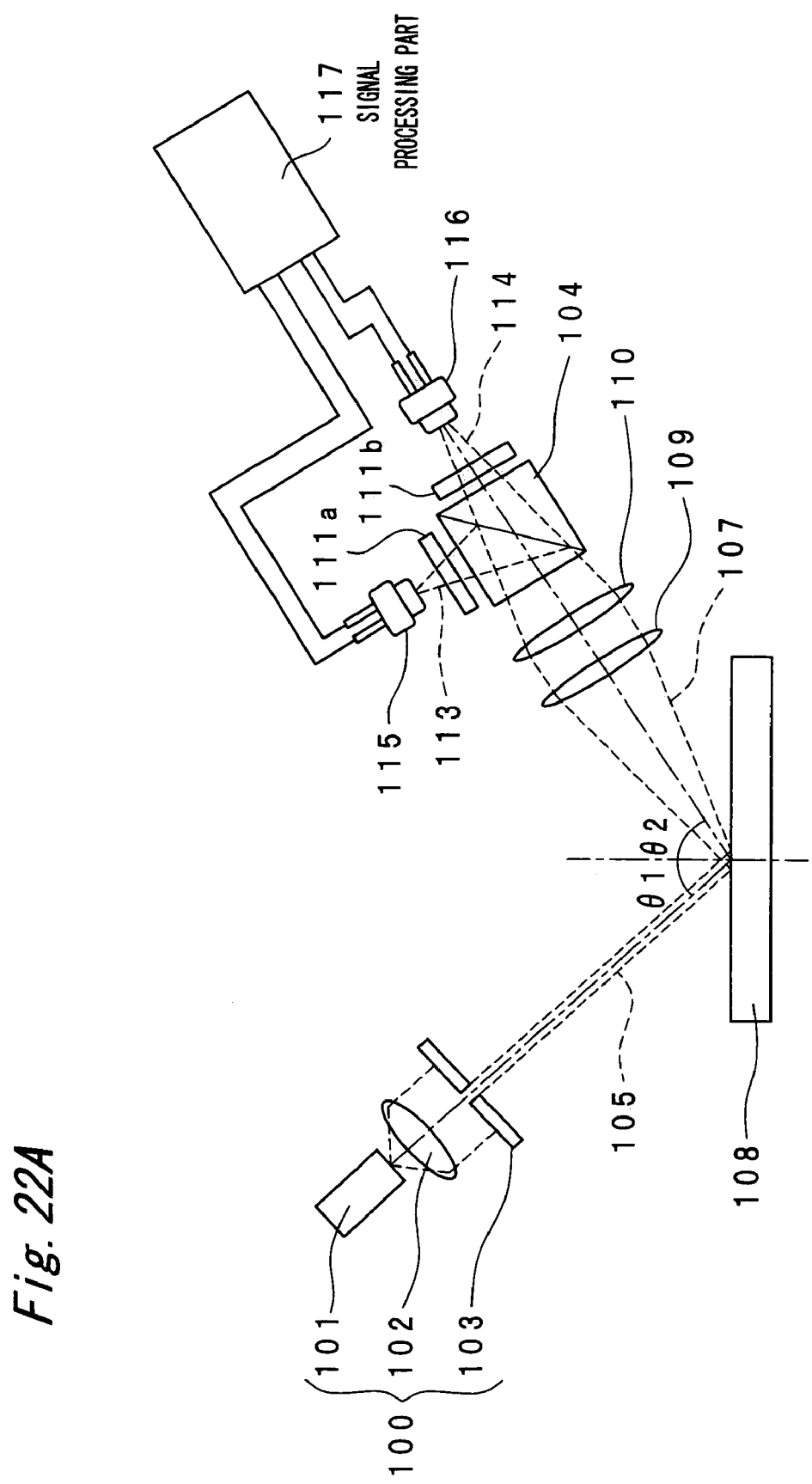
FIG. 22A is an outlined configurational view of an optical object discriminating device according to a thirteenth embodiment.

FIG. 22A is an outlined configurational view of an optical object discriminating device of a thirteenth embodiment of the invention. In FIG. 22A, only a locus of a light beam and principal optical parts are shown, and such components as those for holding the optical parts are not shown. In this case, a light emitting diode (hereinafter, referred to as LED) or a semiconductor laser (hereinafter, referred to as LD) or the like can be used as the light source, where any one of them may be used only if a light density of a specified value or more can be obtained on the measuring object. However, with an LED used, there is a need for making emitted light of the LED pass through a linear polarizer in order that polarized light of a specific direction out of the emitted light beam is made incident on the measuring object. With an LD used, on the other hand, since the emitted light beam is polarized, there is no need for linear polarizers. An LD is used in this embodiment, and this is the case also with all the other embodiments.

Light emitted from an LD 101 is converted into a collimated light beam by a collimator lens (hereinafter, referred to as CL) 102, and further transformed into a circular light beam 105 having a specified diameter by an circularly opened aperture 103. The CL 102 and the aperture 103 constitute a light projecting part 100. The beam 105 applied from the light projecting part 100 is reflected (scattered) by a measuring object 108. Part of the reflected light is condensed by a condenser part composed of two lenses 109, 110 as a reflected beam 107. As shown in FIG. 22A, the two lenses 109, 110 are a first condenser lens 109 and a second condenser lens 110 which are placed with their optical axes coincident with each other. The first condenser lens 109 is so placed that its focal point coincides with the spot of the beam 105 applied onto the measuring object 108, while the second condenser lens 110 is so placed that its focal point coincides with light receiving parts of later-described light receiving elements 115, 116. With such a placement of the optical system, the reflected beam 107 reflected by the surface of the measuring object 108 is converted into a substantially parallel beam by the first condenser lens 109, condensed by the second condenser lens 110 and condensed on light receiving surfaces of the light receiving elements 115, 116, thus being detected. In this case, in order that specularly reflected light derived from the measuring object 108 can be received, the first condenser lens 109 and the second condenser lens 110 are so placed that an angle (θ2) formed by the optical axis of the two lenses and a normal line of the surface of the measuring object 108, and an angle (θ1) formed by the optical axis of the beam 105 derived from the light source and the normal line of the surface of the measuring object 108 become equal to each other. Like this, for the beam 105 incident on the measuring object 108, the light receiving system is placed on the optical axis of the specularly reflected light, by which the reflected beam 107 can be detected with its light intensity largest. A large light intensity allows the S/N (Signal/Noise) ratio to be improved, so that the measuring object can be discriminated with high accuracy.

By a non-polarization beam splitter (hereinafter, referred to as non-polarization BS) 104 serving as a light splitting part, the reflected beam 107 condensed by the second condenser lens 110 is split into two beams, a first reflected beam 113 reflected by the non-polarization BS 104 and a second reflected beam 114 passing through the non-polarization BS 104. These first reflected beam 113 and second reflected beam 114, which are split by the non-polarization BS 104, have the same light intensity. Subsequently, the two beams have only their polarized components of mutually orthogonal directions selected via linear polarizers 111a and 111b as polarization-state selector parts, respectively, and then detected by the first light receiving element 115 and the second light receiving element 116. That is, the linear polarizers 111a and 111b are so placed that polarization directions of light permitted to pass through become orthogonal to each other. Further, any one of the linear polarizers 111a and 111b is so placed as to transmit light parallel to the polarization direction of light emitted from the LD 101.

In this case, the first and second light receiving elements 115, 116 are capable of satisfying the functions of the present invention only if they are to convert an optical signal into an electric signal. However, in particular, use of photodiodes (hereinafter, referred to as PDs) is preferable in terms of capability of downsizing the device construction and reducing its cost. Further, formation of the PD and its succeeding-stage signal processing part 117 on an identical semiconductor substrate is preferable in terms of the capability of largely reducing noise that could mix into the wire interconnecting the PD and the signal processing part 117 or the like.

Generally, when light is reflected by a reflecting surface, polarization state of the reflected light changes according to the configuration of the reflecting surface. For example, in reflection by a reflecting surface having unevenness enough smaller than the wavelength of the incident light like optical mirrors, the polarization state of the reflected light is retained. On the other hand, on condition that unevenness of the surface of the measuring object is larger than the wavelength of the light source, reflected light by the surface yields multiple scattering, giving rise to polarized components different from the components of the light source. Thus, in this embodiment, with respect to a reflected beam 107 which is derived from linearly polarized light emitted from the LD 101 and reflected by the surface of the measuring object 108, an intensity of light whose polarization direction is parallel to the linearly polarized light derived from the LD 101, and an intensity of light whose polarization direction is right-angled to the linearly polarized light derived from the LD 101, are measured. By detecting change characteristics of polarized light due to the measuring object based on the measured light intensities, the unevenness state of the surface of the measuring object can be known.

The polarization direction of the beam 105 emitted from the LD 101 is preferably vertical to the drawing sheet (S wave) in the optical system shown in FIG. 22A. The reason of this is that if the polarization direction of the beam 105 is parallel to the drawing sheet (P wave), the polarization direction after reflection would be parallel to the optical axis of the reflected beam 107, causing the reflectance to lower because light cannot exist as a longitudinal wave.

The reflected beam 107 reflected by the measuring object 108 and containing information as to the surface of the measuring object 108 as described above is two split by the non-polarization BS 104. The resulting beams, passing through the mutually orthogonal linear polarizers 111a, 111b, have their light components of the same polarization direction as the beam 105 of the LD 101 detected by the first light receiving element 115 and their light components the polarization direction vertical to the outgoing beam 105 of the LD 101 detected by the second light receiving element 116. The more the surface of the measuring object 108 is flat, the more the polarization state of light by reflection is retained, and therefore the output of the first light receiving element 115 becomes larger than the output of the second light receiving element 116.

A signal processing method for discriminating the type of the measuring object 108 by using the above characteristic is described. Since the reflectance of the measuring object 108 differs depending on its material and configuration, there is a need for detecting the light intensity of the reflected beam 107 over a wide range. Generally, if the surface of the measuring object 108 is blackish and if the unevenness of the surface is very large, there would occur quite strong scattering of the beam 105 incident on the surface, so that the reflected beam 107 would be weak light. For amplification of this weak light, increasing the amplification factor at one-stage amplifier to do the amplification would cause the circuit operation to be unstable, thus unfavorable. Therefore, the signal processing part 117 has an amplifier group in which a plurality of amplifiers are connected in series. A signal amplified to a proper level by the amplifier group is delivered to the computing part. In the computing part, signals detected by the first light receiving element 115 and the second light receiving element 116 and amplified by the amplifier group, respectively, are subjected to a division. That is, a computation represented by the following equation is performed:

(output of signal processing part)=(output of first light receiving element 115)/(output of second light receiving element 116). (13).

If the surface of the measuring object 108 has large unevenness, the beam 105 is depolarized by reflection so that the computation result of Equation (13) approaches "1." On the other hand, if the surface of the measuring object 108 has small unevenness, the beam 105 is held polarized almost as it is, so that the computation result of Equation (13) becomes a value approximated to infinite. Accordingly, by preparatorily setting surface states in correspondence to levels of computation results of measuring objects to be detected, it becomes possible to discriminate the type of the measuring object 108 according to the computation result.

Also, the computing part of the signal processing part 117 may also compute a ratio of a difference to a sum between an output of the first light receiving element 115 and the second light receiving element 116 instead of Equation (13) as shown below:

(output of signal processing part)=(difference between outputs of two light receiving elements)/(sum of outputs of two light receiving elements) (14).

In this case, if the surface of the measuring object 108 has large unevenness, outputs of the two light receiving elements 115, 116 become approximately equal to each other by depolarization of the beam 105, the value of Equation (14) approaches "0." On the other hand, if the surface of the measuring object 108 has small unevenness, the reflected beam 107 is held polarized, so that the output value of the second light receiving element 116 becomes much smaller than the output value of the first light receiving element 115, with the result that the value of Equation (14) approaches "1." Like this, since the output signal level of the computation result of Equation (14) is narrow than that of Equation (13), the construction of the signal processing part 117 can be simplified.

Figure 22B:
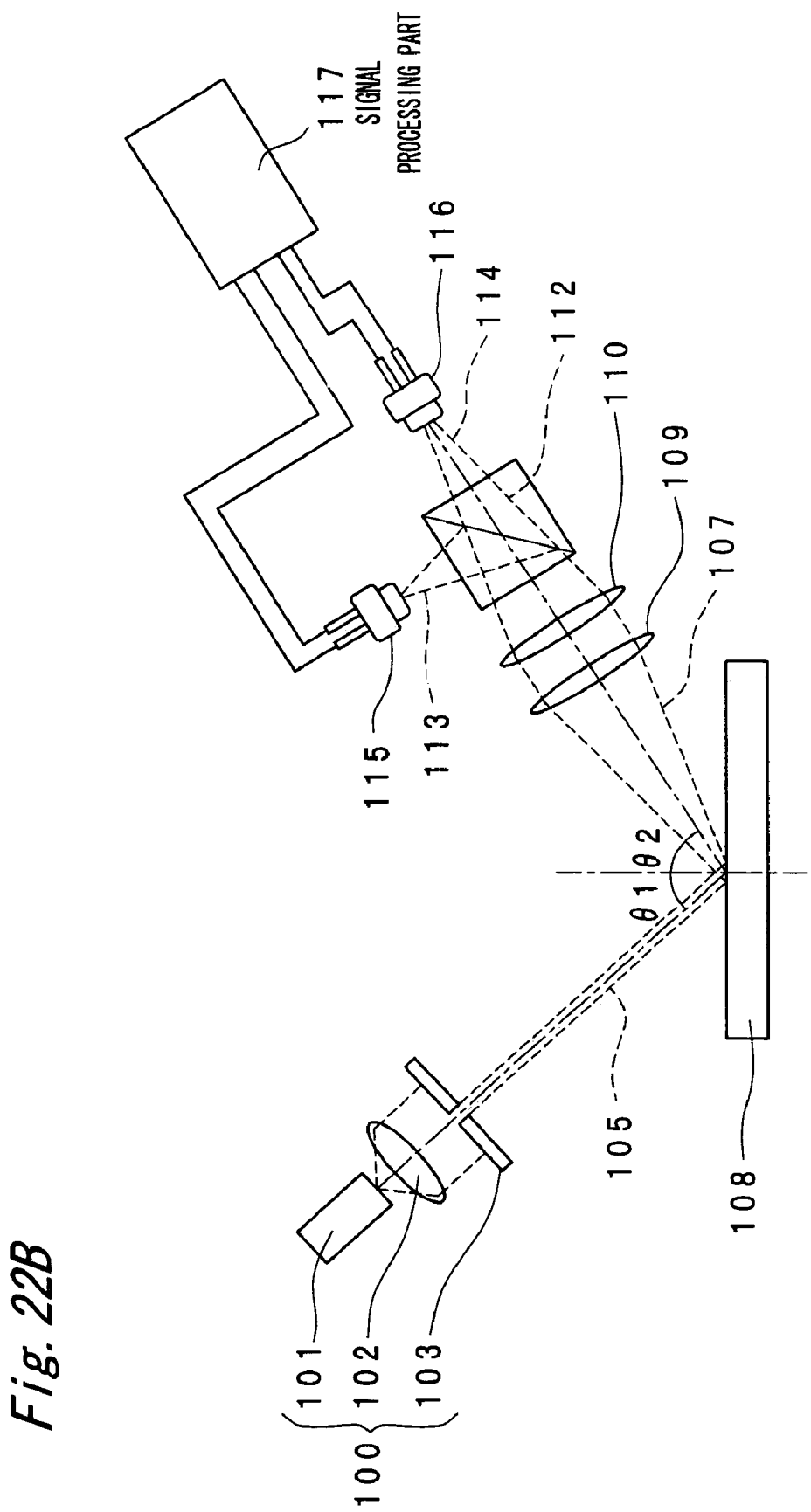
FIG. 22B is an outlined view showing a modification example of the optical object discriminating device of the thirteenth embodiment.

Furthermore, the absolutely same effects can be obtained also when the three optical parts of the non-polarization BS 104 and the linear polarizers 111a, 111b are implemented by one polarization beam splitter (hereinafter, referred to as PBS) 112 as shown in FIG. 22B. In the PBS 112, a polarization direction of a light component that passes therethrough and a polarization direction of a light component thereby reflected are orthogonal to each other, and using the PBS 112 allows the parts count to be cut down. In the following embodiments, either the combination of the non-polarization BS 104 and the linear polarizers 111a, 111b, or the PBS 112, may be used as optical parts or an optical part for splitting and polarizing the reflected beam 107.

Fourteenth Embodiment

Figure 23:
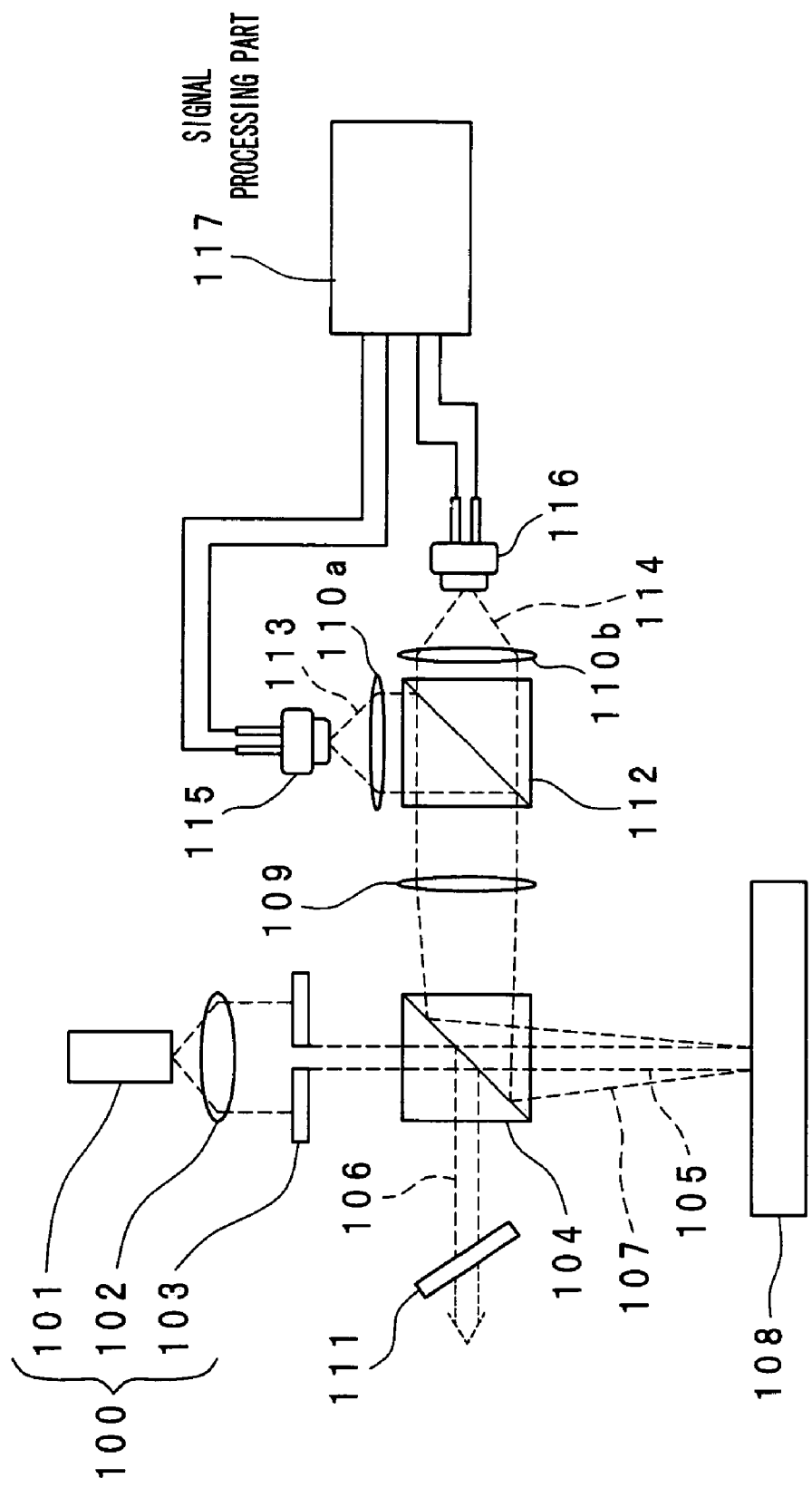
FIG. 23 is an outlined configurational view of an optical object discriminating device according to a fourteenth embodiment.

FIG. 23 is an outlined configurational view of an optical object discriminating device according to a fourteenth embodiment of the invention. In FIG. 23, only a locus of a light beam and principal optical parts are shown, and such components as those for holding the optical parts are not shown. Also, the same constituent parts of the fourteenth embodiment as those of the thirteenth embodiment are designated by the same reference numerals as those used in the thirteenth embodiment, and their detailed description is omitted.

As shown in FIG. 23, a collimated light beam 105 applied from the light projecting part 100 is split into a transmitted beam and a reflected beam by a non-polarization BS 104. It is assumed here that a light beam transmitted by the non-polarization BS 104 is a first beam 105 and a light beam reflected by the non-polarization BS 104 is a second beam 106. The first beam 105 becomes incident vertically on the surface of the measuring object 108. A reflected beam 107 reflected by the surface of the measuring object 108 becomes incident again on the non-polarization BS 104 and is reflected by the non-polarization BS 104. The light beam outputted from the non-polarization BS 104 is led by a first condenser lens 109 to a PBS 112. Since the first condenser lens 109 is so placed that its focal point coincides with a spot of the beam 105 at the surface of the measuring object 108, the reflected beam 107 outputted from the non-polarization BS 104 is formed into a nearly parallel beam by the first condenser lens 109. This beam is split by the PBS 112 into a beam 113 whose polarization direction is parallel to the emitted light derived from the LD 101 and a beam 114 whose polarization direction is vertical to the emitted light derived from the LD 101. The split beams 113, 114 are condensed by condenser lenses 110a, 10b, and received by light receiving elements 115, 116, respectively. In the optical object discriminating device of the thirteenth embodiment, unless the measuring object 108 is present at an intersection point between an irradiation optical axis formed by the light projecting part 100 and a reflectional optical axis formed by the condenser lenses 109, 110, specularly reflected components by the measuring object 108 do not become incident on the light receiving elements 115, 116. Such a state can occur, for example, when unevenness of relatively large step gap is present on the surface of the measuring object 108. In contrast to this, in the optical object discriminating device of the fourteenth embodiment, since the optical axis of reflected light on the measuring object 108 is changed by the non-polarization BS 104, the irradiation optical axis by the light projecting part 100 and the reflectional optical axis can be made aligned to each other. Accordingly, even in cases where unevenness is present on the surface of the measuring object 108, the specularly reflected light by the measuring object 108 can securely be led to the light receiving elements 115, 116. Therefore, according to this embodiment, influence of the unevenness of the surface of the measuring object 108 on the reflectional optical axis can substantially be dissolved, as compared with the thirteenth embodiment.

Figure 24:
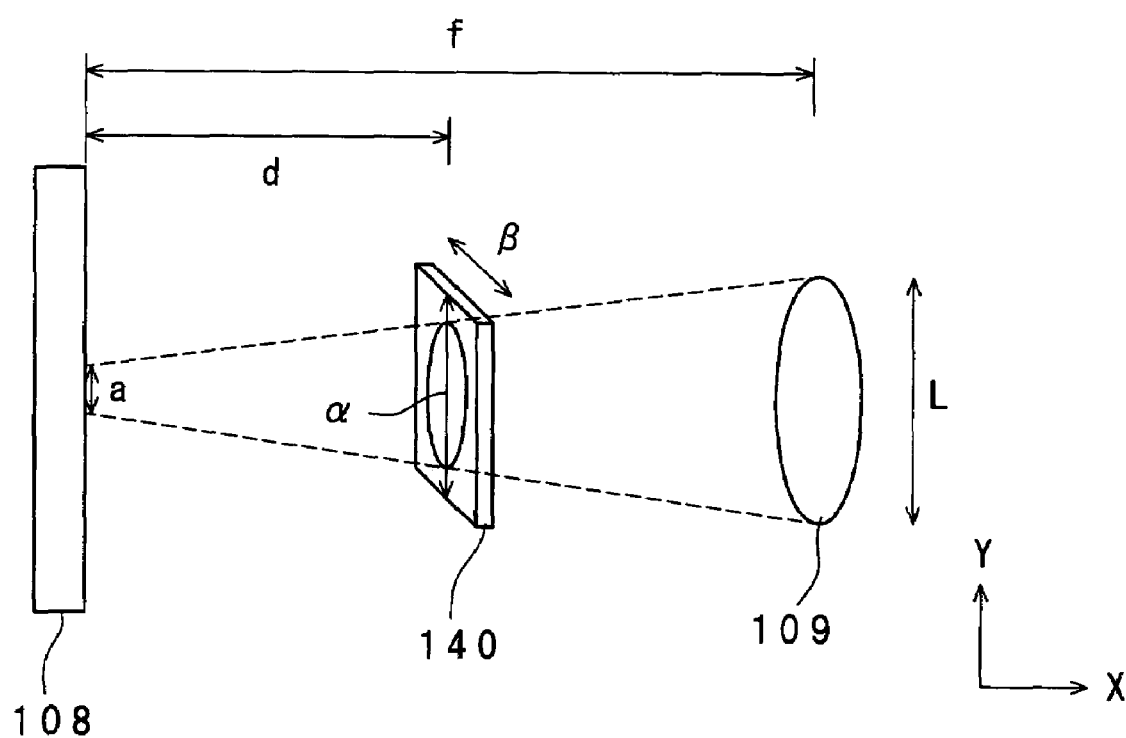
FIG. 24 is a schematic view showing an aspect in which one side of a non-polarization BS is defined.

FIG. 24 is a schematic view showing an aspect in which one side of the non-polarization BS 104 is defined, where a positional relationship among the measuring object 108, a surface of the non-polarization BS 104 closer to the non-polarization BS 104 and the lens 109 of the condenser part is shown schematically. It is noted that the surface of the non-polarization BS 104 closer to the measuring object 108 is shown by an incident surface portion 140 which is shown by cutting out a neighborhood of the surface. In FIG. 24, the x axis is along the traveling direction of the reflectional optical axis in FIG. 23, and the Y axis is along the direction vertical to the drawing sheet of FIG. 23. Referring to FIG. 23, a beam reflected by the measuring object 108 is changed in traveling direction, and a lens 109 is positioned along a direction generally right-angled to the traveling direction immediately after reflection. However, even in the case of FIG. 24, in which reflected light is not subjected to reflection by BS with its traveling direction unchanged, the relationship between the distances among the measuring object 108 and the incident surface portion of the BS 104 and the lens 109 and the dimensions of the incident surface portion 140 is equivalent to that of FIG. 23. That is, in FIG. 24, the reflectional optical axis ranging from the measuring object to the lens 109 is shown in a straight line without considering any change in the traveling direction by the BS 104.

As shown in FIG. 24, given a beam diameter 'a' of the beam 105 on the measuring object 108, a diameter L of the first condenser lens 109, a focal length f and a distance d from the measuring object 108 to the incident surface of the non-polarization BS 104, improving the S/N ratio in the signal processing part 117 necessitates increasing light beams that are to be condensed by the first condenser lens 109 as much as possible. Therefore, it is necessary that one side α of the incident surface portion 140 of the cubic type non-polarization BS 104 be larger than the spot diameter of a beam at the center of the incident surface of the BS 104. Thus, according to proportional calculation, a condition of the following Equation (1) needs to be satisfied:

$$\alpha \geq (a+L) \times d/f \quad (1).$$

In addition, in this cubic type non-polarization BS 104, lengths α, β of two sides of the incident surface are equal to each other.

Referring to FIG. 23, a second beam 106 incident on and reflected by the non-polarization BS 104 from the light projecting part 100 departs from the optical system leading to the light receiving elements 115, 116. There are some cases where the second beam 106 is reflected by, for example, the casing side wall (not shown) surrounding the optical system or the like and detected as noise light by the light receiving elements 115, 116, causing the discrimination accuracy of the measuring object to degrade. In order to eliminate this noise light, a linear polarizer 111 having a polarization direction orthogonal to the polarization direction of the noise light is placed on the optical axis of the second beam 106. Therefore, the second beam 106 is hardly permitted to pass through the linear polarizer 111. Also, the linear polarizer 111 needs to be positioned at such an angle as described below with respect to the optical axes of the first condenser lens 109 and the second condenser lenses 110a, 110b. That is, in order to prevent a beam reflected by the surface of the linear polarizer 111 from becoming incident on the light receiving elements 115, 116, the linear polarizer 111 is so positioned as not to confront the optical axes of the first condenser lens 109 and the second condenser lenses 110a, 110b. As a result, degradation of the discrimination accuracy of the measuring object 108 due to stray light of the second beam 106 can be prevented.

Figure 25:
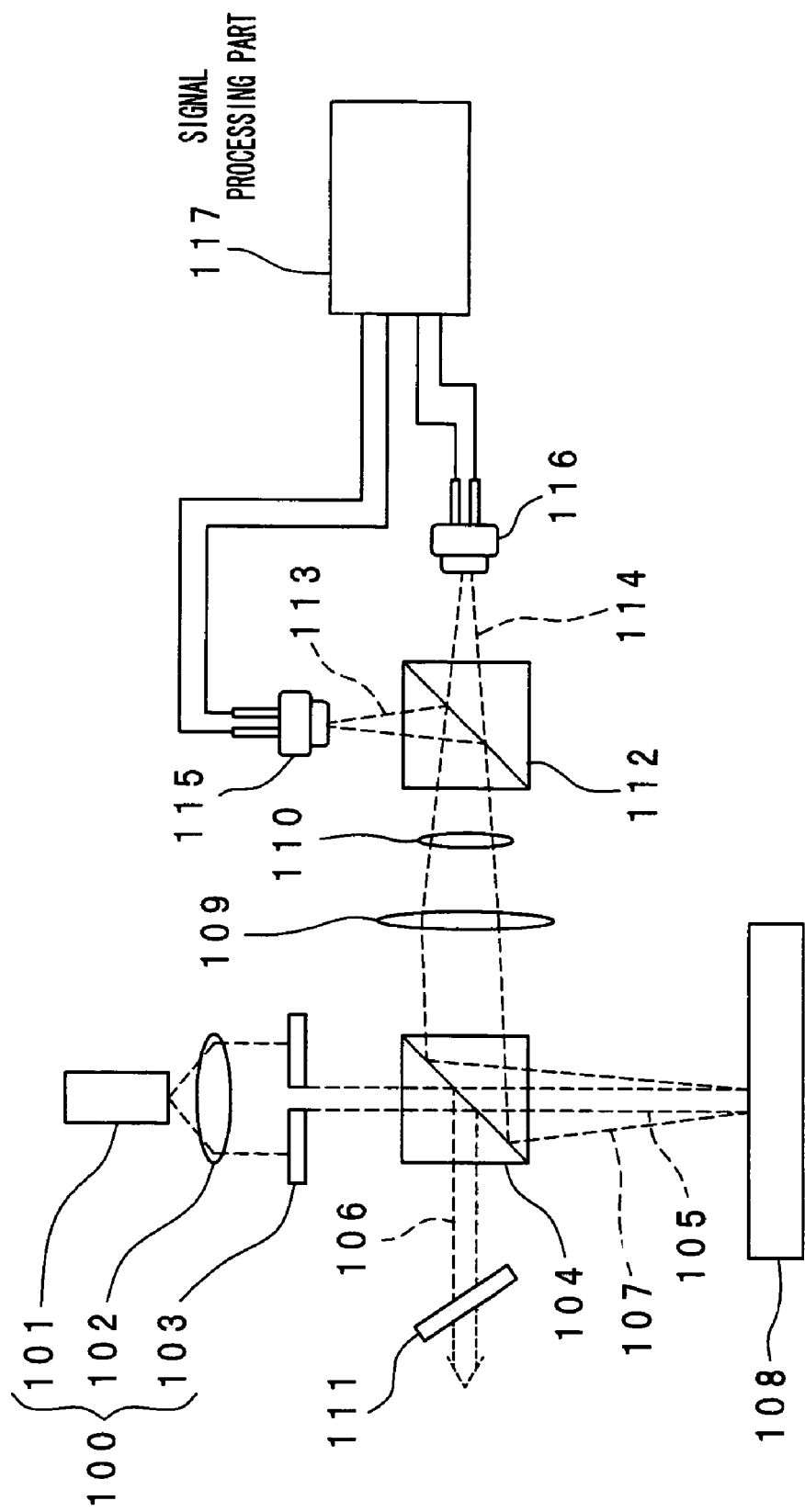
FIG. 25 is an outlined view showing a modification example of the optical object discriminating device of the fourteenth embodiment.

FIG. 25 is an outlined configurational view showing a modification example of the optical object discriminating device of the fourteenth embodiment. In FIG. 25, only a locus of a light beam and principal optical parts are shown, and such components as those for holding the optical parts are not shown. Also in FIG. 25, the same constituent parts as those of the optical object discriminating device shown in FIG. 23 are designated by the same reference numerals as those of the constituent parts in FIG. 23, and their detailed description is omitted.

In the optical object discriminating device of FIG. 25, a reflected beam 107 from the measuring object is reflected by the non-polarization BS 104, and formed into a generally collimated light beam by the first condenser lens 109. The reflected beam 107 converted into the collimated beam is condensed by the second condenser lens 110 onto the light receiving elements 115, 116. In this case, the reflected beam 107 that has passed through the second condenser lens 110 is split by the PBS 112 into a beam 113 whose polarization direction is generally parallel to the emitted light derived from the LD 101 and a beam 114 whose polarization direction is generally vertical to the emitted light.

Figure 26A:
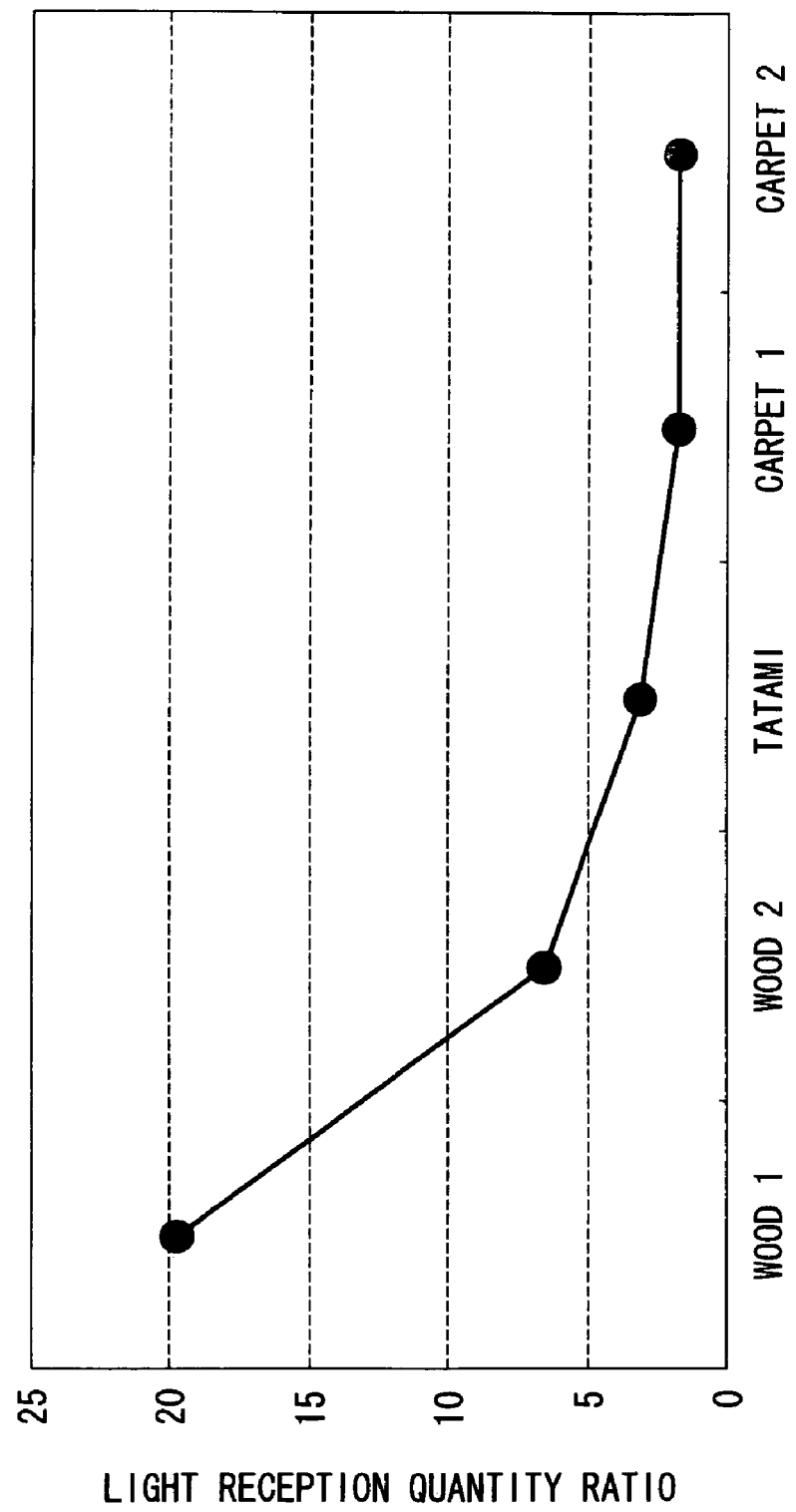
FIG. 26A is a view showing results of conducting an object discrimination experiment by an optical object discriminating device.

FIGS. 26A and 26B are views showing experiment results obtained from a discrimination experiment of objects with the optical object discriminating device of FIG. 25. In this experiment, with two kinds of floorings (expressed as "wood 1" and "wood 2" in FIGS. 26A and 26B), one kind of straw tatami mat and two kinds of carpets used as measuring objects, amounts of light reception were measured at 70 discrimination positions different from one another. FIG. 26A shows an experiment result in the case where the signal processing of above-described Equation (13) was performed, and FIG. 26B shows an experiment result in the case where the signal processing of above-described Equation (14) was performed. It can be understood that the measuring object can be discriminated by setting threshold values corresponding to floorings, straw tatami mat, carpets and the like with respect to computation results of the individual equations and by making comparisons with these threshold values. Values of computation results of Equation (13), having a large dynamic range, fall within a range of 1 to infinity, while values of computation results of Equation (14) fall within a dynamic range of 0 to 1. Accordingly, for example when the signal processing part 117 is implemented by an analog circuit, performing the computation of Equation (14) allows the circuit construction to be simplified because computation results of Equation (14) fall within a voltage range that can be represented by a normal amplifier construction.

Figure 27:
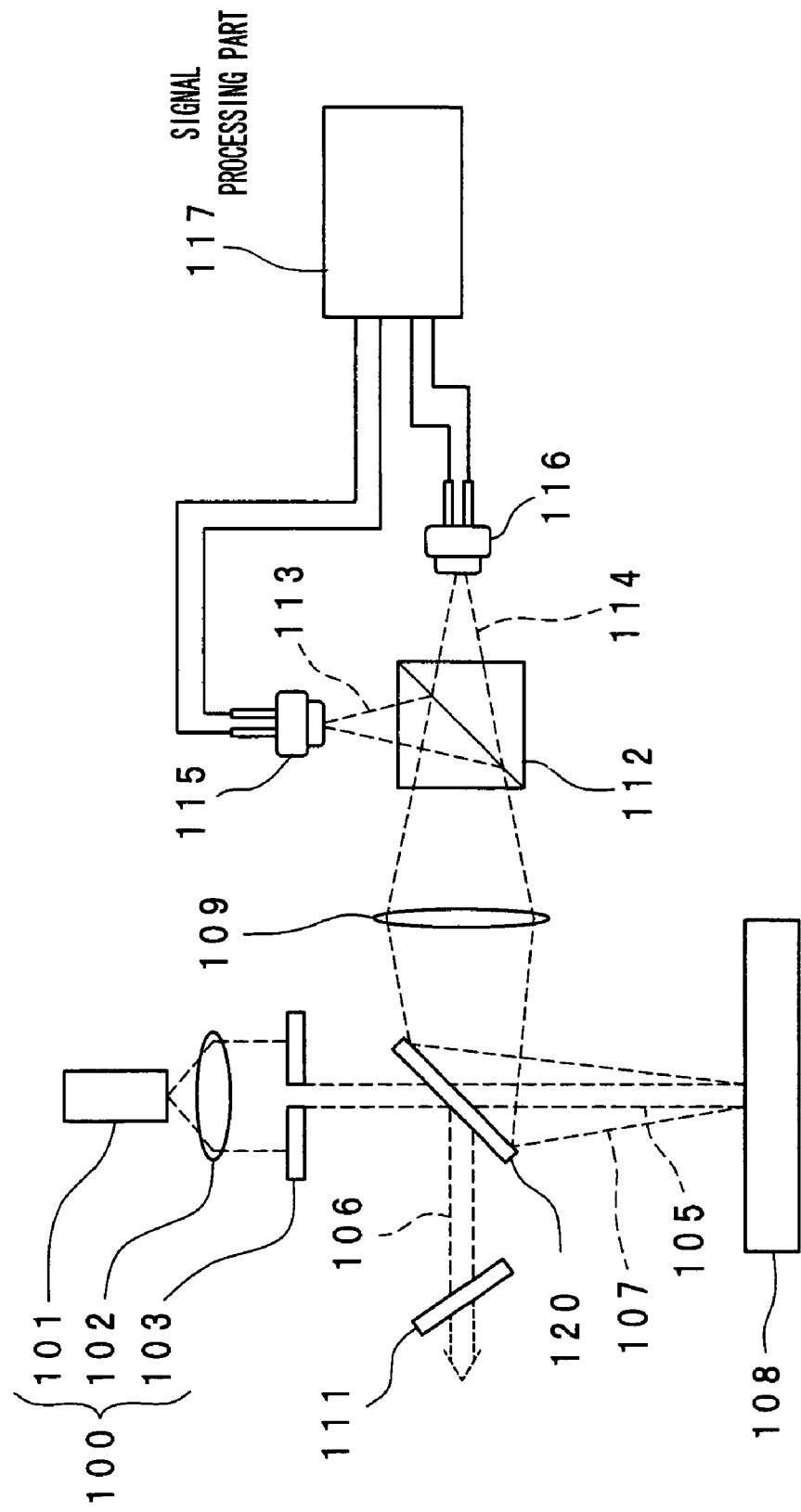
FIG. 27 is an outlined view showing another modification example of the optical object discriminating device of the fourteenth embodiment.

FIG. 27 is an outlined configurational view showing another modification example of the optical object discriminating device of the fourteenth embodiment. In FIG. 27, only a locus of a light beam and principal optical parts are shown, and such components as those for holding the optical parts are not shown. Also in FIG. 27, the same constituent parts as those of the optical object discriminating device shown in FIG. 25 are designated by the same reference numerals as those in FIG. 25, and their detailed description is omitted.

In the optical object discriminating device of FIG. 27, a beam of light emitted from a light projecting part 100 is split into a first beam 105 transmitted by a half mirror (hereinafter, referred to as HM) 120 and a second beam 106 reflected by the HM 120. The first beam 105 becomes incident on the measuring object 108. A reflected beam 107 from the measuring object 108 is reflected by the HM 120, and condensed by the first condenser lens 109. Like this, in this modification example, the HM 120 is used as the light branching part instead of the non-polarization BS 104 of FIG. 25.

With the cubic type non-polarization BS 104 used as the light branching part as in FIG. 25, although the side face of the BS 104 is normally antireflection-coated, yet the reflected beam is slightly reflected by this side face. Since the side face of the BS 104, is vertical to the optical axis extending from the BS 104 to the light receiving elements 115, 116, the slight beam reflected by the side face of the BS 104 becomes incident on the light receiving elements 115, 116, resulting in noise. In order to eliminate this noise, there is a need for, in the signal processing part 117, previously storing a light quantity corresponding to the noise and subtracting a signal corresponding to the light quantity from a received signal. This noise-equivalent light quantity, which is proportional to the light quantity of the LD 101, may vary on the time base due to, for example, secular changes of the LD 101 or the like, making it hard to completely eliminate noise.

In contrast to this, with the use of the HM 120, since the surface of the HM 120 is not vertical to the optical axis leading to the light receiving elements 115, 116, the reflected beam from the HM 120 surface never becomes incident on the light receiving elements 115, 116, in principle. Accordingly, there is no need for the process of eliminating any noise signal in the signal processing part 117.

Conditions that the dimensions of the HM 120 should satisfy can be determined by using FIG. 24. That is, referring to FIG. 24, it is assumed that the beam diameter of the first beam 105 applied from the light projecting part 100 on the measuring object 108 is a, the diameter of the first condenser lens 109 is L, the focal length is f, and the distance from the measuring object 108 to the HM 120 is d. In this discussion, the incident surface portion 140 of FIG. 24 is replaced with the HM 120. In this case, for improvement of the S/N ratio in the signal processing part 117, it is necessary that all of the light beams that can be condensed by the first condenser lens 109 should be made incident on the HM 120. Accordingly, the side length of the HM 120 needs to be larger than the spot diameter of the light beam at the center of the HM 120. Thus, the value α of one side of the HM 120 needs to satisfy following Equation (2) according to proportional calculation. Further, the value β of the other side of the HM 120 needs to satisfy following Equation (3):

$$\alpha \geq (a+L) \times d/f \quad (2)$$

$$\beta \geq 2^{1/2}(a+L) \times d/f \quad (3).$$

Further, in FIG. 27, since the optical system between the HM 120 and the PBS 112 is implemented by only one lens of the first condenser lens 109, the optical parts count can be reduced, and the optical system can be lower-priced.

Fifteenth Embodiment

Figure 28:
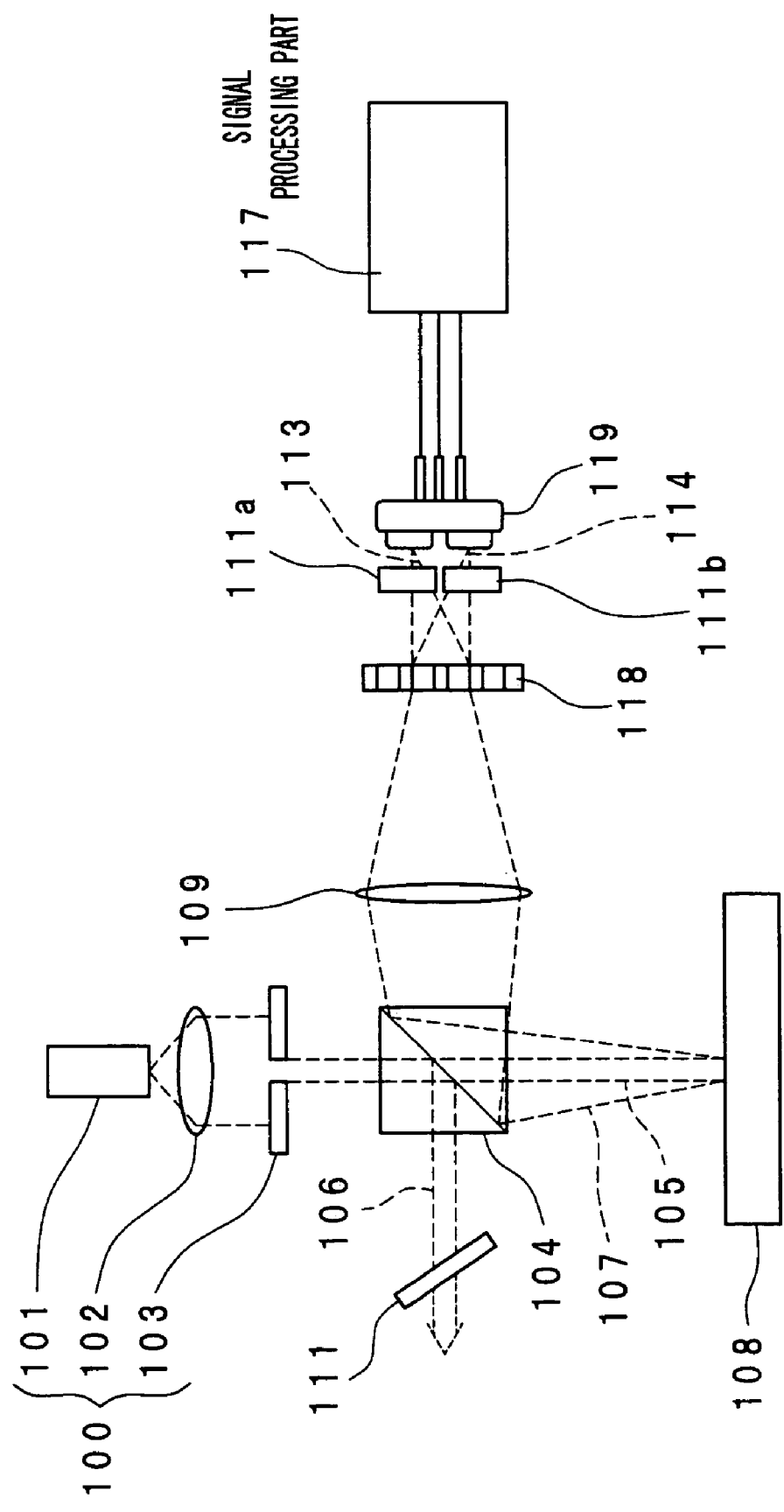
FIG. 28 is an outlined configurational view of an optical object discriminating device according to a fifteenth embodiment.

FIG. 28 is an outlined configurational view of an optical object discriminating device according to a fifteenth embodiment of the invention. In FIG. 28, only a locus of a light beam and principal optical parts are shown, and such components as those for holding the optical parts are not shown. In the optical object discriminating device of FIG. 28, the same constituent parts as those of the optical object discriminating device shown in FIGS. 22A and 22B are designated by the same reference numerals as those in FIGS. 22A and 22B, and their detailed description is omitted.

In the optical object discriminating device of the fifteenth embodiment, the reflected beam 107 by the measuring object 108 is reflected by the non-polarization BS 104, and condensed by the first condenser lens 109. The reflected beam 107 condensed by the first condenser lens 109 is split by a diffraction grating 118. The beam diffracted by the diffraction grating 118 passes through a linear polarizer 111a by which light whose polarization direction is parallel to the emitted light derived from the LD 101 is transmitted and through a linear polarizer 111b by which light whose polarization direction is right-angled to the emitted light derived from the LD 101 is transmitted. As a result, a beam 113 whose polarization direction is parallel to the emitted light derived from the LD 101 and a beam 114 whose polarization direction is right-angled to the emitted light derived from the LD 101 are extracted. The beams 113, 114 of the above polarized components are received by a divided type PD 119, and converted into electric signals proportional to light intensities of those beams 113, 114.

In this case, the diffraction grating 118 may alternatively extract +1st-order diffracted light and −1st-order diffracted light. As a result of extracting the +1st-order diffracted light and −1st-order diffracted light by the diffraction grating 118, the extracted beams 113, 114 become generally equal in light quantity to each other, so that the accuracy of light reception at the divided type PD 119 can be improved. Otherwise, for the diffraction grating 118, it is preferable to set the light quantity of the 0th-order diffracted light to substantially zero. When the 0th-order diffracted light that is not used for the discrimination of measuring objects is set to substantially zero, optical loss at the diffraction grating can be suppressed and the S/N ratio at the light receiving elements can be improved.

Further, the diffraction grating 118 may also be the blazed type. Using a blazed type diffraction grating makes it possible to adjust the light quantity of any desired order number. Therefore, the degree of freedom for design of the optical object discriminating device is expanded, so that more efficient design can be achieved. With a blazed type diffraction grating, light is diffracted most intensely to the 0th-order diffracted light and the 1st-order diffracted light, so that the use efficiency of light can be enhanced.

In the most preferable embodiment of this embodiment, a divided type PD is used as the light receiving element and a blazed type diffraction grating is used as the diffraction grating, with such a design that the 0th-order diffracted light and the 1st-order diffracted light become substantially equal in light quantity to each other. As a result of this, loss at the diffraction grating can be suppressed to a minimum, and the measurement accuracy of light quantity at the light receiving element can be maximized, and thus the discrimination accuracy of the measuring object can be improved. Furthermore, using a divided type PD allows a low-priced, easy-to-downsize light receiving system to be made up.

Sixteenth Embodiment

Figure 29:
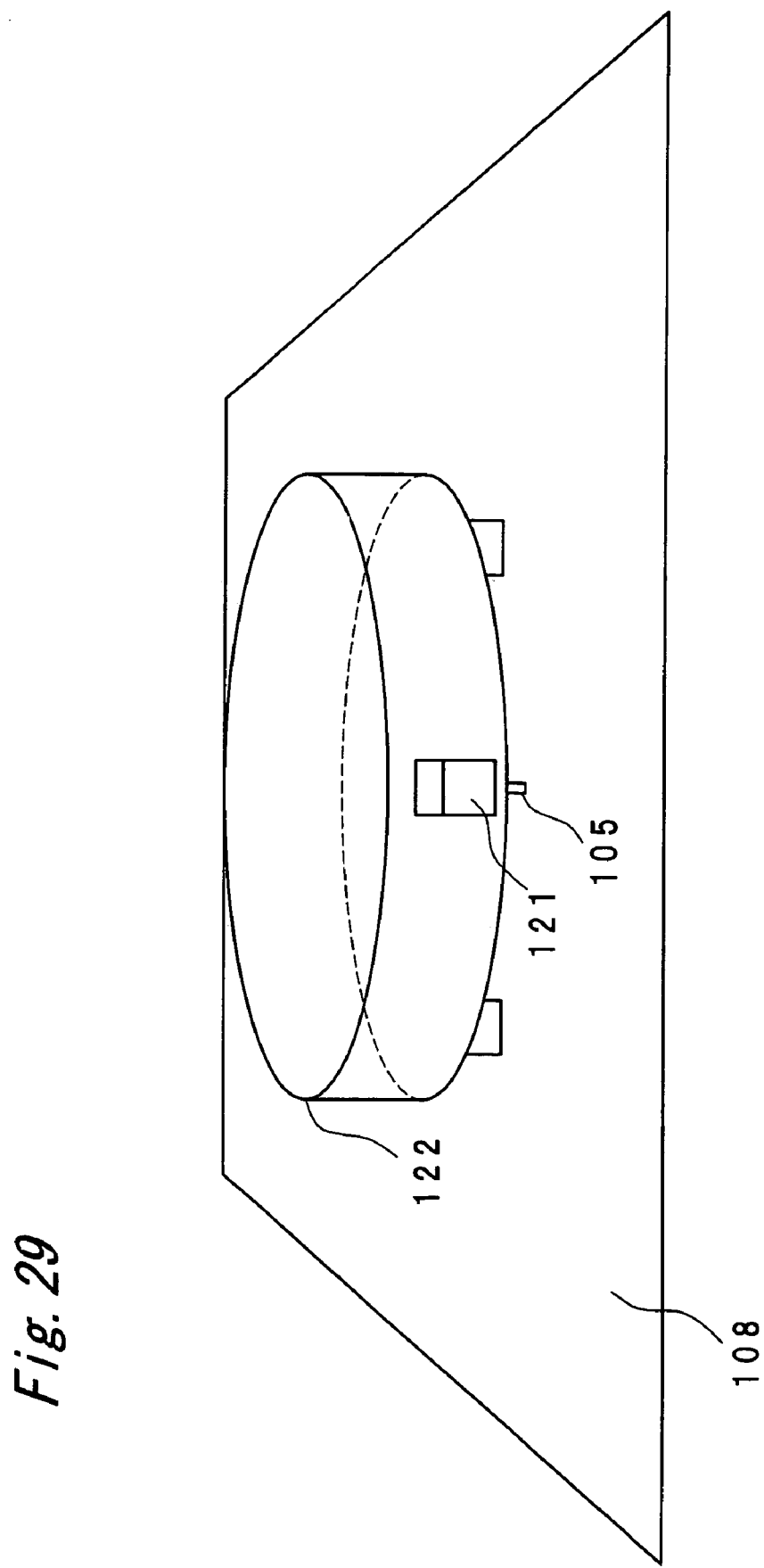
FIG. 29 is an outlined configurational view of a self-propelled cleaner according to a sixteenth embodiment of the invention.

FIG. 29 is an outlined configurational view of a self-propelled cleaner according to the present invention. This self-propelled cleaner 122 has an optical object discriminating device 121 of the invention mounted at a bottom portion, and a first beam 105 is emitted toward a floor surface 108 via an optical window (not shown) provided at the bottom face.

Generally, the types of floor surfaces to be cleaned by the cleaner include floorings, straw tatami mats, carpets and the like. For commonly widespread cleaners, there has conventionally been a need for the operator to manually change over the operational condition according to the type of the floor surface, quite troublesome disadvantageously. Therefore, self-propelled cleaners that automatically move to perform the cleaning have been under development, and these self-propelled cleaners indispensably need a sensor for discriminating the type of the floor surface for automatic changeover of the operational condition. Thus, in such self-propelled cleaners, the optical object discriminating devices of the thirteenth to thirteenth embodiments can be used. That is, depolarization (change) information in light reflection by specified floor surfaces (flooring, straw tatami mat, carpet etc.) is previously stored in a storage part of the optical object discriminating device, and a comparison between the information and measurement results by the light receiving part is made, by which the type of the floor surface 108 to be cleaned can be discriminated with high accuracy. Consequently, a self-propelled cleaner capable of performing cleaning operation with accuracy and high efficiency can be obtained.

Seventeenth Embodiment

Figure 30:
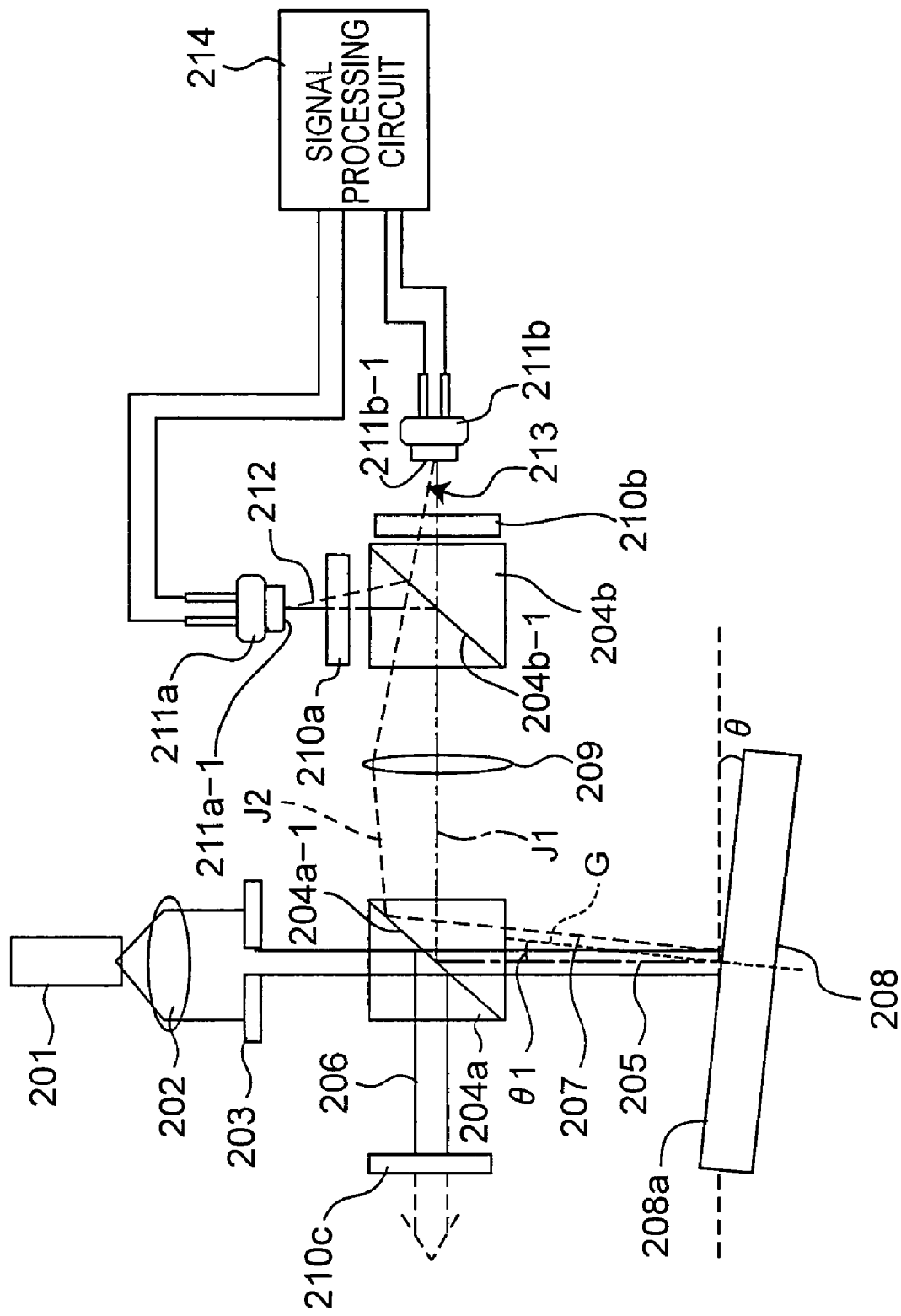
FIG. 30 is a schematic view showing an outlined configuration according to a seventeenth embodiment of the optical object discriminating device of the invention.

FIG. 30 is an outlined configurational view of an optical object discriminating device according to a seventeenth embodiment of the invention. In FIG. 30, only a locus of a light beam and principal optical parts are shown, and such components as those for holding the optical parts are not shown. In this case, the semiconductor light emitting element, which is the light source, can be given by, for example, a light emitting diode (LED) or a laser diode (LD), either of which may be adopted only if its light quantity of a first beam 205 to be let incident on a surface 208a of a measuring object 208 shows a specified value or more. However, the LD, which is superior in collimating property and more uniform in polarization direction as compared with the LED, lend itself to easier explanation of operations of the invention. Therefore, an LD is employed as an example of the semiconductor light emitting element in the following embodiments of the invention.

In the optical object discriminating device of the seventeenth embodiment, an LD 201, a CL 202, a circularly opened aperture 203, and a non-polarization beam splitter 204a as a first light branching element constitute a light projecting part.

The optical object discriminating device of the seventeenth embodiment includes a first condenser lens 209, a non-polarization beam splitter 204b as a second light branching element, first and second linear polarizers 210a, 210b for selecting a polarization state, first and second light receiving elements 211a, 211b implemented by photodiodes or the like, and a signal processing circuit 214 as a signal processing part.

A polarization state selected by the first linear polarizer 210a and a polarization state selected by the second linear polarizer 210b are orthogonal to each other and, as an example, a polarization state selected by the first linear polarizer 210a is taken as a polarization state of emitted light of the LD 201.

Light emitted from the LD 201 is converted into a parallel beam of light by the CL 202, and only part of the parallel beam around the beam center that becomes generally uniform in light intensity is permitted to pass through a circular opening of the aperture 203. As a result of this, the beam cross-sectional configuration of the parallel beam is transformed into a circular shape.

Then, the parallel beam becomes incident on the non-polarization beam splitter 204a, and is split into a first beam 205 that passes through the non-polarization beam splitter 204a, and a second beam 206 that is reflected by the non-polarization beam splitter 204a to go on generally parallel to the surface 208a of the measuring object 208.

Although the non-polarization beam splitter 204a is implemented by a cubic type beam splitter in an example shown in FIG. 30, yet similar effects can be obtained even if a plate type half mirror is adopted. Also, although the LD 201 is adopted as the light source, yet an LED may also be adopted as described above. However, in the case where the LED is used as the light source, it is necessary to convert the light beam irradiated from the LED into generally parallel light by using a proper lens, further convert the light into linearly polarized light via a polarizer, and reshape the light beam into an optimum configuration with an aperture having a proper diameter. The direction of polarization by the polarizer for conversion into linearly polarized light needs to be horizontal or vertical to the direction of polarization by the first, second linear polarizers 210a, 210b included in a later-described light receiving part. The description as to the non-polarization beam splitter 204a and the semiconductor laser 201 as the semiconductor light emitting element given above is applicable to every embodiment given below, and the description is omitted hereinbelow.

The second beam 206 reflected by the non-polarization beam splitter 204a departs from the optical system that covers the first beam 205 after the non-polarization beam splitter 204a. There are some cases where the second beam 206 may be reflected by, for example, the casing side wall (not shown) surrounding the optical system or the like and detected as noise light by the light receiving elements 211a, 211b. In order to eliminate this noise light, a linear polarizer 210c that transmits light of a polarization direction orthogonal to the polarization direction of the second beam 206 is placed as a stray light prevention part on the optical axis of the second beam 206. As a result of this, the second beam 206 is inhibited from passing through the linear polarizer 210c, thus not being applied to the casing side wall and not making a noise light source.

A reflected beam 207 reflected by the surface 208a of the measuring object 208 is reflected by the non-polarization beam splitter 204a, condensed by the first condenser lens 209, and split into two beams, a first reflected beam 212 and a second reflected beam 213, by the non-polarization beam splitter 204b serving as a second light branching element. These first, second reflected beams 212, 213 are detected by the first, second light receiving elements 211a, 211b via the first, second linear polarizers 210a, 210b whose polarization directions of transmission are orthogonal to each other, respectively. These first, second light receiving elements 211a, 211b are photodiodes, as an example.

The first, second received signals detected by the first, second light receiving elements 211a, 211b are each inputted to the succeeding-stage signal processing circuit 214, where the signal processing circuit 214 calculates a ratio of the first received signal to the second received signal.

FIG. 30 shows, by one-dot chain line, a specular reflection optical axis J1 in the case where a normal line of the surface 208a of the measuring object 208 coincides with the optical axis of the first beam 205 (i.e., the inclination angle θ of the measuring object 208 is 0°). Also, FIG. 30 shows, by broken line, a specular reflection optical axis J2 in the case where the normal line G of the surface 208a of the measuring object 208 is inclined by an angle θ1 from the optical axis of the first beam 205. This specular reflection optical axis J2 is inclined by the angle θ1 from the normal line G toward the side opposite to the first beam 205.

As shown in FIG. 30, in either case where the inclination angle θ of the measuring object 208 is 0° or θ1, the specular reflection optical axes J1, J2 are incident on the first light receiving element 211a and the second light receiving element 211b.

Figure 31:
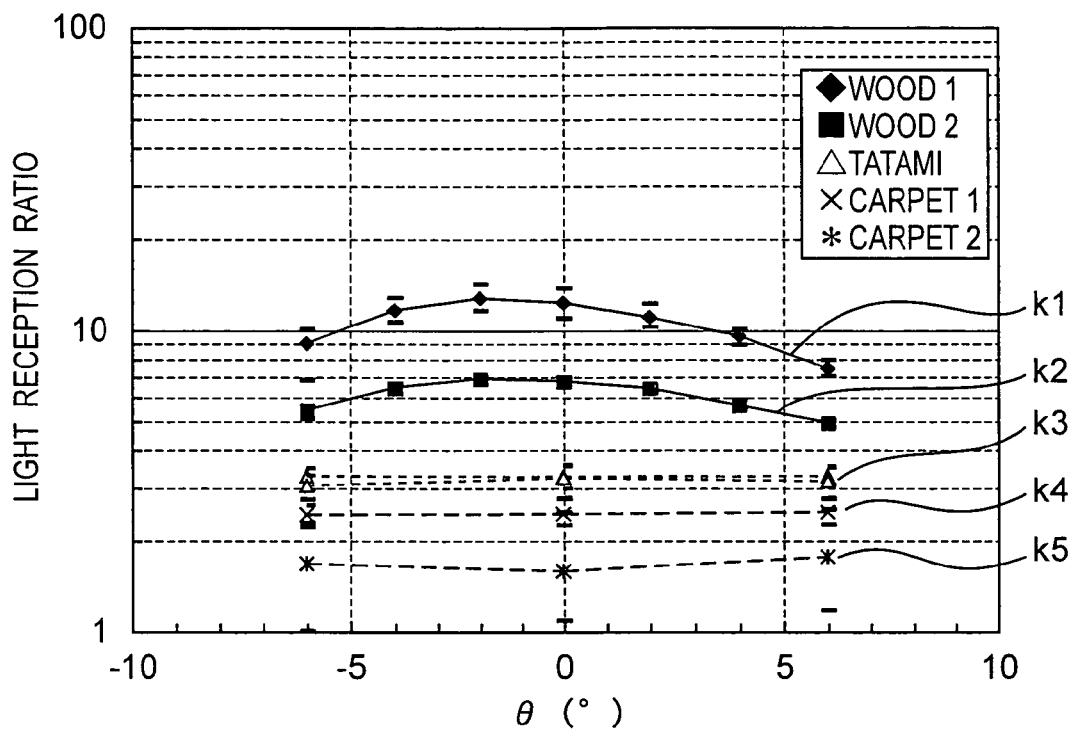
FIG. 31 is a characteristic chart showing results of measuring various types of measuring objects by the seventeenth embodiment.

FIG. 31 shows results of measuring two kinds of woods, wood 1 and wood 2, tatami, and two kinds of carpets, carpet 1 and carpet 2, as the measuring object 208 by the optical object discriminating device including the optical system shown in FIG. 30. As shown by characteristic k1 in FIG. 31, wood 1 and wood 2, the surfaces of which are flat, show decreasing polarization ratios with increasing inclination (incident angle) of the normal line against the first beam 205. On the other hand, tatami shown by characteristic k3 and carpets 1, 2 shown by characteristics k4, k5 show almost no dependence of polarization ratios on the inclination angle.

Whereas reflection by a flat surface of wood or the like has a high ratio at which a polarization state is retained, reflection by reflecting materials having heavy surface unevenness and due to dielectric property such as carpets 1, 2 results in depolarization. In the case of reflection by carpets or tatami, since the reflection causes the reflected light to be depolarized, their inclination-angle dependence of the polarization state is almost uniform.

That is, in the case of the carpets or the tatami as the measuring object 208, no changes in the polarization ratio can be seen against changes in the inclination angle θ of the measuring object 208. On the other hand, in the case of the wood as the measuring object 208, light whose polarization is retained in the specular reflection direction is intensely reflected at an inclination angle θ=0°, whereas the polarization ratio value decreases with increasing inclination angle of the wood because the component whose polarization state is retained gradually departs from light receiving surfaces 211a-1, 211b-1 of the first, second light receiving elements 211a, 211b that constitute the light receiving part. However, even if the inclination angle θ is increased up to ±6° as shown in FIG. 31, polarization ratio values representing by the characteristics k1 to k5 do not overlap with one another. Therefore, by calculating a ratio of the first received signal from the first light receiving element 211a to the second received signal from the second light receiving element 211b and by calculating a polarization ratio value of the first reflected beam 212 to the second reflected beam 213 in the signal processing circuit 214, it becomes implementable to discriminate the two kinds of carpets 1, 2, the tatami, and the two kinds of woods 1, 2.

Figure 32:
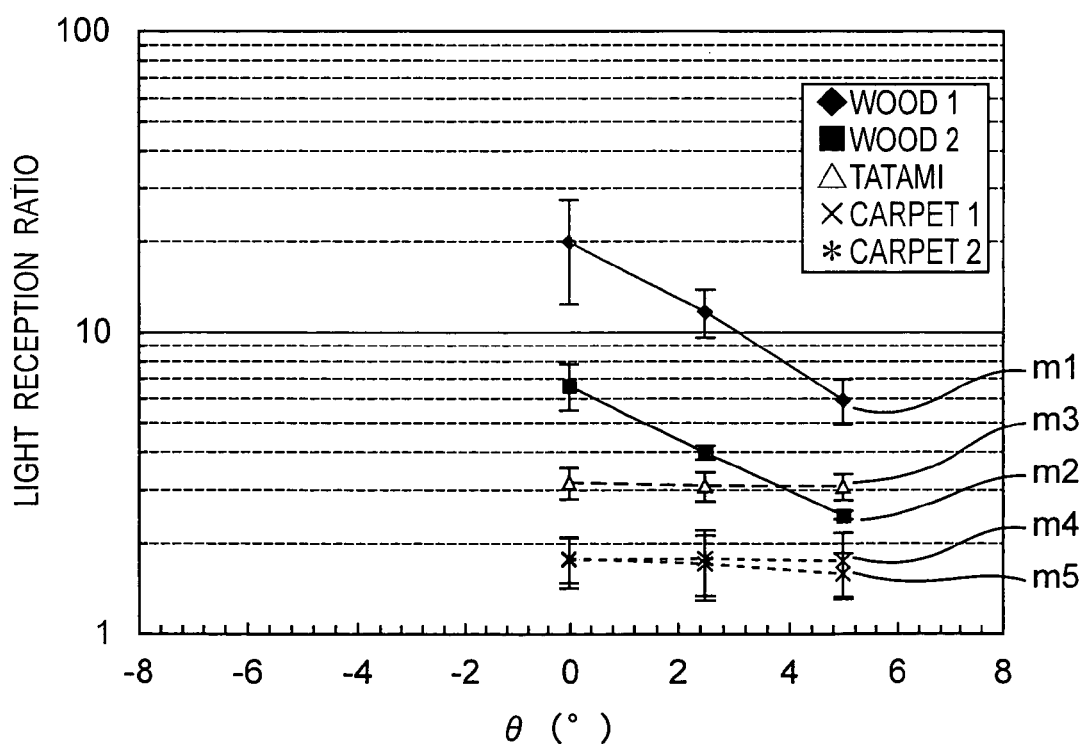
FIG. 32 is a characteristic chart showing results of measuring various types of measuring objects by a reference example.

FIG. 32 shows, as a reference example, results of measuring the above-described two kinds of woods, wood 1 and wood 2, tatami, and two kinds of carpets, carpet 1 and carpet 2, by an optical system in which the specular reflection optical axis of the first beam 205 reflected by the surface 208a of the measuring object 208 departs from the light receiving surfaces 211a-1, 211b-1 of the light receiving elements 211a, 211b with respect to the inclination angle θ of the measuring object 208. In reference to FIG. 32, characteristics m4, m5 represent the polarization ratios of the carpets 1, 2 and characteristic m3 represents the polarization ratio of tatami show no inclination-angle dependence of the polarization ratio as in the case of FIG. 31. On the other hand, characteristics m1, m2 represent the polarization ratios of woods 1, 2 greatly decrease with increasing inclination angle, overlapping with characteristic m3 representing the polarization ratio of tatami at an inclination angle of about 4° so that the discrimination from tatami is impossible.

Figure 33:
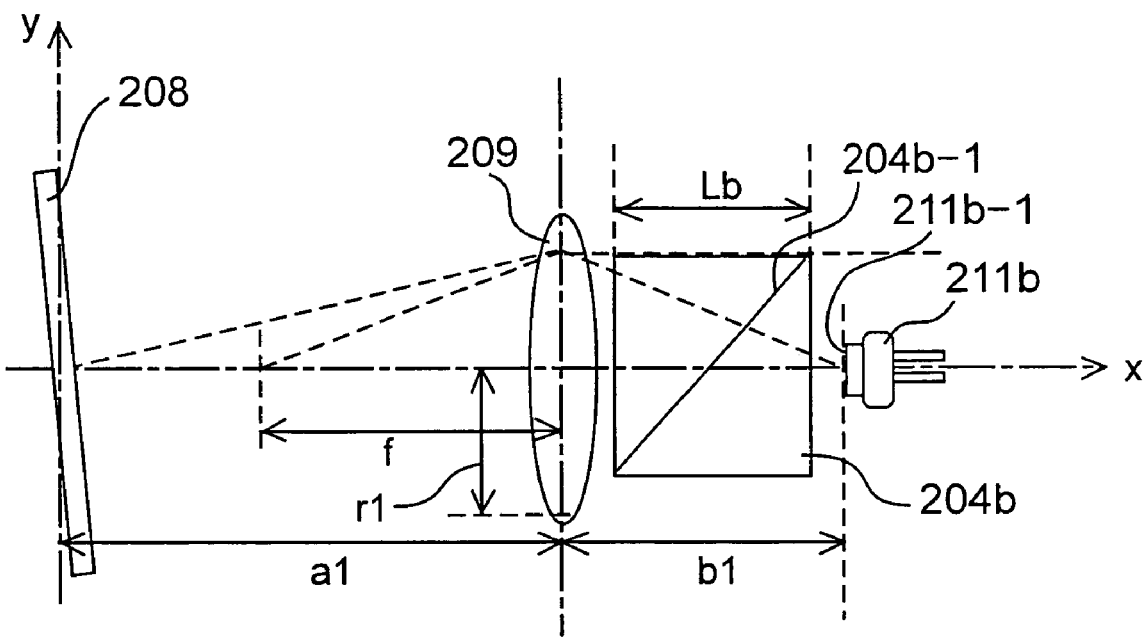
FIG. 33 is a schematic view showing a main part relating to light reception of the optical system of FIG. 30.

Next, the optical system of FIG. 30 is described in more detail with reference to FIG. 33. FIG. 33 shows, in extraction, the first condenser lens 209, the non-polarization beam splitter 204b, the second light receiving element 211b, which constitute the light receiving part of the optical system of FIG. 30. It is noted that since reflection of the reflected beam 207 by the non-polarization beam splitter 204a can be considered equivalently as transmission, the non-polarization beam splitter 204a is omitted in FIG. 33 for an easier understanding, where no consideration is given to the direction of the optical axis due to the reflection of the reflected beam 207 by the non-polarization beam splitter 204a.

As shown in FIG. 33, a distance a1 (mm) between the first condenser lens 209 and the measuring object 208 is longer than a focal length f (mm) of the first condenser lens 209, and the measuring object 208 is positioned beyond the focal length f of the first condenser lens 209. It is noted that the distance a1 (mm) is a distance from the center of the first condenser lens 209 via the reflecting surface 204a-1 of the non-polarization beam splitter 204a to the surface 208a of the measuring object 208.

As a result, when the measuring object 208 is inclined by a specified angle counterclockwise around the z axis in FIG. 33, the specular reflection optical axis of the first beam 205 by the measuring object 208 is directed along +y direction in emission, and along −y direction in condensing by the first condenser lens 209. Accordingly, the specularly reflected light component of the reflected beam 207 can be received by the light receiving element 211b. Also, when the inclination angle of the measuring object 208 is θ, the inclination angle of the specular reflection optical axis of the reflected beam 207 is 2θ. The specular reflection optical axis of the reflected beam 207 needs to become incident on the first condenser lens 209. To meet this need, the optical system of FIG. 30 has such a relationship among a radius r1 (mm) of the first condenser lens 209, the distance a1 (mm) between the first condenser lens 209 and the measuring object 208, and the inclination angle θ (radian) of the measuring object 208 that following Equation (5) is satisfied:

$$\tan^{-1}(r1/a1) > 2\theta \tag{5}$$

Also, the focal length f (mm) of the first condenser lens 209, the distance a1 (mm) between the first condenser lens 209 and the measuring object 208, and a distance b1 (mm) between the center of the first condenser lens 209 and the light receiving surface 211b-1 of the light receiving element 211b has a relationship satisfying following Equation (6), by which the specular reflection optical axis condensed by the first condenser lens 209 comes to a center of the light receiving surface 211b-1 of the second light receiving element 211b:

$$1/f = (1/a1) + (1/b1) \tag{6}$$

Also, although FIG. 33 shows only the second light receiving element 211b out of the first, second light receiving elements 211a, 211b, yet actually the first light receiving element 211a also is set for obtainment of the polarization ratio as shown in FIG. 30, where the polarization ratio is calculated by the signal processing circuit 214, to which the first, second received signals derived from the first, second light receiving elements 211a, 211b are inputted.

Figure 34:
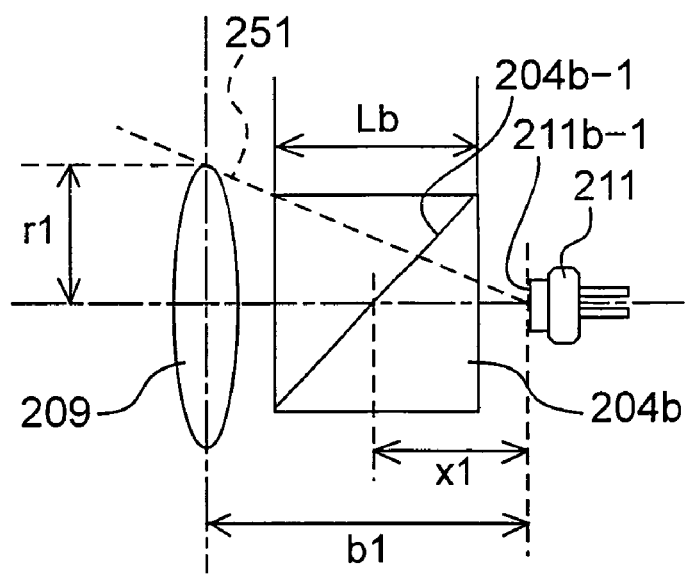
FIG. 34 is a schematic view showing an arrangement between a first condenser lens and a light receiving element of the optical system of FIG. 30.

In order that the reflected beam 207 condensed by the first condenser lens 209 is equivalently split by the non-polarization beam splitter 204b as the second light branching element, it is necessary that the reflected beam 207 become incident on the reflecting surface 204b-1 (diagonal side in the figure) of the non-polarization beam splitter 204b. FIG. 34 shows, under magnification, the succeeding-stage side following the first condenser lens 209 of FIG. 33. As shown in FIG. 34, it is the boundary condition that a beam 251 of the outermost peripheral portion condensed by the first condenser lens 209 passes through a vertex of the beam splitter 204b, so that the beam 251 of the outermost peripheral portion, when passing through inside the vertex, can be received by the light receiving element 211b without any problem. As shown in FIG. 34, given a distance x1 (mm) between the light receiving surface 211b-1 of the second light receiving element 211b and the reflecting surface 204b-1 of the beam splitter 204b, a one-side length Lb (mm) of the beam splitter 204b, and a distance b1 (=focal length f) between the center of the first condenser lens 209 and the light receiving surface 211b-1 of the light receiving element 211b, and a radius r1 (mm) of the first condenser lens 209, then splitting the reflected beam 207 equivalently into two beams by the beam splitter 204b necessitates satisfying following Equation (7):

$$x1 < (Lb/2) - (b1-r1)/r1 \tag{7}$$

Figure 35A:
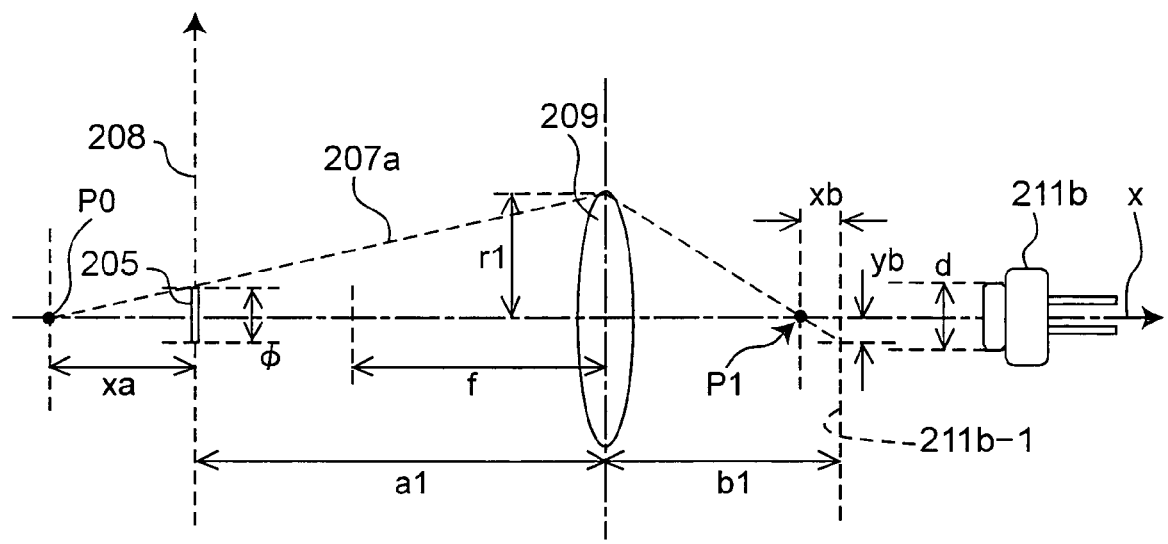
FIGS. 35A and 35B are explanatory views showing, in detail, optical paths of reflected light beams from one end and the other end of a first beam.
Figure 35B:
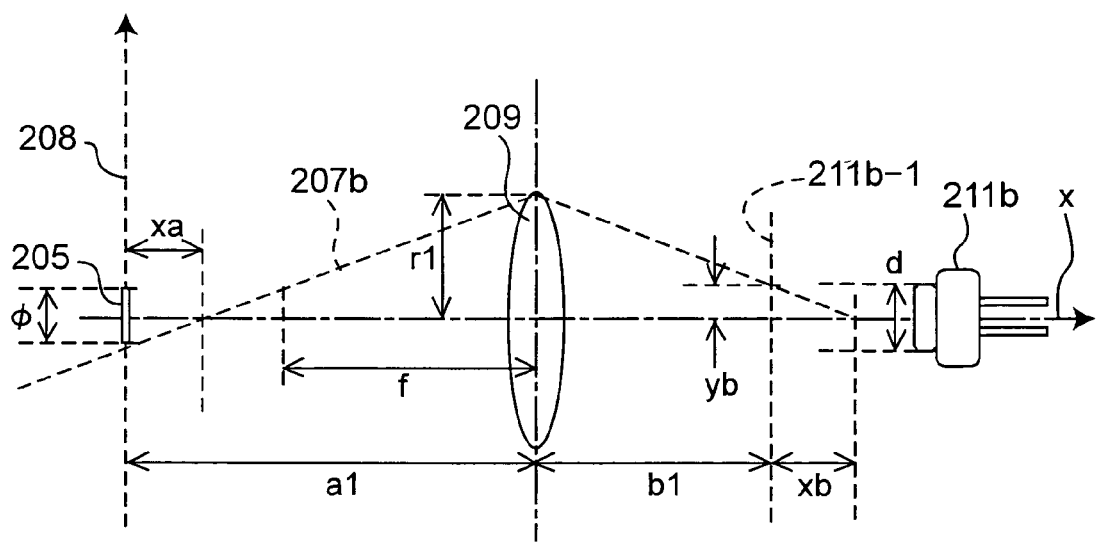

In the optical system of FIG. 30, since light from the LD 201 is applied to the measuring object 208 as collimated light, the first beam 205 has a beam diameter φ on the surface 208a of the measuring object 208. Therefore, the reflected beam 207 results in not a radiation from a spot but a radiation from an area having a width. FIGS. 35A and 35B show an excerpt of necessary portions from FIG. 30 for examination of the path of the reflected beam 207. Referring to FIGS. 35A and 35B, the x axis shows the specular reflection optical axis with an inclination angle θ of 0° of the measuring object 208, and the y axis shows the surface 208a of the measuring object 208. The first beam 205 is applied to the measuring object 208 with a beam diameter φ centered on the origin. This first beam 205 is depicted by bold line in FIGS. 35A and 35B. FIG. 35A is a view showing the locus 207a of a beam of the reflected beam 207 outputted from the +y end (i.e., a positive end of the y axis) out of the beam width of the first beam 205, and FIG. 35B is a view showing a locus 207b of a beam outputted from the −y end (i.e., a negative end of the y axis). FIGS. 35A and 35B shows a state in which the first beam 205 becomes incident vertically (i.e., inclination angle θ=0) on the surface 208a of the measuring object 208.

In cases where the inclination angle θ is not 0, the specular reflection optical axis from the beam end of the first beam 205 can be examined by rotating the first beam 205 (beam loci 207a, 207b) about the origin along the z axis. Rotating the first beam 205 about the origin along the z axis causes the coordinates of the beam end of the first beam 205 to change in response to the rotational angle. However, in cases where the inclination angle θ is several degrees or so and the beam diameter is within a several-millimeter range as shown in FIG. 31 as an example, the x-coordinate remains unchanged and the y-coordinate changes only to a negligibly small extent. Accordingly, in FIGS. 35A and 35B, discussions are made on the assumption that a light beam passing through the beam end in the case where the first beam 205 becomes incident vertically on the surface 208a of the measuring object 208 is approximated to a specular reflection optical axis resulting when the incident angle is not zero.

As shown in FIG. 35A, it is assumed that a beam diameter on the surface 208a of the measuring object 208 is φ (mm), a distance (optical distance) between the origin and an intersection point P0 at which the light beam 207a passing through the beam diameter end and the first condenser lens 209 end crosses with the x axis is xa. Also, a distance between the light receiving surface 211b-1 and a point P1 at which the light beam 207a crosses again with the x axis after the passage through the first condenser lens 209 is assumed as xb (mm). Further given a coordinate yb (mm) of an incidence position of the light beam 207a on the light receiving surface 211b-1, in order that the specular reflection optical axis derived from the first beam 205 is made fully incident within the light receiving surface 211b-1, following Equation (8') needs to be satisfied:

$$yb < d \tag{8'}$$

where the one-side length of the light receiving surface 211b-1 is d (mm).

As a result of calculating the coordinate yb with the individual parameters, the same results are yielded in both cases of FIG. 35A and FIG. 35B, and the relationship of Equation (8') results in a relationship of following Equation (8) between the beam diameter φ (mm) of the first beam 205 and the size d (mm) of the light receiving surface 211b-1:

$$d > (b1/a1) \tag{8}$$

where the size d (mm) is the diameter of the light receiving surface 211b-1 as an example.

Referring to Equation (8), b1 (mm) is the distance between the center of the first condenser lens 209 and the light receiving surface 211b-1 of the second light receiving element 211b. In the case where the condition of Equation (8) is satisfied, even if the measuring object 208 has such a flat surface 208a that the measuring object exhibits a small degree of depolarization by reflection, the incident-angle dependence of the first beam 205 as shown by characteristics k1, k2 in FIG. 31 becomes smaller. Accordingly, the discrimination accuracy can be greatly improved. In addition, although FIGS. 35A and 35B have been described on the second light receiving element 211b, yet similar discussions are applicable also to the first light receiving element 211a.

Eighteenth Embodiment

Next, FIG. 36 shows an outlined configurational view of an optical object discriminating device according to an eighteenth embodiment of the invention. In FIG. 36, only a locus of a light beam and principal optical parts are shown as in FIG. 30, and such components as those for holding the optical parts are not shown. The eighteenth embodiment differs from the foregoing seventeenth embodiment only in that a second condenser lens 215 is placed between the first condenser lens 209 and the non-polarization beam splitter 204b serving as a second light branching element. Therefore, this eighteenth embodiment is described mainly on its differences from the seventeenth embodiment of FIG. 30. In FIG. 36, the same constitute parts as in the seventeenth embodiment are designated by the same reference numerals. FIG. 36 shows, by one-dot chain line, a specular reflection optical axis J1 in the case where a normal line G of the surface 208a of the measuring object 208 coincides with the optical axis of the first beam 205 (i.e., the inclination angle θ of the measuring object 208 is 0°), as in FIG. 30. Also, FIG. 36 shows, by broken line, a specular reflection optical axis J2 in the case where the normal line G of the surface 208a of the measuring object 208 is inclined by an angle θ from the optical axis of the first beam 205. This specular reflection optical axis J2 is inclined by the angle θ1 from the normal line G toward the side opposite to the first beam 205.

In the optical object discriminating device of the eighteenth embodiment, as shown in FIG. 36, the second condenser lens 215 is placed behind the first condenser lens 209. A reflected beam reflected by the surface 208a of the measuring object 208 is reflected by the beam splitter 204b, passing via the reflecting surface 204b-1 of the non-polarization beam splitter 204b and being condensed on the light receiving surfaces 211a-1, 211b-1 of the first, second light receiving elements 211a, 211b.

With such an arrangement that light condensing is performed not only by the first condenser lens 209 but also by the second condenser lens 215 as shown above, light receiving angles for the first, second light receiving elements 211a, 211b can be increased as compared with the case where light condensing is done only by the first condenser lens 209. Therefore, since the first, second light receiving elements 211a, 211b are increased in light reception quantity, the measurement sensitivity is enhanced so that the S/N ratio can be enhanced.

In the case where the optical object discriminating device of the seventeenth or eighteenth embodiment of the invention is mounted on a cleaner or the like and used for automatic discrimination of the floor surface, particularly when the measuring object is one of small reflection light quantity such as carpets having a blackish floor surface, the reflected beam that becomes incident on the first, second light receiving elements 211a, 211b results in weak light.

Although diffused light does not depend on distance under the condition of the same light receiving angle, yet increased distances between the measuring object 208 and the first, second light receiving elements 211a, 211b would cause the optical parts such as the first condenser lens and the first, second light receiving elements to be proportionally increased in size as well, thus unfavorable in terms of the limitations on the device size and price. Therefore, using the first condenser lens 209 and the second condenser lens 215 in a pair as shown in FIG. 36 makes it possible to achieve a reduction in the distances as well as an optimum optical design.

The optical system of the eighteenth embodiment shown in FIG. 36 is explained in detail below.

Figure 37:
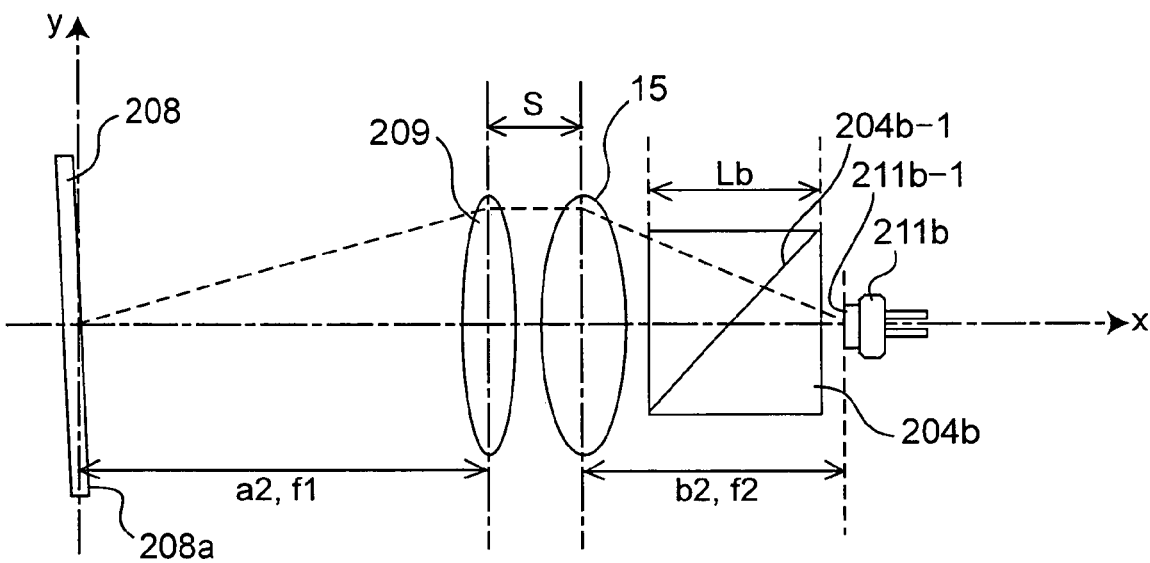
FIG. 37 is a schematic view showing a main part relating to light reception of the optical system of the eighteenth embodiment.

FIG. 37 shows a main-part excerpt of light receiving parts of the optical system of FIG. 36. In FIG. 37, no consideration is given to changes in the direction of the optical axis due to the reflection of the reflected beam 207 by the non-polarization beam splitter 204a. Since reflection of the reflected beam 207 by the non-polarization beam splitter 204a can be considered equivalently as transmission, the non-polarization beam splitter 204a is omitted in FIG. 37 for an easier understanding.

As shown in FIG. 37, the measuring object 208 is located at a position of the focal length f1 (mm) of the first condenser lens 209. That is, a distance a2 (mm) from the center of the first condenser lens 209 via the reflecting surface 204a-1 of the non-polarization beam splitter 204a to the surface 208a of the measuring object 208 is generally equal to the focal length f1 (mm). As a result, when the measuring object 208 is inclined against the first beam 205, the specular reflection optical axis of the first beam 205 is converted into a light beam nearly parallel to the x axis by the first condenser lens 209 as shown in FIG. 37. Then, the light receiving surface 211b-1 of the second light receiving element 211b is placed at a position of a focal length f2 (mm) of the second condenser lens 215. That is, the distance b2 (mm) between the light receiving surface 211b-1 of the second light receiving element 211b and the center of the second condenser lens 215 is set generally equal to the focal length f2 (mm) of the second condenser lens 215 (f2=b2).

As a result of this, the specularly reflected light component incident on the second condenser lens 215 as generally parallel light is condensed and received on the light receiving surface 211b-1. In the eighteenth embodiment, since the optical parts are arranged in the above-described distance relations, the surface 208a of the measuring object 208 is inclined against the first beam 205 so that specularly reflected light can be received by the light receiving surface 211b-1 even if the incident angle of the first beam 205 is not 0. Accordingly, it becomes implementable to provide an optical object discriminating device having high discrimination accuracy as in the results shown in FIG. 31.

Also, when the inclination angle of the measuring object 208 is θ, the inclination angle of the specular reflection optical axis of the reflected beam 207 is 2θ. Since the specular reflection optical axis needs to become incident on the first condenser lens 209, the optical system of FIG. 36 has such a relationship among a radius r1 of the first condenser lens 209, the distance a2 between the first condenser lens 209 and the measuring object 208, and the inclination angle θ of the measuring object 208 that following Equation (9) is satisfied:

$$\tan^{-1}(r1/a2) > 2\theta \qquad (9).$$

Also, although FIG. 37 shows only the second light receiving element 211b out of the first, second light receiving elements 211a, 211b, yet actually the first, second two light receiving elements 211a, 211b are set for obtainment of the polarization ratio as shown in FIG. 36. In order that the reflected beam 207 condensed by the first condenser lens 209 is equivalently split by the non-polarization beam splitter 204b toward the first light receiving element 211a and the second light receiving element 211b, it is necessary that the reflected beam 207 become incident on the reflecting surface 204b-1 (diagonal side in the figure) of the beam splitter 204b.

Figure 38:
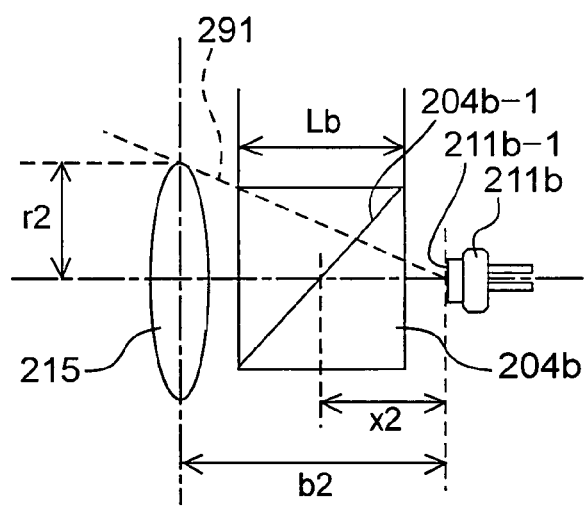
FIG. 38 is a schematic view showing an arrangement between a first condenser lens and a light receiving element of the optical system of FIG. 36.

FIG. 38 shows an enlarged view of the succeeding-stage side following the second condenser lens 215 of FIG. 37. As shown in FIG. 38, it is the boundary condition that a beam 291 of the outermost peripheral portion condensed by the second condenser lens 215 passes through a vertex of the beam splitter 204b, so that the beam 291, when passing through inside the vertex, becomes incident on the light receiving surface 211b-1, causing no problems. As shown in FIG. 38, given a distance x2 between the light receiving surface 211b-1 of the second light receiving element 211b and the reflecting surface 204b-1 of the non-polarization beam splitter 204b, a one-side length Lb (mm) of the beam splitter 204b, and a distance b2 (mm) (b2=f2) between the center of the second condenser lens 215 and the light receiving surface 211b-1 of the second light receiving element 211b, and a radius r2 (mm) of the second condenser lens 215, then splitting the reflected beam 207 equivalently into two beams by the beam splitter 204b necessitates satisfying following Equation (10):

$$x2 < (Lb/2) \cdot (b2 - r2)/r2 \qquad (10).$$

In the optical system of FIG. 37, since light from the LD 201 is applied to the measuring object 208 as collimated light, the first beam 205 has a beam diameter φ (mm) on the surface 208a of the measuring object 208. Therefore, the reflected beam 207 results in not a radiation from a spot but a radiation from an area having a width.

Figure 39:
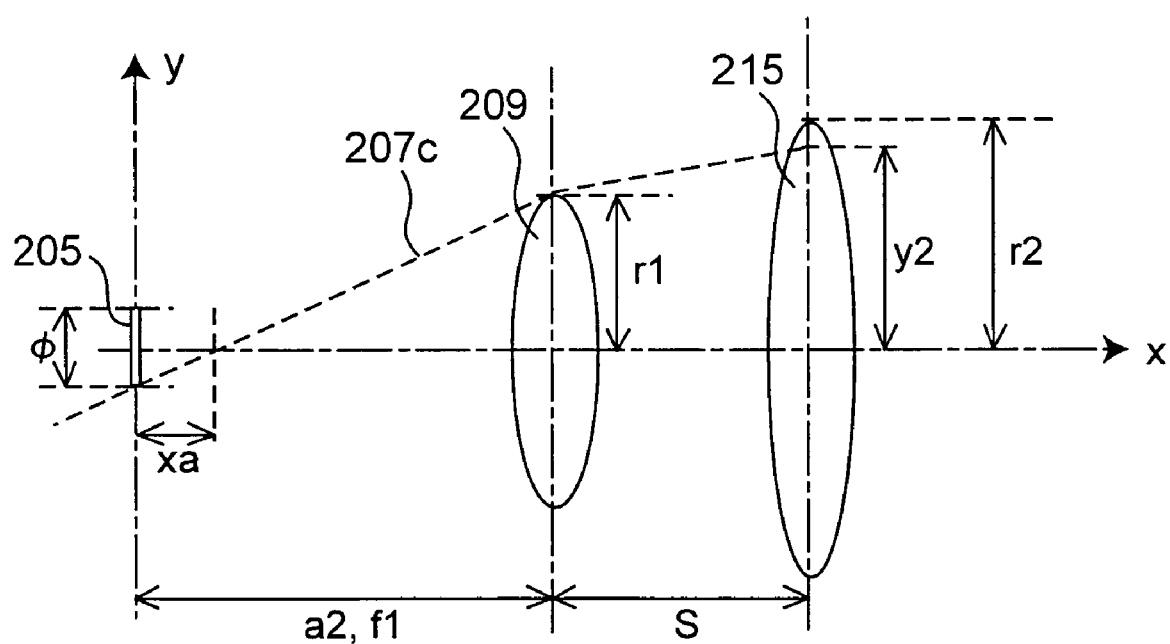
FIG. 39 is a schematic view showing, in detail, a placement relation between the first condenser lens and a second condenser lens of the optical system of FIG. 36.

FIG. 39 is a schematic view showing an excerpt of necessary portions for examination of the reflected beam 207. Referring to FIG. 39, the x axis shows the specular reflection optical axis with an inclination angle θ of 0° of the measuring object 208 (i.e., the first beam 205 becomes incident vertically on the surface 208a of the measuring object 208). Meanwhile, the y axis shows the surface 208a of the measuring object 208. The first beam 205 is applied to the surface 208a of the measuring object 208 with a beam diameter φ (mm) centered on the origin. The first beam 205 is depicted by bold line in FIG. 39. FIG. 39 shows a state in the case where the first beam 205 becomes incident vertically on the surface 208a of the measuring object 208. In cases where the first beam 205 has an inclination angle other than 0 against the surface 208a, the specular reflection optical axis from the beam end can be examined by rotating the first beam 205 about the z axis passing through the origin.

In this case, since the first beam 205 is rotated about the z axis by the incident angle, the coordinates of the beam end changes in response to the rotational angle. In cases where the inclination angle θ is several degrees or so and the beam diameter φ of the first beam 205 is within a several-millimeter range as can be seen in measurement results shown in FIG. 31, the x-coordinate of the beam spot of the first beam 205 remains unchanged and the y-coordinate changes only to a negligibly small extent. Accordingly, in FIG. 39, discussions are made on the assumption that a light beam passing through the beam end of the first beam 205 that becomes incident vertically on the surface 208a of the measuring object 208 is approximated to a specular reflection optical axis resulting when the incident angle of the first beam 205 is not zero.

As shown in FIG. 39, when the measuring object 208 is inclined by a slight amount counterclockwise, specularly reflected light 207c outputted from the −y end of a beam spot of the first beam 205 passes through a +y side lens end 209a (located distant by r1 (mm) from the x axis) of the first condenser lens 209, and then is refracted in the +y direction. Accordingly, for reception of components of the refracted specularly reflected light 207c, at least the radius r2 (mm) of the second condenser lens 215 needs to be larger than the radius r1 (mm) of the first condenser lens 209. Further, more concretely, if the y-coordinate at which the specularly reflected light 207c, after passing through the first condenser lens 209, becomes incident on the second condenser lens 215 is y2 (mm), then following equation needs to be satisfied:

$$y2 < r2.$$

In this case, given a distance S (mm) between the center of the first condenser lens 209 and the center of the second condenser lens 215, the above equation results in following Equation (11):

$$r2/r1 > (S \cdot (\phi/2) + a2 \cdot r1)/(a2 \cdot r1) \quad (11)$$

where φ (mm) is the beam diameter of the first beam 205 on the surface 208a of the measuring object 208 in Equation (11).

Figure 40A:
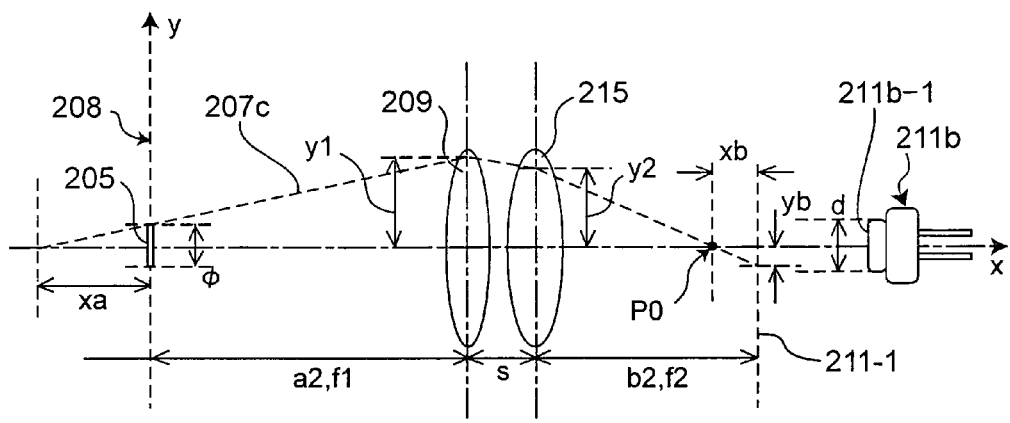
FIGS. 40A and 40B are views for explaining an optimum placement of individual optical parts of the optical system of FIG. 36.
Figure 40B:
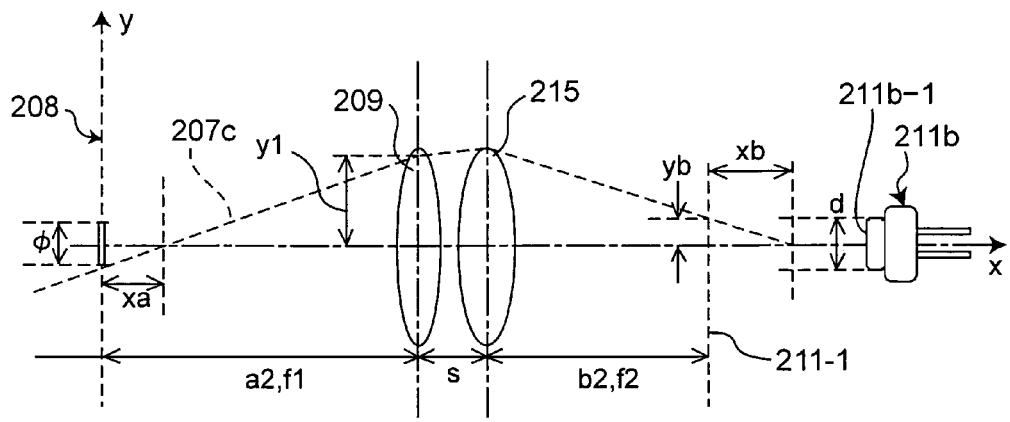

As shown in FIGS. 40A and 40B, it is assumed that a beam diameter of the first beam 205 on the surface 208a of the measuring object 208 is φ (mm) and a distance between the origin and an intersection point at which the light beam 207c passing through a radial end of the beam and a radial end of the first condenser lens 209 crosses with the x axis is xa (mm). Also, a distance between the light receiving surface 211b-1 and a point P0 at which the light beam 207c crosses again with the x axis after the passage through the first condenser lens 209 is assumed as xb (mm). Further, a coordinate of an incidence position of the light beam 207c on the light receiving surface 211b-1 is assumed as yb (mm). In this case, in order that the specular reflection optical axis derived from the first beam 205 is made fully incident within the light receiving surface 211b-1, the following equation needs to be satisfied:

$$yb < d.$$

As a result of calculating the coordinate yb of this equation with the individual parameters, the same results are yielded in both cases of FIG. 40A and FIG. 40B, and the above equation results in the following equation, between the beam diameter φ (mm) of the first beam 205 and the size d (mm) of the light receiving surface 211b-1:

$$d > (b2/a2) \cdot \phi \quad (12).$$

Referring to Equation (12), b2 is the distance from the center of the second condenser lens 215 via the non-polarization beam splitter 204b to the light receiving surface 211b-1 of the second light receiving element 211b. Further, a2 is the distance (mm) from the surface 208a of the measuring object 208 via the non-polarization beam splitter 204a to the center of the first condenser lens 209.

As Equation (12) shows, it can be seen that the condition for making the specular reflection optical axis derived from the first beam 205 fully incident within the light receiving surface 211b-1 does not depend on the distance S between the first condenser lens 209 and the second condenser lens 215. Under the condition that Equation (12) is satisfied, the incident-angle dependence of the polarization ratio of the reflected beam 207 of the first beam 205 can be reduced for discrimination of measuring objects like wooden floor having a flat surface and therefore less depolarization by reflection as illustrated by characteristics k1, k2 of FIG. 31. Accordingly, the discrimination accuracy can be greatly improved. In addition, similar discussions are applicable also to the first light receiving element 211a.

The seventeenth embodiment of FIG. 30 and the eighteenth embodiment of FIG. 37 described above have been described, as shown in FIG. 41B, on the assumption that the first beam 205 incident on the measuring object 208 is a light beam that passes through the non-polarization beam splitter 204a. In this case, with respect to the reflected beam 207, its component reflected by the beam splitter 204a is detected as signal light, and therefore light of the angle of incidence on the reflecting surface 204a-1 (diagonal side) of the beam splitter 204a is reflected in a direction toward the light receiving elements 211a, 211b, and detected as signal light by the light receiving elements 211a, 211b. In this case, if the distance from the center of the reflecting surface 204a-1 of the beam splitter 204a to the surface 208a of the measuring object 208 is L (mm), then the light receiving elements 211a, 211b can receive reflected light at a receiving angle represented by following Equation (15):

$$2 \tan^{-1}(L1/(2(L-L1))) \quad (15).$$

In Equation (15), L1 (mm) is the one-side length of the non-polarization beam splitter 204a shown in FIG. 41B.

Meanwhile, in the case where the first beam 205 incident on the surface 208a of the measuring object 208 is a beam reflected by the reflecting surface 204a-1 (diagonal side) of the non-polarization beam splitter 204a as shown in FIG. 41A, the reflected light reflected by the surface 208a of the measuring object 208 can be led to the light receiving elements with a receiving angle represented by Equation (16-1) or Equation (16-2), regardless of whether or not the light becomes incident on the reflecting surface 204a-1 of the beam splitter 204a:

$$2 \tan^{-1}(r1/a1) \quad (16\text{-}1)$$

$$2 \tan^{-1}(r1/a2) \quad (16\text{-}2).$$

Equation (16-1) corresponds to the case of seventeenth embodiment, where r1 (mm) is the radius of the first condenser lens 209 and a1 (mm) is the optical path length from the center of the first condenser lens 209 via the reflecting surface 204a-1 of the non-polarization beam splitter 204a to the surface 208a of the measuring object 208.

Also, Equation (16-2) corresponds to the case of the eighteenth embodiment, where r1 (mm) is the radius of the first condenser lens 209 and a2 (mm) is the optical path length from the center of the first condenser lens 209 via the reflecting surface 204a-1 of the non-polarization beam splitter 204a to the surface 208a of the measuring object 208.

Consequently, with such an arrangement that, as shown in FIG. 41A, a light beam reflected by the beam splitter 204a is applied as the first beam 205 to the measuring object 208, the reflected beam 207 derived from the measuring object 208 is transmitted by the non-polarization beam splitter 204a to become incident on the first condenser lens 209, it becomes possible to increase the light reception quantity on light receiving elements placed in succeeding stages of the first condenser lens 209. As a result, the S/N ratio is enhanced, so that higher discrimination of the measuring object 208 becomes achievable.

Further, in the foregoing embodiments, as shown in FIG. 30 or FIG. 36, the reflected beam 207 is split into two beams by the non-polarization beam splitter 204b, and the two split reflected beams are received as mutually orthogonal polarized components by first, second light receiving elements, respectively. For this purpose, the embodiments include the first, second linear polarizers 210a, 210b which are so placed that their optical axes are orthogonal to the non-polarization beam splitter 204b. However, those optical parts may be replaced with a P beam splitter (polarization beam splitter). Using the P beam splitter allows the parts count to be cut down, where the light reception quantity is also increased.

Nineteenth Embodiment

Figure 42A:
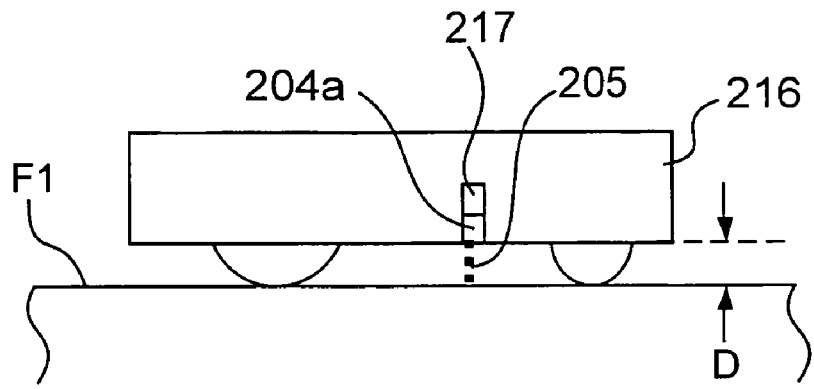
FIG. 42A is a schematic view showing an aspect in which the self-propelled cleaner of the nineteenth embodiment having the optical object discriminating device mounted thereon is running on a flat floor surface.
Figure 42B:
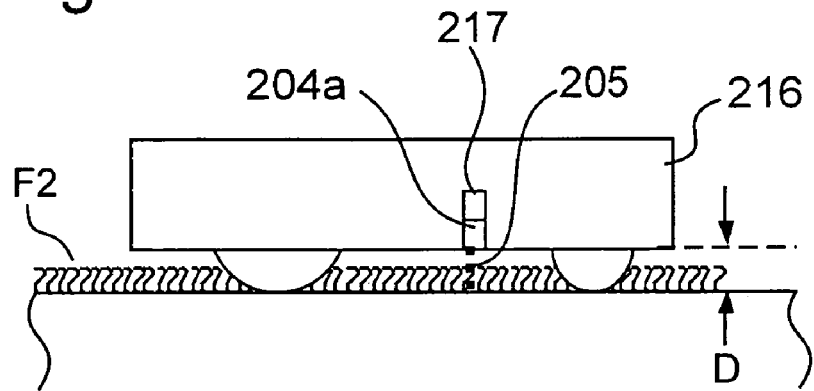
FIG. 42B is a schematic view showing an aspect in which the self-propelled cleaner is running on a carpet or other like floor surface.
Figure 43:
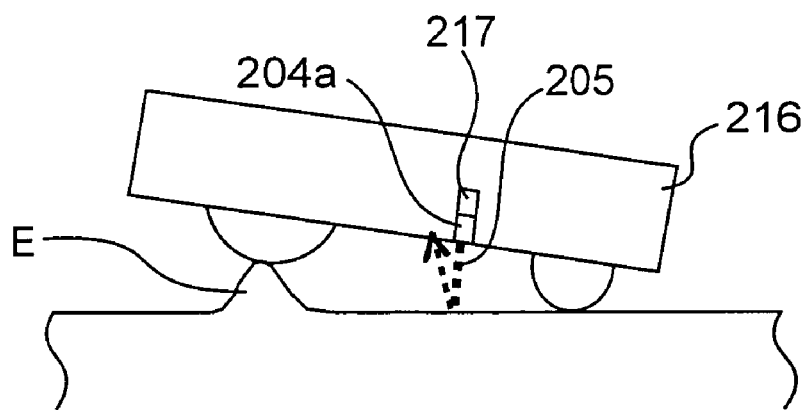
FIG. 43 is a schematic view showing an aspect in which the self-propelled cleaner has run aground on an obstacle of the floor surface.

The optical object discriminating devices described above are suitable for mounting on vacuum cleaners, particularly self-propelled cleaners. FIGS. 42A and 42B are outlined configurational views of a self-propelled vacuum cleaner of the nineteenth embodiment on which the optical object discriminating device of the present invention is mounted as a floor surface discriminating sensor 217. A first beam 205 is emitted from a bottom face 216a of a cleaner main body 216. By receiving reflected light of the first beam 205 reflected by the surface of a floor F, the type of the floor surface is discriminated. FIG. 42A shows a case in which the measuring object is a flat floor surface F1 such as flooring, and FIG. 42B shows a case in which the measuring object is a shaggy floor surface F2 such as carpet. As FIGS. 42A and 42B show an example in which the distance D between the floor surface and the floor surface discriminating sensor 217 is 15 mm, smaller distances D are unfavorable because fur tips would make contact with the cleaner main body 216 or sensor portion (non-polarization beam splitter 204a) in the state shown in FIG. 42B. Further, as shown in FIG. 43, in the case where with some obstacle E present on the floor surface, the cleaner has run aground on the obstacle E with the result that the cleaner is tilted against the floor surface, given a large distance between the floor surface and the floor surface discriminating sensor 217, the specular reflection optical axis would no longer become incident on the light receiving system. In this case, also, there is a need for upsizing the optical parts to receive the specularly reflected light. Accordingly, by setting about 15 mm as the distance from the surface 208a of the measuring object 208 to the beam splitter 204a, the size of the floor surface discriminating sensor 217 enables itself to be mounted on electronic equipment (e.g., self-propelled cleaners) that need the sensor. When the distance is 15 mm, the size of one side of the beam splitter 204a can be set to 10 mm as an example, where the overall size of the floor surface discriminating sensor 217 (optical object discriminating device) can be set to outside dimensions of, for example, about 30 mm×40 mm×20 mm.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical object discriminating device comprising:
   a light projecting part which applies light emitted from a semiconductor light emitting element, to a measuring object which is an object to be measured;
   a light receiving part which receives reflected light reflected by the measuring object;
   a polarization-state selector part which is placed between the light receiving part and the measuring object and which permits polarized light of a specified polarization direction reflected from the measuring object to pass therethrough; and
   a signal processing part which processes a signal outputted by the light receiving part to measure intensity of light of the specified polarization direction out of the reflected light to determine unevenness of a reflecting surface of the measuring object.

2. The optical object discriminating device as claimed in claim 1, wherein
   a polarization state of light to be let incident on the measuring object is linear polarization.

3. The optical object discriminating device as claimed in claim 2, wherein
   linearly polarized light to be let incident on the measuring object is an S wave with respect to the measuring object.

4. The optical object discriminating device as claimed in claim 2, wherein
   a polarization direction selected by the polarization-state selector part and a polarization direction of light to be let incident on the measuring object are substantially identical to each other.

5. The optical object discriminating device as claimed in claim 1, wherein
   the light projecting part comprises:
   a first light branching element which splits light emitted from the semiconductor light emitting element into a first beam and a second beam; and
   an objective part which condenses and applies the first beam onto the measuring object, and wherein
   the optical object discriminating device further comprises:
   a condenser part which condenses light that has passed through the objective part out of the light reflected by the measuring object; and
   a pinhole part placed between the condenser part and the light receiving element.

6. The optical object discriminating device as claimed in claim 5, further comprising:
   stray light prevention part which intercepts the second beam and reflected light of the second beam.

7. The optical object discriminating device as claimed in claim 6, wherein
the stray light prevention part has a linear polarizer, and
the linear polarizer is placed on an optical axis of the second beam and a polarization direction of light permitted by the linear polarizer to pass therethrough is a direction orthogonal to a polarization direction of the second beam.

8. The optical object discriminating device as claimed in claim 5, wherein
the condenser part includes a condenser lens, and
the pinhole part is placed at a position of a focal length of the condenser lens.

9. The optical object discriminating device as claimed in claim 5, wherein
a diameter of a reflected beam at the position where the pinhole part is placed is smaller than a hole diameter of the pinhole part.

10. The optical object discriminating device as claimed in claim 5, wherein
the first beam becomes incident on a substantially center of the objective part.

11. The optical object discriminating device as claimed in claim 1, wherein
the light projecting part includes a first light branching element which splits a light beam emitted from the semiconductor light emitting element into a first beam and a second beam; and
the optical object discriminating device further comprises a light splitting part which includes a second light branching element that splits light reflected by the measuring object into a first reflected beam and a second reflected beam, wherein
the light receiving part has a first light receiving element which receives the first reflected beam and a second light receiving element which receives the second reflected beam,
the polarization-state selector part has a polarization-state selector element which selects a polarization state of light incident on the first light receiving element, and
the signal processing part calculates a ratio of a signal outputted by the first light receiving element to a signal outputted by the second light receiving element.

12. The optical object discriminating device as claimed in claim 1, wherein
the light projecting part includes a first light branching element which splits a light beam emitted from the semiconductor light emitting element into a first beam and a second beam, and
the optical object discriminating device further comprises a light splitting part which includes a second light branching element that splits light reflected by the measuring object into a first reflected beam and a second reflected beam, and wherein
the light receiving part has a first light receiving element which receives the first reflected beam and a second light receiving element which receives the second reflected beam, and
the polarization-state selector part has a first polarization-state selector element which selects a polarization state of light incident on the first light receiving element and a second polarization-state selector element which selects a polarization state of light incident on the second light receiving element, and a polarization direction selected by the first polarization-state selector element and a polarization direction selected by the second polarization-state selector element are substantially orthogonal to each other.

13. The optical object discriminating device as claimed in claim 12, wherein
a polarization direction selected by the first polarization-state selector element is substantially parallel to a polarization direction of the first light beam, and
a polarization direction selected by the second polarization-state selector element is substantially vertical to a polarization direction of the first light beam.

14. The optical object discriminating device as claimed in claim 12, wherein
the first and second polarization-state selector elements are linear polarizers.

15. The optical object discriminating device as claimed in claim 12, wherein
the second light branching element and the first and second polarization-state selector elements are implemented each by a polarization beam splitter.

16. The optical object discriminating device as claimed in claim 12, wherein
the signal processing part calculates a ratio of a signal outputted by the first light receiving element to a signal outputted by the second light receiving element.

17. The optical object discriminating device as claimed in claim 12, wherein
the signal processing part calculates a difference between a signal outputted by the first light receiving element and a signal outputted by the second light receiving element.

18. The optical object discriminating device as claimed in claim 12, wherein
the signal processing part calculates:
a difference between a signal outputted by the first light receiving element and a signal outputted by the second light receiving element; and
a ratio of the difference to a sum of a signal outputted by the first light receiving element and a signal outputted by the second light receiving element, or
a ratio of the difference to a signal outputted by the first light receiving element or a signal outputted by the second light receiving element.

19. The optical object discriminating device as claimed in claim 1, wherein
the semiconductor light emitting element is a semiconductor laser.

20. The optical object discriminating device as claimed in claim 1, wherein
the light receiving part has a photodiode.

21. The optical object discriminating device as claimed in claim 11, wherein
the first light receiving element and the second light receiving element are formed on one identical semiconductor substrate.

22. The optical object discriminating device as claimed in claim 20, wherein
the light receiving part and the signal processing part are formed on one identical semiconductor substrate.

23. The optical object discriminating device as claimed in claim 21, wherein
the first light receiving element, the second light receiving element and the signal processing part are formed on one identical semiconductor substrate.

24. The optical object discriminating device as claimed in claim 1, wherein a modulation signal is applied to the semiconductor light emitting element to apply light intensity modulation, and wherein the signal processing part calculates a difference between a first output signal that the light receiving part outputs on condition that the modulation signal is at an H level, and a second output signal that the light receiving part outputs on condition that the modulation signal is at an L level.

25. The optical object discriminating device as claimed in claim 24, wherein
the modulation signal applied to the semiconductor light emitting element is a rectangular wave.

26. The optical object discriminating device as claimed in claim 24, wherein
an emission quantity of the semiconductor light emitting element upon the L level is substantially 0 W.

27. The optical object discriminating device as claimed in claim 24, wherein
modulation frequency of the light intensity modulation is not lower than 50 kHz.

28. The optical object discriminating device as claimed in claim 24, wherein
modulation frequency of the light intensity modulation is 100 Hz to 10 kHz.

29. The optical object discriminating device as claimed in claim 24, wherein
the signal processing part comprises:
a first sample-and-hold circuit which permits a first output signal derived from the light receiving part to pass therethrough as it is when the modulation signal is at an H level, and which samples and holds the first output signal obtained with the modulation signal at the H level when the modulation signal is at an L level;
a second sample-and-hold circuit which permits a second output signal derived from the light receiving part to pass therethrough as it is when the modulation signal is at an L level, and which samples and holds the second output signal obtained with the modulation signal at the L level when the modulation signal is at an H level; and
a difference circuit which takes a difference between a signal outputted by the first sample-and-hold circuit and a signal outputted by the second sample-and-hold circuit.

30. The optical object discriminating device as claimed in claim 1, wherein
the signal processing part has:
an amplification part which amplifies a signal detected by the light receiving part; and
an amplification degree changing part which changes over an amplification degree of the amplification part in response to a signal strength of the light receiving part.

31. The optical object discriminating device as claimed in claim 1, wherein
when a distance to the measuring object is larger than a specified value, light emission of the semiconductor light emitting element is turned off or decreased.

32. The optical object discriminating device as claimed in claim 1, wherein
emission state of the semiconductor light emitting element meets Class 1 of Safety Standards for laser products.

33. The optical object discriminating device as claimed in claim 1, wherein
the objective part is implemented by an objective lens;
an optical window is formed at part of a casing;
a distance between the objective lens and the optical window is shorter than a focal length of the objective lens.

34. A cleaner in which the optical object discriminating device as defined in claim 1 is mounted in a head portion.

35. A self-propelled cleaner on which the optical object discriminating device as defined in claim 1 is mounted.

36. The optical object discriminating device as claimed in claim 1, wherein
the light projecting part collimates light emitted from the semiconductor light emitting element and applies the light toward the measuring object, and
the optical object discriminating device further comprises:
a condenser part which condenses light that is applied from the light projecting part and then is reflected by the measuring object; and
a light splitting part which splits light derived from the condenser part into a plurality of divided beams, wherein
the polarization-state selector part selects beams of mutually different polarization directions out of the plurality of split beams, and
the light receiving part receives the plurality of beams selected by the polarization-state selector part.

37. The optical object discriminating device as claimed in claim 36, wherein
an angle formed by an optical axis of the light projecting part and the measuring object and an angle formed by an optical axis of the condenser part and the measuring object are substantially equal to each other.

38. The optical object discriminating device as claimed in claim 36, further comprising
a light branching part which is placed between the light projecting part and the measuring object and which branches a light beam derived from the light projecting part into a plurality of light beams, wherein
at least one of the plurality of light beams branched by the light branching part becomes incident on the measuring object at an incident angle of substantially zero degrees.

39. The optical object discriminating device as claimed in claim 6, wherein
an incident angle of incidence on the linear polarizer for light beams other than the light beam that becomes incident on the measuring object at the angle of substantially zero degrees out of a plurality of light beams branched by the light branching part is set to such an angle that their specularly reflected light does not become incident on the light receiving part.

40. The optical object discriminating device as claimed in claim 36, wherein
the condenser part is implemented by a plurality of lenses.

41. The optical object discriminating device as claimed in claim 36, wherein
the condenser part is implemented by one lens.

42. The optical object discriminating device as claimed in claim 40, wherein
a lens of the condenser part closest to the measuring object is so formed that a focus of the lens is positioned on the measuring object.

43. The optical object discriminating device as claimed in claim 41, wherein
a lens of the condenser part closest to the measuring object is so formed that a focus of the lens is positioned on the measuring object.

44. The optical object discriminating device as claimed in claim 38, wherein
the light branching part is formed by a cubic type beam splitter.

45. The optical object discriminating device as claimed in claim 44, wherein
a length of one side of the cubic type beam splitter meets a condition expressed by following Equation (1):

$$\alpha \geq (a+L) \times d/f \quad (1)$$

where 'α' is the length of one side of the beam splitter, 'a' is a diameter of a spot at which light from the light projecting part is applied to the measuring object, 'L' is a diameter of a lens of the condenser part closest to the measuring object, 'f' is a focal length of the lens, and 'd' is a distance along an optical axis from a light application surface of the measuring object to a surface of the beam splitter on its one side closer to the measuring object.

46. The optical object discriminating device as claimed in claim 38, wherein
the light branching part is formed of a half mirror.

47. The optical object discriminating device as claimed in claim 46, wherein
lengths of two sides of the half mirror meet conditions expressed by following Equations (2) and (3):

$$\alpha \geq (a+L) \times d/f \quad (2)$$

$$\beta \geq 2^{1/2}(a+L) \times d/f \quad (3)$$

where 'α' is the length of one side of the half mirror, 'β' is the length of the other side of the half mirror, 'a' is a diameter of a spot at which light from the light projecting part is applied to the measuring object, 'L' is a diameter of a lens of the condenser part closest to the measuring object, 'f' is a focal length of the lens, and 'd' is a distance along an optical axis from a light application surface of the measuring object to a surface of the beam splitter on its one side closer to the measuring object.

48. The optical object discriminating device as claimed in claim 36, wherein
the light splitting part is formed of a beam splitter.

49. The optical object discriminating device as claimed in claim 36, wherein
the light splitting part is formed of a diffraction grating.

50. The optical object discriminating device as claimed in claim 49, wherein
out of light diffracted by the diffraction grating, +1st-order diffracted light and −1st-order diffracted light are polarized by the polarizer.

51. The optical object discriminating device as claimed in claim 49, wherein
the diffraction grating of which the light splitting part is formed has such a grating groove depth that a light quantity of the 0th-order diffracted light is made substantially zero.

52. The optical object discriminating device as claimed in claim 36, wherein
the semiconductor light emitting element is formed of an LED with which a linear polarization element is provided.

53. The optical object discriminating device as claimed in claim 36, wherein
a spot of light applied to the measuring object has a diameter of 1 mm or more.

54. The optical object discriminating device as claimed in claim 36, wherein
the signal processing part has a plurality of amplifiers connected in series.

55. The optical object discriminating device as claimed in claim 36, wherein
the light receiving part is formed of two photodiodes, and
the signal processing part calculates a ratio of two signals derived from the two photodiodes.

56. The optical object discriminating device as claimed in claim 36, wherein
the light receiving part is formed of two photodiodes, and
the signal processing part calculates a ratio of a sum of two signals derived from the two photodiodes to a difference between the two signals.

57. The optical object discriminating device as claimed in claim 1, wherein
the light projecting part has a first light branching element which splits light emitted from the semiconductor light emitting element into a first beam and a second beam, and moreover applies the first beam to the measuring object, and
the optical object discriminating device further comprises:
a condenser part which includes a first condenser lens that condenses reflected light reflected by the measuring object; and
a light splitting part which includes a second light branching element that splits a light beam condensed by the condenser part into a first reflected beam and a second reflected beam, and wherein
the polarization-state selector part has a first linear polarizer to which the first reflected beam is to be incident and which permits a component of the first reflected beam of a specified polarization direction to pass therethrough, and a second linear polarizer to which the second reflected beam is to be incident and which permits a component of the second reflected beam of a polarization direction orthogonal to the specified polarization direction to pass therethrough,
the light receiving part has a first light receiving element which receives the first reflected beam that has passed through the first linear polarizer and a second light receiving element which receives the second reflected beam that has passed through the second linear polarizer,
the signal processing part, to which a first light reception signal outputted by the first light receiving element and a second light reception signal outputted by the second light receiving element are inputted, measures polarization information as to the reflected light based on the first and second light reception signals, and
a specularly reflected light component out of the reflected light reflected by a surface of the measuring object becomes incident on places within light receiving surfaces of the first and second light receiving elements via the condenser part.

58. The optical object discriminating device as claimed in claim 57, wherein
assuming that a focal length of the first condenser lens is f (mm) and an optical path ranging from the measuring object via the first light branching element to the first condenser lens is a1 (mm), following Equation (4) is satisfied:

$$f < a1 \quad (4).$$

59. The optical object discriminating device as claimed in claim 58, wherein assuming that a radius of the first condenser lens is r1 (mm) and an angle formed by the first light beam and a normal line of the surface of the measuring object is θ (radian), following Equation (5) is satisfied:

$$\tan^{-1}(r1/a1) > 2\theta \qquad (5).$$

60. The optical object discriminating device as claimed in claim 59, wherein
assuming that a distance of an optical path ranging from the first condenser lens via the second light branching element to the first and second light receiving elements is b1 (mm), following Equation (6) is satisfied:

$$1/f = (1/a1) + (1/b1) \qquad (6).$$

61. The optical object discriminating device as claimed in claim 60, wherein
assuming that a radius of the first condenser lens is r1 (mm),
a length of one side of the second light branching element is Lb (mm), and
a distance between a reflecting surface of the second light branching element and the first and second light receiving elements is x1 (mm), then following Equation (7) is satisfied:

$$x1 < (Lb/2) \cdot (b1 - r1)/r1 \qquad (7).$$

62. The optical object discriminating device as claimed in claim 57, wherein
assuming that a distance of an optical path ranging from the measuring object via the first light branching element to the first condenser lens is a1 (mm),
a distance of an optical path ranging from the first condenser lens via the second light branching element to the first and second light receiving elements is b1 (mm),
a size of the light receiving surfaces of the first and second light receiving elements is d (mm), and
a beam diameter of the first light beam at the surface of the measuring object is φ (mm), then following Equation (8) is satisfied:

$$d > (b1/a1) \cdot \phi \qquad (8).$$

63. The optical object discriminating device as claimed in claim 57, wherein
with respect to a light beam to be split into two beams by the first light branching element,
the first beam is a component reflected by the first light branching element, and
the second beam is component transmitted by the first light branching element.

64. The optical object discriminating device as claimed in claim 57, wherein
a distance from the surface of the measuring object to the first light branching element is about 15 mm.

* * * * *